United States Patent
Breiling et al.

(10) Patent No.: US 10,461,840 B2
(45) Date of Patent: Oct. 29, 2019

(54) SUDAC, USER EQUIPMENT, BASE STATION AND SUDAC SYSTEM

(71) Applicant: Fraunhofer-Gesellschaft zur Foerderung der angewandten Forschung e.V., Munich (DE)

(72) Inventors: Marco Breiling, Erlangen (DE); Frank Burkhardt, Fuerth (DE); Christian Rohde, Erlangen (DE); Wing Kwan Ng, Erlangen (DE); Robert Schober, Dietenhofen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 56 days.

(21) Appl. No.: 15/439,815

(22) Filed: Feb. 22, 2017

(65) Prior Publication Data

US 2017/0163331 A1    Jun. 8, 2017

Related U.S. Application Data

(63) Continuation of application No. PCT/EP2015/069474, filed on Aug. 25, 2015.

(30) Foreign Application Priority Data

Aug. 27, 2014    (EP) .................................... 14182528

(51) Int. Cl.
*H04B 7/155* (2006.01)
*H04W 52/02* (2009.01)
(Continued)

(52) U.S. Cl.
CPC ..... *H04B 7/15542* (2013.01); *H04B 7/15592* (2013.01); *H04W 52/0235* (2013.01);
(Continued)

(58) Field of Classification Search
None
See application file for complete search history.

(56) References Cited

U.S. PATENT DOCUMENTS

| | | | |
|---|---|---|---|
| 5,890,055 A * | 3/1999 | Chu | H04B 7/2606 455/16 |
| 7,418,715 B2 | 8/2008 | Pereira | |

(Continued)

FOREIGN PATENT DOCUMENTS

| | | |
|---|---|---|
| JP | H11215549 A | 8/1999 |
| JP | 2008530946 A | 8/2008 |

(Continued)

OTHER PUBLICATIONS

"Draft IEEE P802.15.3/D17", Draft Standard for Telecommunications and Information Exchange Between Systems—LAN/MAN Specific Requirements—Part 15.3: Wireless Medium Access Control (MAC) and Physical Layer (PHY) Specifications for High Rate Wireless Personal Area Networks (WPAN), Feb. 2003, 1-342.
(Continued)

*Primary Examiner* — Jamaal Henson
(74) *Attorney, Agent, or Firm* — Perkins Coie LLP; Michael A. Glenn

(57) ABSTRACT

A SUDAC includes a first and a second wireless communication interface and a processor. The first wireless communication interface is configured for using ultra-high frequency in order to establish at least one backend communication link with a base station. The second wireless communication interface is configured for using extremely-high frequency in order to establish at least one frontend communication link with a user equipment. The processor is configured for at least partially forwarding a user information signal received via the frontend communication link to be transmitted via the backend communication link while frequency converting the extremely-high frequency to the
(Continued)

ultra-high frequency vice versa. The processor is further configured for extracting control information from the user information signal and for controlling forward parameters of the first or the second wireless communication interface based on the control information.

24 Claims, 25 Drawing Sheets

(51) Int. Cl.
*H04W 72/04* (2009.01)
*H04W 74/08* (2009.01)

(52) U.S. Cl.
CPC ... *H04W 72/0406* (2013.01); *H04W 72/0453* (2013.01); *H04W 74/0833* (2013.01); *Y02D 70/1222* (2018.01); *Y02D 70/1262* (2018.01); *Y02D 70/1264* (2018.01); *Y02D 70/142* (2018.01); *Y02D 70/144* (2018.01); *Y02D 70/168* (2018.01); *Y02D 70/21* (2018.01); *Y02D 70/22* (2018.01); *Y02D 70/26* (2018.01); *Y02D 70/446* (2018.01)

(56) References Cited

U.S. PATENT DOCUMENTS

| | | | |
|---|---|---|---|
| 7,599,420 B2 | 10/2009 | Forenza et al. | |
| 7,761,050 B2 * | 7/2010 | Fitton | H04B 7/2606 455/7 |
| 8,050,291 B1 * | 11/2011 | Prasad | H04B 1/7163 370/467 |
| 8,743,758 B1 | 6/2014 | Bhargava et al. | |
| 2004/0121780 A1 | 6/2004 | Nasshan | |
| 2004/0229563 A1 * | 11/2004 | Fitton | H04B 7/2606 455/7 |
| 2007/0160014 A1 | 7/2007 | Larsson | |
| 2008/0130790 A1 | 6/2008 | Forenza et al. | |
| 2008/0165720 A1 * | 7/2008 | Hu | H04B 7/0632 370/315 |
| 2009/0034447 A1 | 2/2009 | Yu et al. | |
| 2009/0258652 A1 * | 10/2009 | Lambert | H04W 88/04 455/446 |
| 2009/0325479 A1 | 12/2009 | Chakrabarti et al. | |
| 2010/0080165 A1 | 4/2010 | Hossain et al. | |
| 2011/0249681 A1 | 10/2011 | Ayyar et al. | |
| 2012/0154239 A1 * | 6/2012 | Bar-Sade | H01Q 1/1242 343/839 |
| 2014/0079153 A1 * | 3/2014 | Kim | H03F 1/3247 375/297 |
| 2014/0153423 A1 * | 6/2014 | Shin | H04W 36/18 370/252 |
| 2014/0155054 A1 * | 6/2014 | Henry | H04W 36/22 455/422.1 |
| 2014/0171094 A1 * | 6/2014 | Noh | H04W 40/22 455/452.1 |
| 2014/0313914 A1 * | 10/2014 | Ling | H04W 24/02 370/252 |

FOREIGN PATENT DOCUMENTS

| | | | |
|---|---|---|---|
| JP | 2009517918 | A | 4/2009 |
| JP | 2009154279 | A | 7/2009 |
| JP | 2010087828 | A | 4/2010 |
| JP | 2010537577 | A | 12/2010 |
| JP | 2011071706 | A | 4/2011 |
| JP | 2011519221 | A | 6/2011 |
| JP | 2013135457 | A | 7/2013 |
| RU | 2419864 | C2 | 5/2011 |
| RU | 2476028 | C2 | 2/2013 |
| WO | 9843371 | A1 | 10/1998 |
| WO | 2005064872 | A1 | 7/2005 |
| WO | 2006088400 | A1 | 8/2006 |
| WO | 2007068999 | A1 | 6/2007 |
| WO | 2008004099 | A2 | 1/2008 |
| WO | 2012170044 | A1 | 12/2012 |

OTHER PUBLICATIONS

"Draft IEEE P802.15.4REVi/D09/\TM", IEEE Standard for Local and Metropolitan Area Networks—Part 15.4: Low-Rate Wireless Personal Area Networks (WPANs), 2006, Front-293.
"Frequenzverteilungsuntersuchung (BK1-11/0001)", Amtsblatt Nr. der Bundesnetzagentur, 2011, 1-67.
"IEEE P802.11-REVmc/D3.0", Draft Standard for Information Technology—Telecommunications and Information Exchange Between Systems Local and Metropolitan Area Networks—Specific Requirements, Part 11: Wireless LAN Medium Access Control (MAC) and Physical Layer (PHY) Specifications, New York, Jun. 2014.
"IEEE Std 802.15.3C/\TM", IEEE Standard for Information Technology—Telecommunication and Information Exchange Between Systems—Local and Metropolitan Area Networks—Specific Requirements Part 15.3: Wireless Medium Access Control (MAC) and Physical Layer (PHY) Specifications . . . , Amendment 2: Millimeter-Wave-based Alternative Physical Layer Extension, Oct. 12, 2009, Front Cover-187.
Abramson, Norman, "The Aloha System—Another Alternative for Computer Communications", 37 AFIPS Press, AFIDS Conference Proceedings (editor), 1970, 281-285.
Buratti, Chiara et al., "Capacity Analysis of Two-Hop Virtual MIMO Systems in a Poisson Field of Nodes", IEEE 69th Vehicular Technology Conference, Barcelona, Spain/ NJ, USA XP031474376, Apr. 2009, 1-6.
Karaoguz, Jeyhan , "Wireless HD Specification and Coexistence Capabilities", Doc. IEEE 802.11-09-0960-00-00ad, Sep. 21, 2009, slide 1-13.
Morioka, Yuichi et al., "802.11ad New Technique Proposal", Doc. IEEE 802.11-10/0259r02, Yuichi Morioka, Sony Corporation, Mar. 15, 2010, slide 1-20.
Ranvier, Sylvain et al., "Low-Cost Planar Omnidirectional Antenna for mm-Wave Applications", IEEE Antennas and Wireless Propagation Letters vol. 7, Piscataway, NJ, US XP011330791, Jan. 2008, 521-523.

* cited by examiner

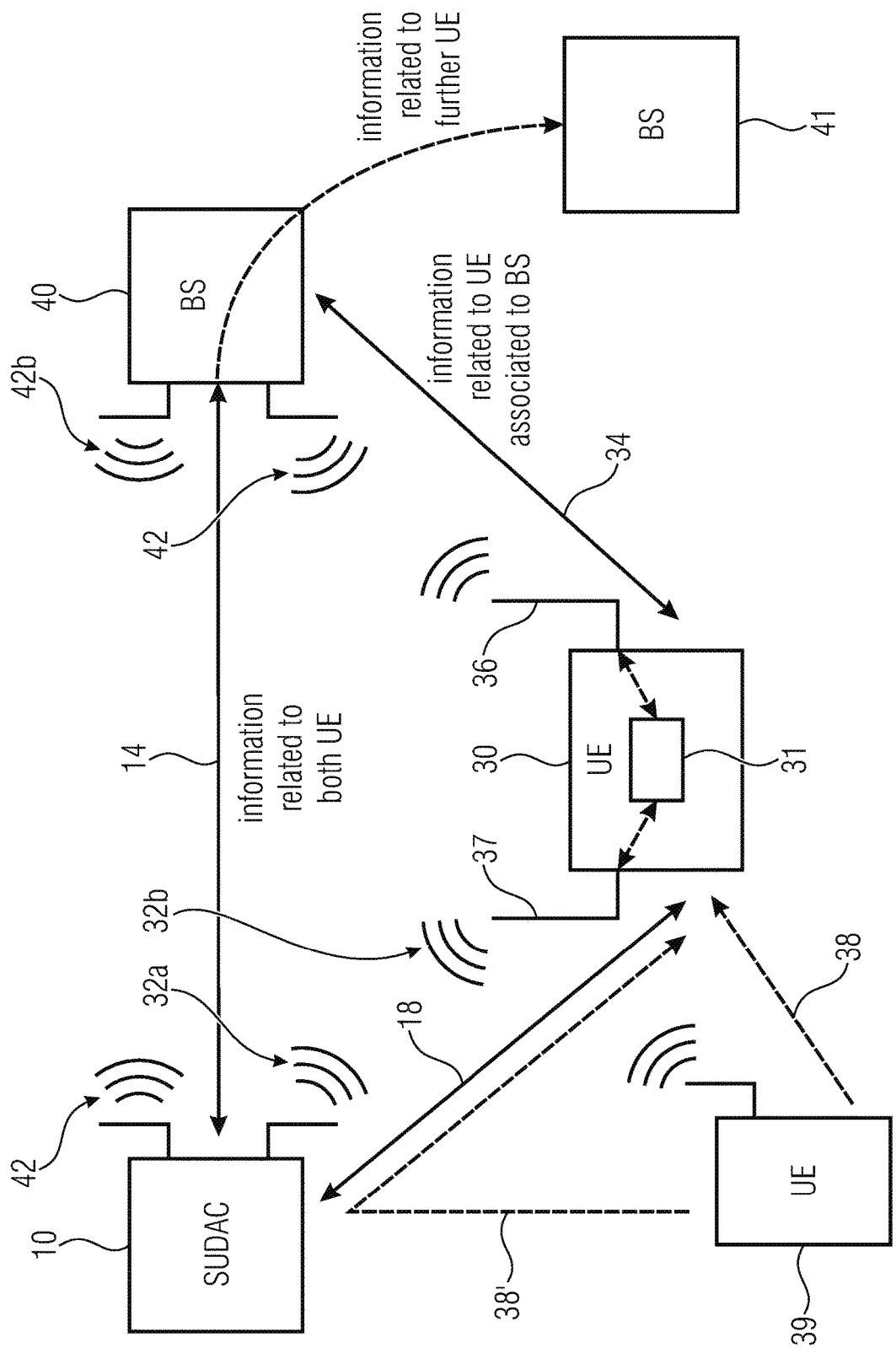

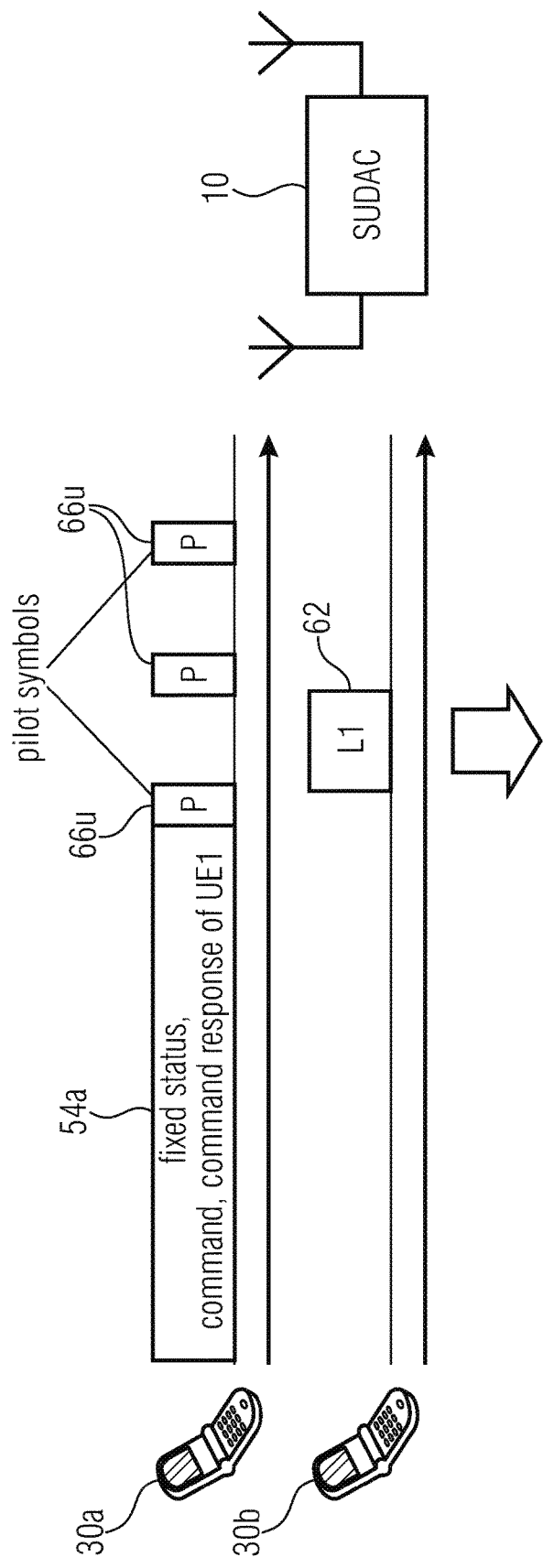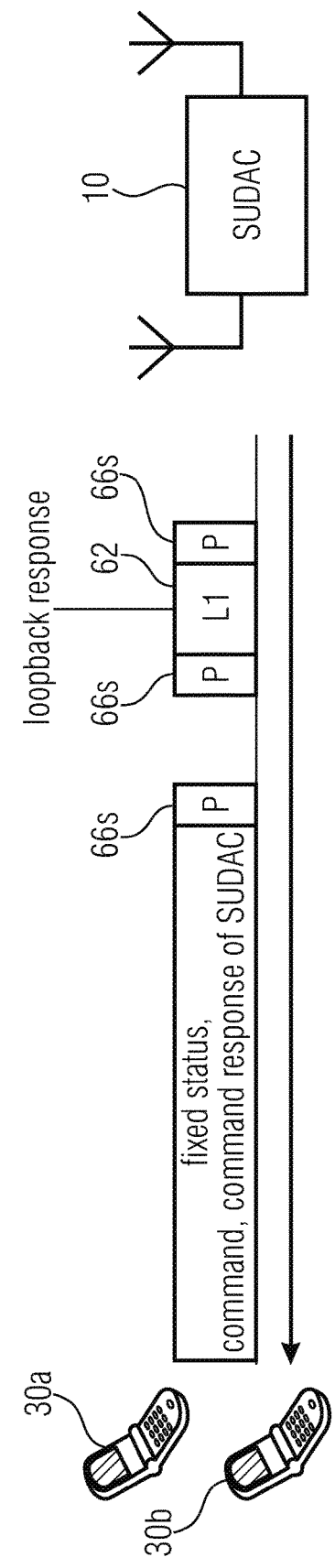
FIG 14A
FIG 14B

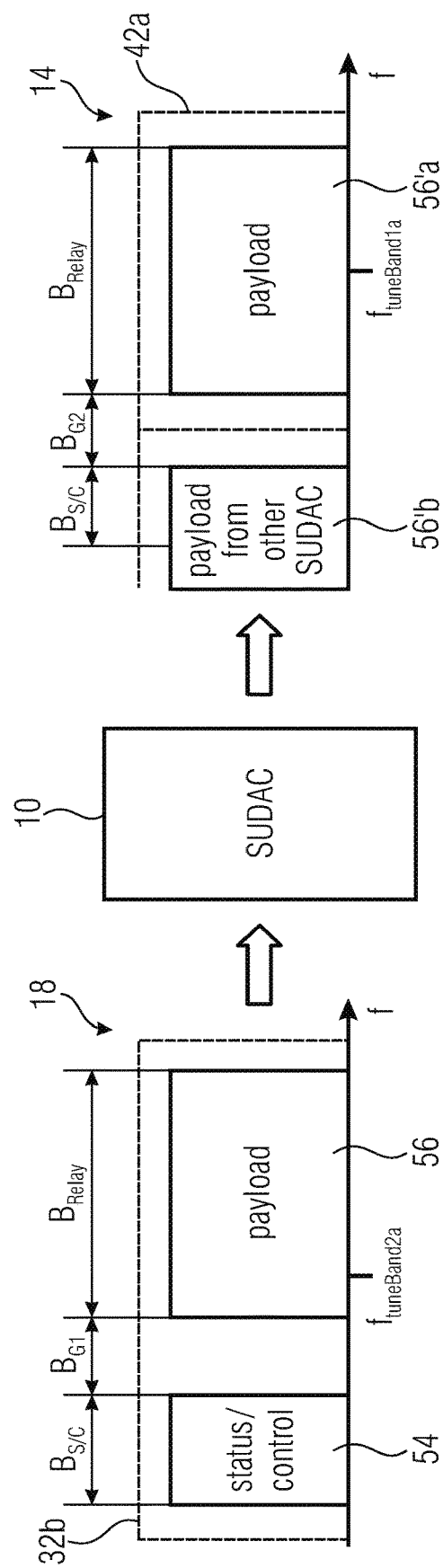
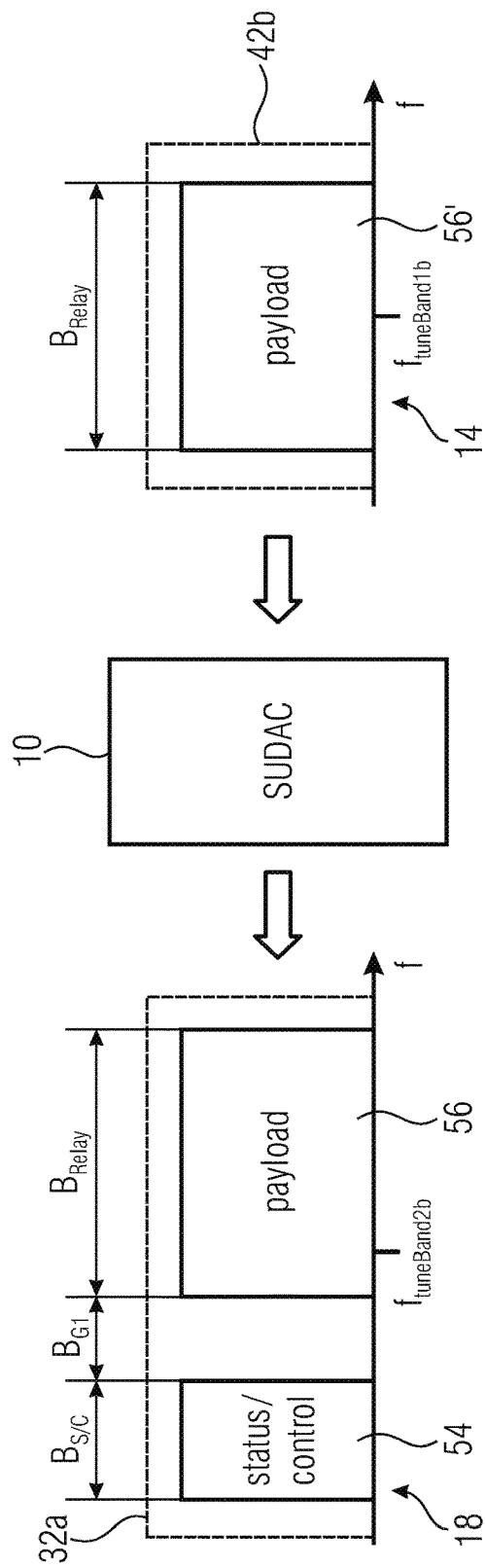
FIG 15A
FIG 15B

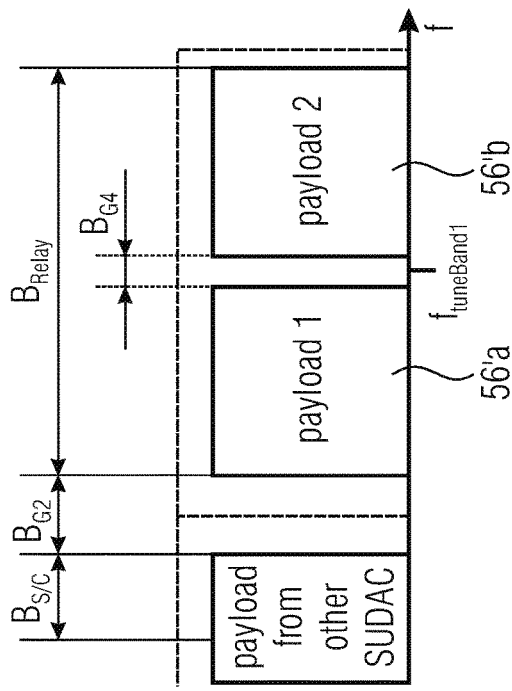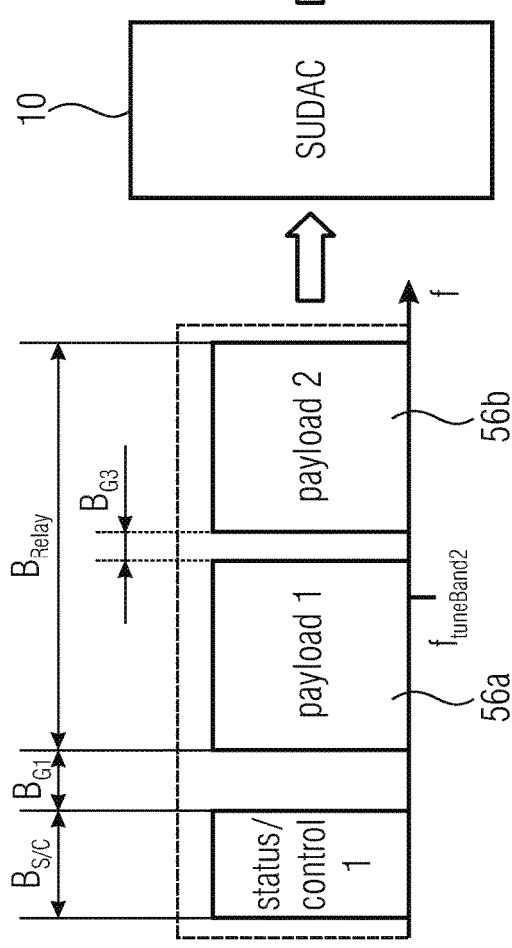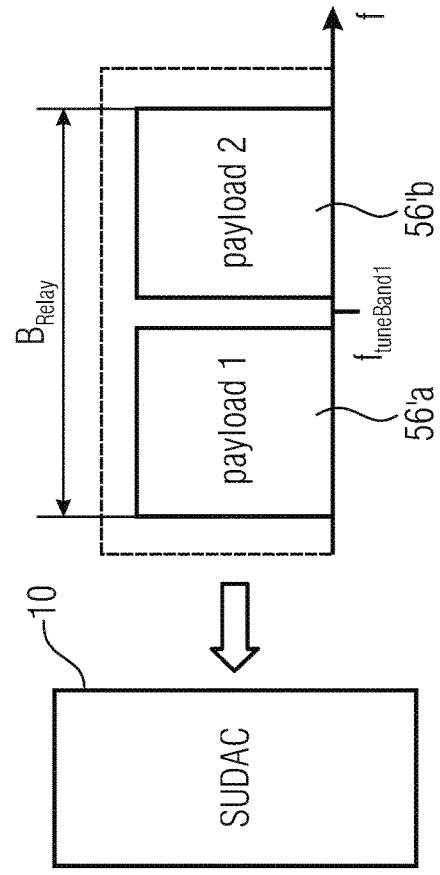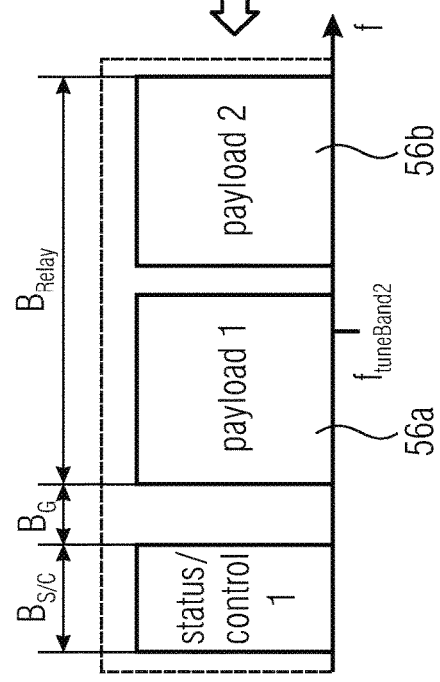
FIG 16A
FIG 16B

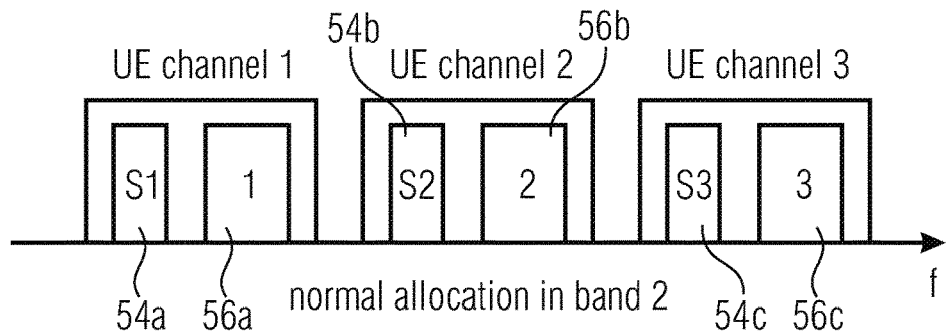
FIG 17A
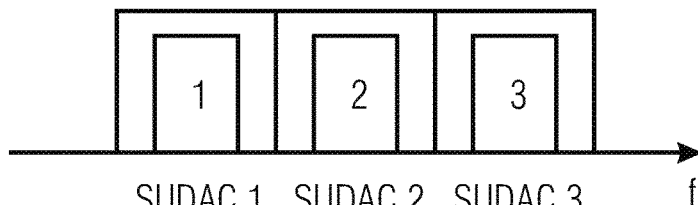
FIG 17B
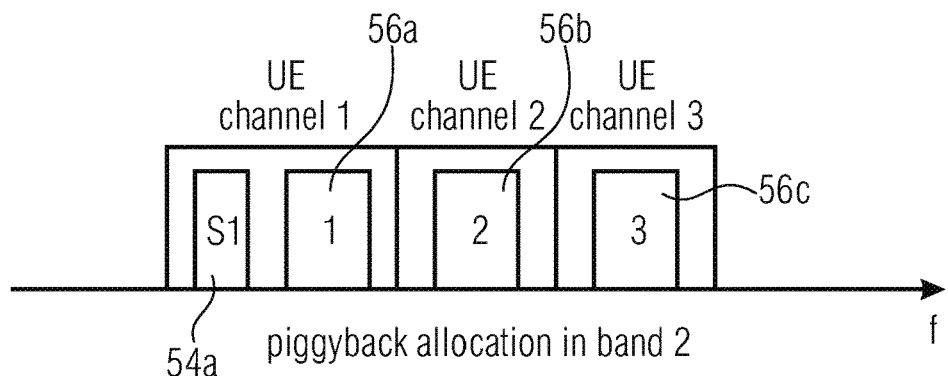
FIG 17C
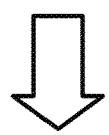
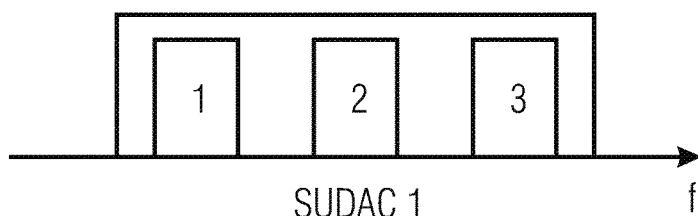
FIG 17D

| HRP channel index | start frequency[a] | center frequency | stop frequency[a] |
|---|---|---|---|
| 1 | 57.240 GHz | 58.320 GHz | 59.400 GHz |
| 2 | 59.400 GHz | 60.480 GHz | 61.560 GHz |
| 3 | 61.560 GHz | 62.640 GHz | 63.720 GHz |
| 4 | 63.720 GHz | 64.800 GHz | 65.880 GHz |

| LRP channel index | start frequency[a] | center frequency | stop frequency[a] |
|---|---|---|---|
| 1 | $f_{c(HRP)} - 207.625$ MHz | $f_{c(HRP)} - 158.625$ MHz | $f_{c(HRP)} - 109.625$ MHz |
| 2 | $f_{c(HRP)} - 49$ MHz | $f_{c(HRP)}$ | $f_{c(HRP)} + 49$ MHz |
| 3 | $f_{c(HRP)} + 109.625$ MHz | $f_{c(HRP)} + 158.625$ MHz | $f_{c(HRP)} + 207.625$ MHz |

FIG 25

SUDAC, USER EQUIPMENT, BASE STATION AND SUDAC SYSTEM

CROSS-REFERENCE TO RELATED APPLICATIONS

This application is a continuation of copending International Application No. PCT/EP2015/069474, filed Aug. 25, 2015, which is incorporated herein by reference in its entirety, and additionally claims priority from European Application No. EP 14182528.1, filed Aug. 27, 2014, which is also incorporated herein by reference in its entirety.

Embodiments of the present invention related to a SUDAC (Shared User Equipment-Side Distributed Antenna Component), to a user equipment and to a base station. Further embodiments relate to a SUDAC System, to a method for signal forwarding, to methods for transmitting or receiving a signal with a user equipment or with a base station. Further embodiments relate to a computer program. Further embodiments relate to Discovery, Resource Allocation and Communication Protocol for Shared UE-side Distributed Antenna Systems (SUDAS).

BACKGROUND OF THE INVENTION

Wireless networks aim to increase rates and amounts of data through the networks to allow for more users, more or enhanced services and/or faster transmission times.

Already during their deployment, current 4G mobile communications systems (like LTE-Advanced) appear to suffer from a shortage of data rate that can be provided to the users. It is expected that in the future, the data rate requested by the users grows considerably, which is mainly due to reception of video contents. There is a trend to an increased consumption of non-linear TV/video, i.e., video contents that is not being broadcast at the very moment of its consumption. Besides broadcast contents that is consumed at some later point after its transmission (like the offering of the TV channels' media centers) and that could be stored inside a cache in the user equipment (UE) until its consumption, there is a vast realm of content that cannot simply be distributed by conventional broadcast systems (satellite, terrestrial, cable TV) like YouTube videos. At the same time the contents consumed in the homes necessitates increasingly high data rate, for instance for Ultra High Definition TV (UHDTV) or 3D contents (with or without dedicated 3D-glasses).

Moreover, people exchange, i.e., down and upload increasingly large files. While this is currently photos of a couple of megabytes, people are going to download complete movies of many gigabytes from their mobile devices in the future. For such actions people are keen to keep the download times as short as possible, such that very high data rates in the order of ten gigabit/s are a realistic requirement for the future. As people are going to use cloud services to a greater extent in the future, there will be a need for fast synchronization of the contents on a mobile device with the cloud when people leave or enter the coverage of a mobile network, i.e. before they go off-line and after they return from on off-line state. The amount of data to synchronize could be quite large. All of this shows that transmission at very high data rates may be regarded as a requirement in the future for many (mobile and stationary) devices.

An alternative to using mobile communications like LTE for downloading such large files is the employment of a local area network (LAN), be it wireless (WLAN, W-Fi) or wired (Ethernet). However, the last mile from the backbone network to the homes cannot support the necessitated high data rates in the range of Gbit/s, except if optical fibers are used (fiber-to-the-home FTTH). However, the cost to equip the homes with FTTH is very high; for instance for Germany alone, the cost to equip every building with FTTH is estimated around 93 billion/milliard Euros. Therefore, we reckon that the last mile will eventually become a mainly wireless connection. This reduces the cost for bringing broadband to every building and its rooms significantly.

Moreover, most homes do not possess a dedicated wired LAN infrastructure (Ethernet) to distribute the data received over the last mile further, i.e., most homes employ Wi-Fi to connect their devices to the Internet by their access point (AP), where the AP represents the terminal point of the last mile. It should be observed that for reaching data rates of Gbit/s, either an Ethernet socket or an AP is present in one more or each room of every home or office building. Hence the cost of connecting each room of each building have to be added to the figure mentioned above for connecting the buildings.

Further the main structures of a network topology are centralized (e.g., IEEE802.11) or distributed (e.g., mobile ad hoc networks such as defined in IEEE802.15, which are also called piconets).

In a centralized architecture only the coordinating device is responsible for discovery and all the data traffic is routed through this device. In a distributed system there also exists peer to peer communication and discovery is supported, which may but not need to be independent of a coordinating device.

The upcoming standard IEEE802.11ad supports, as far as published yet, centralized and distributed structures. The distributed structures are also referred to as adhoc-peer to peer, independent basic service set (IBSS) and/or personal basic service set (PBSS). For discovery 3 low rate physical layer (LRP) channels per 2.16 GHz band are used for beacon transmission. FIG. 25 shows a frequency allocation by channel type as it is proposed in the IEEE802.11ad standard. The LRP frequencies are fixed. The discovery is based on beacon data transmissions by the device that wants to be discovered. In [1] it is proposed that IEEE802.11b,g,n or IEEE802.11a transmissions may be used to help in scheduling and managing the IEEE802.11ad devices. Directional relaying services are also planned for IEEE802.11ad. These will incorporate decode and forward methods. IEEE802.11 networks are using Time Division Duplex (TDD) for transmissions with or without acknowledgement. The initial synchronization on the time structure is done via carrier sense multiple access with collision avoidance (CSMA-CA).

In [2] it is described, how piconets as defined in IEEE802.15 are created and managed. A beacon is presented by the piconet coordinator (PNC) to which further devices in the network synchronize in time and frequency. As asynchronous discovery and communication, typically some implementation of the ALOHA protocol, as it is described in [3] is used. Provided by the PNC is a single framing structure (superframe) that is shared by the whole piconet. Within that a certain period of time is reserved for asynchronous transmissions, all other transmissions are scheduled by the PNC. Methods for dynamically changing the network layout or switching the PNC are defined. Also the scanning of frequency ranges for interference, beacons and channel quality is supported. The PNC decides on the single used frequency in the network (which may change over time to adjust to the interference conditions). Adhoc networks typically do not use the extremely-high frequency (EHF) band as the attenuation of the signals is very high in this frequency range and only line of sight (LOS)-transmissions are possible, wherein [4] provides an extension for mm-waves.

The main challenge for distributed mobile adhoc networks (MANETs) is the solving of the routing problem. For this the received data has to be analyzed and at least the routing relevant information has to be extracted. Adhoc networks are usually very sensitive in the scope of power consumption and they provide sophisticated mechanisms for sleep mode and for how to recover from that while still keeping the network information. There are implementations on localizing the partners in the network to allow the use of beamforming.

For all the realizations discussed above it is common that they are designed to provide a point to point reliability of data transmission. This is ensured by different scheduling and data-acquisition schemes. For example, this may be a common control channel for all devices.

In the state of the art systems frequency, time, code and space are seen as the limited resources that are to be shared and allocated in the best possible way. This is done for one device, be it a real central management unit or a local PNC.

SUMMARY

According to an embodiment, a SUDAC may have: a first wireless communication interface, configured for using ultra-high frequency in order to establish at least one backend communication link with a base station; and a second wireless communication interface, configured for using extremely-high frequency in order to establish at least one frontend communication link with a user equipment; and a processor, wherein the processor is configured for at least partially forwarding a first user information signal received via the frontend communication link as a first communication signal to be transmitted via the backend communication link while frequency converting the extremely-high frequency to the ultra-high frequency; or wherein the processor is configured for at least partially forwarding a second communication signal received via the backend communication link as a second user information signal to be transmitted via the frontend communication link while frequency converting the ultra-high frequency to the extremely-high frequency; wherein the processor is configured for extracting control information from the first user information signal and for controlling forward parameters of the first or the second wireless communication interface based on the control information, wherein the control information is a transmit power, a modulation scheme or is related to a frequency, a code, a space and/or a time slot to be utilized by the SUDAC; wherein the forward parameters relates at least to one of a time, a frequency, a space or a code resource of the backend communication link or the frontend communication link; and wherein the processor is configured for frequency converting the first user information signal received at extremely-high frequency to the first communication signal at the ultra-high frequency and for frequency converting the second communication signal at the ultra-high frequency to the second user information signal at the extremely-high frequency; or wherein the SUDAC comprises an analog to digital converter configured for digitizing the user information signal received at extremely-high frequency, and a digital to analog converter configured for analogizing a digitalized communication signal at the ultra-high frequency wherein the processor is configured for generating the digitalized communication signal based on the digitalized user information signal.

According to another embodiment, a SUDAC may have: a first wireless communication interface, configured for using ultra-high frequency in order to establish at least one backend communication link with a base station; and a second wireless communication interface, configured for using extremely-high frequency in order to establish at least one frontend communication link with a user equipment; and a processor, wherein the processor is configured for at least partially forwarding a first user information signal received via the frontend communication link as a first communication signal to be transmitted via the backend communication link while frequency converting the extremely-high frequency to the ultra-high frequency; or wherein the processor is configured for at least partially forwarding a second communication signal received via the backend communication link as a second user information signal to be transmitted via the frontend communication link while frequency converting the ultra-high frequency to the extremely-high frequency; wherein the processor is configured for extracting control information from the first user information signal and for controlling forward parameters of the first or the second wireless communication interface based on the control information; wherein the forward parameters relates at least to one of a time, a frequency, a space or a code resource of the backend communication link or the frontend communication link; and wherein the processor is configured for frequency converting the first user information signal received at extremely-high frequency to the first communication signal at the ultra-high frequency and for frequency converting the second communication signal at the ultra-high frequency to the second user information signal at the extremely-high frequency; or wherein the SUDAC comprises an analog to digital converter configured for digitizing the user information signal received at extremely-high frequency, and a digital to analog converter configured for analogizing a digitalized communication signal to obtain the communication signal at the ultra-high frequency wherein the processor is configured for generating the digitalized communication signal based on the digitalized user information signal; wherein the frontend communication link comprises a plurality of control channels and at least one payload channel, wherein the payload channel is associated to a control channel and wherein the processor is configured for adapting parameters of the control channel to which the payload channel is associated based on the control information and wherein the processor is configured to forward information of the payload channel, wherein a bandwidth of the control channel, of a rendezvous-channel comprising a plurality of control channels and/or of the payload channel is adapted based on the adapting of the parameters.

According to another embodiment, a SUDAC may have: a first wireless communication interface, configured for using ultra-high frequency in order to establish at least one backend communication link with a base station; and a second wireless communication interface, configured for using extremely-high frequency in order to establish at least one frontend communication link with a user equipment; and a processor, wherein the processor is configured for at least partially forwarding a first user information signal received via the frontend communication link as a first communication signal to be transmitted via the backend communication link while frequency converting the extremely-high frequency to the ultra-high frequency; or wherein the processor is configured for at least partially forwarding a second communication signal received via the backend communication link as a second user information signal to be transmitted via the frontend communication link while frequency converting the ultra-high frequency to the extremely-high frequency; wherein the processor is configured for extracting control information from the first user information signal and for controlling forward parameters of the first or the second wireless communication interface based on the control information; wherein the forward parameters relates at least to one of a time, a frequency, a space or a code resource of the backend communication link or the frontend communication link; and wherein the processor is configured for frequency converting the first user information signal received at extremely-high frequency to the first communication signal at the ultra-high frequency and for frequency converting the second communication signal at the extremely-high frequency to the second user information signal at the ultra-high frequency; or wherein the SUDAC comprises an analog to digital converter configured for digitizing the user information signal received at extremely-high frequency, and a digital to analog converter configured for analogizing a digitalized communication signal to obtain the communication signal at the ultra-high frequency wherein the processor is configured for generating the digitalized communication signal based on the digitalized user information signal; wherein the first wireless communication interface is configured for establishing a further backend communication link to a further base station, using the ultra-high frequency, wherein the SUDAC is configured for receiving the first user information signal from the user equipment via the frontend communication link, wherein the first user information signal comprises a first information related to the user equipment and to the base station and a second information related to a further user equipment and to the further base station, wherein the SUDAC is configured for converting the extremely-high frequency and the first information to the ultra-high frequency and for converting the extremely-high frequency and the second information to the further ultra-high frequency.

According to another embodiment, a user equipment may have: a first wireless communication interface configured for using ultra-high frequency in order to establish at least one direct communication link with a base station; and a second wireless communication interface configured for using extremely-high frequency in order to establish at least one frontend communication link with a SUDAC; wherein the user equipment is configured for receiving a user signal partially via the direct communication link and partially via the frontend communication link; wherein the user equipment is associated to the base station; wherein the user equipment is configured for generating the first user information signal based on an information received from a further user equipment associated to a further base station such that the first user information signal comprises information related to the user equipment and information related to the further user equipment.

According to another embodiment, a base station may have: a plurality of wireless communication interfaces; a controller configured for controlling the plurality of wireless communication interfaces such that a multiple antenna function of the plurality of wireless communication interfaces is obtained; wherein the base station is configured for receiving control information via at least one of the plurality of wireless communication interfaces, related to a SUDAC or a user equipment communicating with the base station; wherein the controller is configured for adapting transmission characteristics of the multiple antenna function based on the control information; wherein the further user equipment is associated to a further base station and not to the base station.

According to another embodiment, a SUDAC System may have: an inventive SUDAC; an inventive user equipment; and an inventive base station.

According to another embodiment, a method for signal forwarding may have the steps of: using ultra-high frequency in order to establish at least one backend communication link with a base station; and using extremely-high frequency in order to establish at least one frontend communication link with a user equipment; frequency converting the extremely-high frequency to the ultra-high frequency and at least partially forwarding a user information signal received via the frontend communication link as a communication signal to be transmitted via the backend communication link; or frequency converting the ultra-high frequency to the extremely-high frequency and at least partially forwarding the communication signal received via the backend communication link as the user information signal to be transmitted via the frontend communication link; extracting control information from the user signal and controlling forward parameters of a first or a second wireless communication interface based on the control information, wherein the control information is a transmit power, a modulation scheme or is related to a frequency, a code, a space and/or a time slot to be utilized by the SUDAC; and frequency converting the user information signal received at extremely-high frequency to the communication signal at the ultra-high frequency and frequency converting the communication signal at the extremely-high frequency to the communication signal at the ultra-high frequency; or digitizing the user information signal received at extremely-high frequency, and analogizing a digitalized communication signal to obtain the communication signal at the ultra-high frequency and generating the digitalized communication signal based on the digitized user information signal.

According to another embodiment, a method for transmitting or receiving a signal with a user equipment may have the steps of: using ultra-high frequency in order to establish at least one direct communication link with a base station; using extremely-high frequency in order to establish at least one frontend communication link with a SUDAC; receiving a user signal at least partially via the frontend communication link with a user equipment associated to the base station; and generating the user information signal based on an information received from a further user equipment associated to a further base station such that the user information signal comprises information related to the user equipment and information related to the further user equipment.

According to another embodiment, a method for transmitting or receiving a signal with a base station may have the steps of: controlling a plurality of wireless communication interfaces of the base station such that a multiple antenna function of the plurality of wireless communication interfaces is obtained; receiving control information via at least one of the plurality of wireless communication interfaces, related to a SUDAC or a user equipment communicating with the base station; and adapting transmission characteristics of the multiple antenna function based on the control information.

Another embodiment may have a non-transitory digital storage medium having a computer program stored thereon to perform the method for signal forwarding using ultra-high frequency in order to establish at least one backend communication link with a base station; and using extremely-high frequency in order to establish at least one frontend communication link with a user equipment; frequency converting the extremely-high frequency to the ultra-high frequency and at least partially forwarding a user information signal received via the frontend communication link as a communication signal to be transmitted via the backend communication link; or frequency converting the ultra-high frequency to the extremely-high frequency and at least partially forwarding the communication signal received via the backend communication link as the user information signal to be transmitted via the frontend communication link; extracting control information from the user signal and controlling forward parameters of a first or a second wireless communication interface based on the control information, wherein the control information is a transmit power, a modulation scheme or is related to a frequency, a code, a space and/or a time slot to be utilized by the SUDAC; and frequency converting the user information signal received at extremely-high frequency to the communication signal at the ultra-high frequency and frequency converting the communication signal at the extremely-high frequency to the communication signal at the ultra-high frequency; or digitizing the user information signal received at extremely-high frequency, and analogizing a digitalized communication signal to obtain the communication signal at the ultra-high frequency and generating the digitalized communication signal based on the digitized user information signal, when said computer program is run by a computer.

Another embodiment may have a non-transitory digital storage medium having a computer program stored thereon to perform the method for transmitting or receiving a signal with a user equipment using ultra-high frequency in order to establish at least one direct communication link with a base station; using extremely-high frequency in order to establish at least one frontend communication link with a SUDAC; receiving a user signal at least partially via the frontend communication link with a user equipment associated to the base station; and generating the user information signal based on an information received from a further user equipment associated to a further base station such that the user information signal comprises information related to the user equipment and information related to the further user equipment, when said computer program is run by a computer.

Another embodiment may have a non-transitory digital storage medium having a computer program stored thereon to perform the method for transmitting or receiving a signal with a base station controlling a plurality of wireless communication interfaces of the base station such that a multiple antenna function of the plurality of wireless communication interfaces is obtained; receiving control information via at least one of the plurality of wireless communication interfaces, related to a SUDAC or a user equipment communicating with the base station; and adapting transmission characteristics of the multiple antenna function based on the control information, when said computer program is run by a computer.

Teachings disclosed herein are based on the fundamental idea that data transmission may be optimized by controlling a SUDAC such that transmission of the SU DAC in the direction of the base station or in the direction of the user equipment is enhanced based on a user equipment driven controlling of the SUDAC from a local (user equipment) point of view and/or based on a base station driven controlling. The base station may implement the controlling from a local point of view such that resources of the base station are utilized more efficiently or from a global point of view considering a plurality or all of the components of the SUDAC System (network) such that a use of the resources is optimized within the whole network.

An embodiment provides a SUDAC comprising a first wireless communication interface, a second wireless communication interface and a processor. The first wireless communication interface is configured for using ultra-high frequency in order to establish at least one backend communication link with a base station. The second wireless communication interface is configured for using extremely-high frequency in order to establish at least one frontend communication link with a user equipment. The processor is configured for forwarding a user information signal received via the frontend communication link at least partially (e.g. a payload portion of the user information signal) as a communication signal to be transmitted via the backend communication link while frequency converting the extremely-high frequency to the ultra-high frequency. The processor is further configured for alternatively or additionally forwarding the communication signal received via the backend communication link as the user information signal to be transmitted via the frontend communication link while frequency converting the ultra-high frequency to the extremely-high frequency. The processor is further configured for extracting control information from the user information signal and for controlling forward parameters of the first or the second wireless communication interface based on the control information. The forward parameters relate at least to one of a time, frequency, space or code resource of the backend communication link or the frontend communication link.

The processor is configured for frequency converting the user information signal received at extremely-high frequency to the communication signal at the ultra-high frequency and for frequency converting the communication signal at the extremely-high frequency to the communication signal at the ultra-high frequency. Alternatively or in addition the SUDAC comprises an analog to digital converter configured for digitizing the user information signal received at extremely-high frequency, and a digital to analog converter configured for analogizing a digitalized communication signal to obtain the communication signal at the ultra-high frequency wherein the processor is configured for generating the digitalized communication signal based on the digitalized user information signal.

When the processor is configured for frequency converting the user information signal received at extremely-high frequency to the communication signal at the ultra-high frequency and for frequency converting the communication signal at the extremely-high frequency to the communication signal at the ultra-high frequency, a payload portion of the communication signal or the user information signal may be forwarded in a purely analog way. This may allow for an implementation of the SUDAC without analog-digital and digital-analog converters for receiving and transmitting the user information signal and/or the communication signal. Such SUDACs may be also referred to as analog SUDACs (aSUDAC).

A forwarding based on frequency conversion without digitizing the signals allows for low-cost SUDACs and for a reduced time delay as time consuming data processing may be skipped. An implementation of the SUDAC in which the SUDAC comprises the analog to digital converter configured for digitizing the user information signal and further comprises a digital to analog converter configured for analogizing the digitalized communication signal (referred to as digital SUDAC—dSUDAC) allows for flexible filtering of the signal e.g. for interference or out of band noise reduction but also can be used for modifying the signal during the forwarding process, e.g., by adding or removing information, changing a modulation type etc. The control information may be received from a user equipment such as a laptop, a PC, a mobile phone or the like or may be received from a base station.

According to a further embodiment, a user equipment is provided comprising a first wireless communication interface and a second wireless communication interface. The first wireless communication interface is configured for using ultra-high frequency in order to establish at least one direct communication link with a base station. The second wireless communication interface is configured for using extremely-high frequency in order to establish at least one frontend communication link with a SUDAC. The user equipment is configured for receiving a user signal partially via the direct communication link and at least partially via the frontend communication link. The user equipment is associated to the base station (e.g., the base station may be a service provider of the user equipment) and configured for generating the user information signal based on an information received from a further user equipment associated to a further base station such that the user information signal comprises information related to the user equipment and information related to the further user equipment.

This allows for the advantage that the user equipment may provide the further user equipment a so called piggyback mode such that the further user equipment may transmit data to the SUDAC and/or to the base station without maintaining an own communication link to the SUDAC or to the base station. Further, a SUDAC that is exclusively controlled (used) by a base station or the user equipment may be used as data forwarding apparatus (relay) without controlling it. By inserting the information of the further user equipment into the message or the signal generated by the user equipment, an overhead of a message of the further user information may be avoided such that resource utilization in the network in terms of increasing amount of payload data transferred within the network is enhanced.

According to further embodiments, a base station is provided. The base station comprises a plurality of wireless communication interfaces and a controller configured for controlling the plurality of wireless communication interfaces such that a multiple antenna function, e.g., a multiple input multiple output function or a beamforming function, of the plurality of wireless communication interfaces is obtained. The base station is configured for receiving control information via at least one of the plurality of wireless communication interfaces, the control information related to a SUDAC or an user equipment communicating with the base station.

The controller is configured for adapting transmission characteristics of the multiple antenna function based on the control information.

This allows for the advantage that a base station operating mode may be adjusted based on information and/or commands from the SUDAC and/or from the user equipment. Further, information may be provided to the base station by the SUDAC and/or the user equipment, the information indicating that the base station is requested to organize or reorganize the network. Both options allow for an increase in network efficiency in terms of resource allocation.

According to a further embodiment, a SUDAC System (SUDAS) is provided. The SUDAC System comprises a SUDAC, a base station and a user equipment.

According to further embodiments, methods for signal forwarding and for transmitting or receiving a signal with a user equipment or with a base station are provided.

According to a further embodiment, a computer program for those methods is provided.

BRIEF DESCRIPTION OF THE DRAWINGS

Embodiments of the present invention will be detailed subsequently referring to the appended drawings, in which:

FIG. 3a is a schematic block diagram of the user equipment maintaining a direct communication link to a base station and a frontend communication link to the SUDAC according to an embodiment;

FIG. 14a is an illustration of an association of the user equipment and the control/status channel of the SUDAC according to an embodiment;

FIG. 14b is an illustration of a retransmission of the SUDAC in which the loopback response is inserted between two pilot symbols according to an embodiment;

FIG. 15a is the conversion of the frontend communication link to the backend communication link in an upload direction according to an embodiment;

FIG. 15b is a conversion of the SUDAC in a downlink direction according to an embodiment;

FIG. 16a is a situation modified when compared to the FIGS. 13a and 13b according to an embodiment, wherein a bandwidth for payload is larger;

FIG. 16b is a situation according to FIG. 16a in which the transmission direction is swapped;

FIGS. 17a-d are a comparison between a normal allocation and a piggyback allocation of a transmission media according to an embodiment;

FIG. 25 is a frequency allocation by channel type as it is proposed in the IEEE802.11ad standard according to conventional technology.

DETAILED DESCRIPTION OF THE INVENTION

Below, embodiments of the present invention will be discussed in detail, wherein identical reference numbers are provided to objects having identical or similar functions, so that the description thereof is interchangeable or mutually applicable.

In the following, reference will be made to ultra-high frequencies and extremely-high frequencies. Ultra-high frequencies relate to frequencies in a range from at least 300 MH to 6 GHz. Extremely-high frequency relates to frequencies in a range from at least 30 GHz up to 300 GHz and advantageously to the so called 60 GHz band utilizing frequencies in the range between 57 and 64 GHz. Ultra-high frequencies are used, for example, in mobile communication networks such as for GSM and/or LTE (Long Term Evolution) and is suitable for transferring data to or from a mobile device and from other mobile devices or a base station. Other frequency bands such as the extremely-high frequency band provide higher bandwidth but waves transmitted at such frequencies (so called millimeter-waves) suffer from high attenuation such that a line-of-sight (LOS) connection is advantageous between communication partners to allow for reliable data transfer.

In the following, the term beacon relates to a control channel in the EHF band hosting information about SUDAS, its configuration, and reference data (=pilots). The term payload relates to relayed signal via SUDAS from BS to UE or vice versa. The term frontend relates to a communication in the EHF (approximately 60 GHz) band and the term backend relates to a communication in the s6G (sub 6 GHz, i.e., below 6 GHz) band.

In the following, reference will first be made to SUDACs (Shared User Equipment-Side Distributed Antenna Components) according to embodiments. The SUDACs may be regarded, when expressed simplified, as a signal repeating device configured for transmitting data signals on the ultra-high frequency and/or on the extremely-high frequency while retransmitting a received data signal and/or while frequency converting signals from one frequency range to another and vice versa. Afterwards, reference will be made to a user equipment according to a further embodiment. Afterwards, reference will be made to a base station according to a further embodiment before a SUDAC System comprising a SUDAC, a user equipment and a base station according to embodiments is described.

Figure 1:
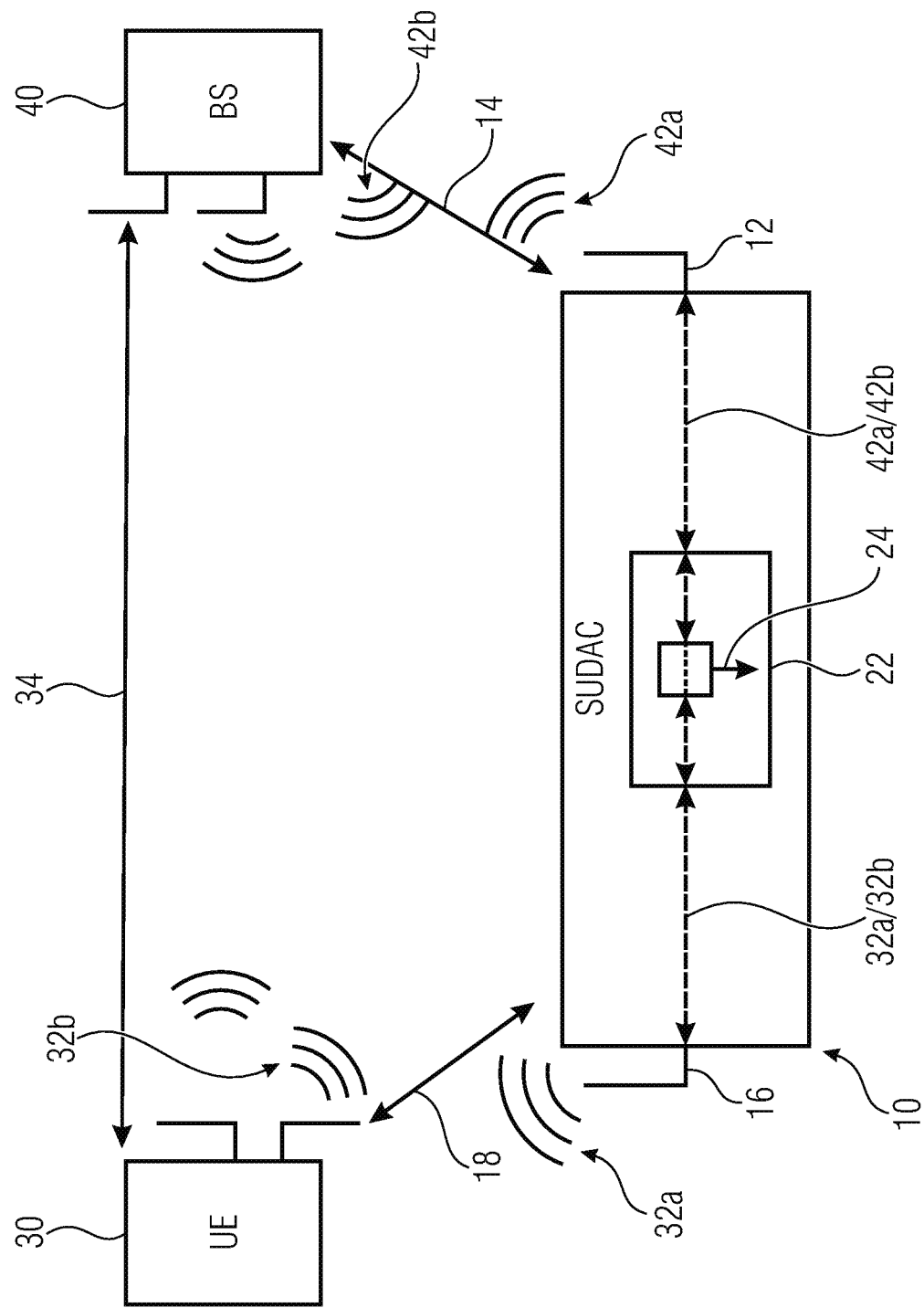
FIG. 1 is a schematic block diagram of a SUDAC which is a shared user equipment-side distributed antenna component according to an embodiment.

FIG. 1 shows a schematic block diagram of a SUDAC 10 which is a shared user equipment-side distributed antenna component, i.e., an apparatus for forwarding signals while frequency converting the signals. The SUDAC 10 comprises a first wireless communication interface 12 which is configured for using ultra-high frequency to establish at least one backend communication link 14 with a base station 40 by transmitting the communication signal 42a to be received from the base station 40 and by receiving the communication signal 42b from the base station 40. The backend communication link 14 may be a unidirectional data link from the base station 40 to the SUDAC 10 (downlink) or from the SUDAC 10 to the base station 40 (uplink). Alternatively, the backend communication link 14 may be a bidirectional data link implementing both, the uplink and the downlink.

The SUDAC 10 comprises a second wireless communication interface 16 which is configured for using extremely-high frequency to establish at least one frontend communication link 18 with a user equipment 30 by transmitting the user information signal 32a to be received from the user equipment 30 and by receiving the user information signal 32b from the user equipment 30. As it was described for the backend communication link 14 the frontend communication link 18 may be a unidirectional (uplink or downlink) or a bidirectional link.

The SUDAC 10 comprises a processor 22 which is configured for at least partially forwarding a user information signal 32b received via the frontend communication link 18 as at least a part of a communication signal 42a which is to be converted and to be transmitted via the backend communication link 14. The processor 22 is configured for frequency converting the extremely-high frequency implemented in the frontend communication link 18 to the ultra-high frequency implemented in the backend communication link 14 and for at least partially transmitting the communication signal 42a based on the user information signal 32b. The conversion may be based, for example, on a reception of a signal and based on a generation of a new signal. Alternatively or in addition, the received signal may be converted based on a demodulation and a modulation of the received signal to a different carrier. The user equipment may exchange information with the base station partially (and partially via the direct communication link 34) or completely (i.e., no direct communication link 34 is established) via the frontend communication link 18 and the backend communication link 14. The received user information signal 32b may comprise a portion (payload) to be forwarded to the base station 40 and control information 24.

The SUDAC 10 may be a stand-alone device. Alternatively, the SUDAC 10 may be integrated into other devices such as (light-) switches, plug sockets in buildings, devices in cars or the like. The SUDAC 10 may also be part of a further wireless communication device such as a mobile phone, a router or the like. The SUDAC 10 may establish backend communication links 14 to more than one base station and/or a plurality of backend communication links 14 to the base station 40 at a time. Alternatively or in addition the SUDAC 10 may also establish more than one frontend communication links 18 to the user equipment 30 and/or frontend communication links 18 to more than user equipment.

The SUDAC 10 may be configured to transmit the communication signal 42a based on the payload and without the control information 24 or with (possibly different or changed) control information 24. Alternatively or in addition the received communication signal 42b comprises the payload and optionally the control information 24. The SUDAC 10 may be configured to transmit the user information signal 32a based on the payload and based on a generated or modified control information 24. In simple words, the control information 24 may be transmitted (unidirectional or bidirectional) as a point to point information between the user equipment 30 and the SUDAC 10 and/or between the SUDAC 10 and the base station 40. The payload may be forwarded from the base station 40 to the user equipment 30 via the SUDAC 10 or vice versa.

By this an indirect data link may be implemented between the user equipment 30 and the base station 40 via the SUDAC 10 which is from the point of view of the user equipment 30 an uplink connection.

The processor 22 is further configured for forwarding the communication signal 42b received via the backend communication link 14 as the user information signal 32a which is to be transmitted via the frontend communication link 18. The processor 22 is configured for frequency converting the ultra-high frequency to the extremely-high frequency. This allows for a further indirect data communication link between the user equipment 30 and the base station 40 which is, from the point of view of the user equipment 30 a downlink connection. The processor 22 may further be configured for applying further processing to the signal such as decoding and/or encoding.

The processor 22 is configured for extracting control information 24 from the user information signal 32b and/or from the communication signal 42b and for controlling forward parameters of the first or the second wireless communication interface 12 or 16 based on the control information 24. Alternatively or in addition, the processor may also be configured for combining the control information 24 with the signal to be transmitted or forwarded. For example, the portion of the communication signal 42b to be forwarded may be combined with the control information 24 such that the user information signal 32a comprises the portion of the communication signal (payload) and the control information.

The control information 24 may be received via the user information signal 32b, for example, when being incorporated into a header or a predetermined part of the user information signal 32b. Alternatively, or in addition, the SUDAC 10 may also be configured for receiving and extracting control information from the communication signal 32b. The control information 24 may be, for example, a transmit power, a modulation scheme and/or a parameter related to a resource utilized by the SUDAC 10. The SUDAC 10 may be implemented to utilize transmission media in terms of a time division duplex (TDD), a frequency division duplex (FDD) and/or a space division duplex (SDD). Thus, the control information 24 may be related to a frequency, a code, a space and/or a time slot (resource) to be utilized by the SUDAC 10, in particular by the wireless communication interfaces 12 and/or 16.

The processor 22 may be configure for a frequency converting the user information signal 32b to the communication signal 42a and for frequency converting the communication signal 32b to the communication signal 32a.

Alternatively or in addition and as it will be described with reference to FIG. 2, the SUDAC 10 may comprise analog to digital converters (ADC) and digital to analog converters (DAC) which allow for digitizing a received signal 32b or 42b, for processing, evaluating and/or manipulating (modifying) the digitized signal and afterwards for analogizing and transmitting the signal. This allows for a high flexibility with respect to resource utilization as the user information signal 32a and/or the communication signal 42a may be adapted (modified) such that utilization of the restricted resources is enhanced. A SUDAC comprising a digital frontend comprising the ADCs and DACs may be referred to as a digital SUDAC (dSUDAC).

If the SUDAC 10 is realized without the above mentioned ADCs and DACs the SUDAC 10 may implement the frequency converting and signal forwarding in an analog way and may thus be referred to as an analog SUDAC (aSUDAC).

The SUDAC 10 may comprise filters for filtering received and/or transmitted signals 32a, 32b 42a and/or 42b. The filters may be implemented as digital filters or as analog filters. An analog filter may be implemented partially implicitly in the mixer stages and the used antennas of the wireless communication interfaces. In case of frequency separation between payload and status/control channels, the control information 24 may be extracted by a narrowband filter. The SUDAC may comprise a (narrowband) ADC for digitalizing the extracted control information 24 such that the control information may be evaluated by the SUDAC 10. Further, the SUDAC 10 may comprise a (narrowband) DAC for analogizing the control information that may be transmitted.

The frontend communication link 18 and the backend communication link 14 together form a so called relay link which is a supporting link supporting communication between the user equipment 30 and the base station 40 which may maintain a direct communication link 34. The direct communication link 34 may be a regular mobile communication link, for example, between a mobile phone and a base station, when the user equipment 30 is a mobile phone. The user equipment 30 may be any mobile or immobile device configured for communication in a mobile communication network. For example, the user equipment 30 may be a laptop, a mobile phone, in particular, a so called smartphone, a tablet computer, a PC, a television device and/or a radio device.

The base station 40 is configured for providing services like data communication to the user equipment 30 and may be, for example, a transmitting mast comprising a plurality of transmitting antennas. Alternatively, the base station 40 may be implemented as a plurality of transmitting masts each comprising at least one transmitting antenna and be controlled to implement one virtual base station utilizing the plurality of transmitting masts. The several transmitting masts may form a base station network group, i.e., different transmitting nodes of a service provider. Thus, the base station 40 may implement a multi antenna function (Multiple Input Multiple Output—MIMO), for example, a beamforming function to enhance transmission quality along a beam direction and/or a spatial multiplexing function, i.e., each wireless communication interface (antenna) is configured for transmitting an independent signal, utilization of antenna diversity and/or a space-time-coding function, i.e., to transmit subsequent symbols signals are transmitted by the wireless communication interfaces, wherein the signals are related to each other based on a code utilized. This allows for maintaining a plurality or even a multitude of communication links to a plurality or a multitude of other devices. Thus, the SUDAC may be integrated into a mobile communication network as a virtual antenna of the user equipment 30 and/or of further user equipment. This allows for the base station 40 adapting its communication to the user equipment 30 in order to utilize the "regular" antenna of the user equipment 30 and the further (virtual) antenna such that the connection between the user equipment 30 and the base station 40 is enhanced. Alternatively, the communication between the user equipment 30 and the base station 40 may completely be provided via the relay link, e.g., when the direct communication link 34 is lost, for example, inside a building.

The user equipment 30 may utilize the SUDAC 10 as an external antenna, i.e., the user equipment 30 controls the SUDAC and may inform the base station 40 about its external antenna. According to one embodiment, the SUDAC 10 may only be controlled by one user equipment at a time. According to another embodiment, a further user equipment may request to control the SUDAC 10, wherein the SUDAC 10 is configured for sharing its capabilities among the user equipment devices requesting to control the SUDAC. For example, at a first time the SUDAC may be utilized by a first user equipment and at another time the SUDAC may be utilized by a further user equipment. Alternatively, or in addition, the frequency, the space or the code domain may be shared amongst the user equipment.

The SUDAC 10 utilizing the extremely-high frequency at the frontend communication link 18 allows for a plurality of frontend communication links to enhance communication of a plurality of user equipment. Thus, the SUDAC 10 may be configured for maintaining a plurality of frontend communication links to a plurality of user equipment and/or to maintain a plurality of backend communication links 14 to a plurality of base stations, wherein different base stations or base station network group. Different base stations or base station network groups may be related to different network providers, i.e., the SUDAC 10 may be configured for communicate to base stations or base station network groups of different providers and for forwarding respective data signals.

Figure 2:
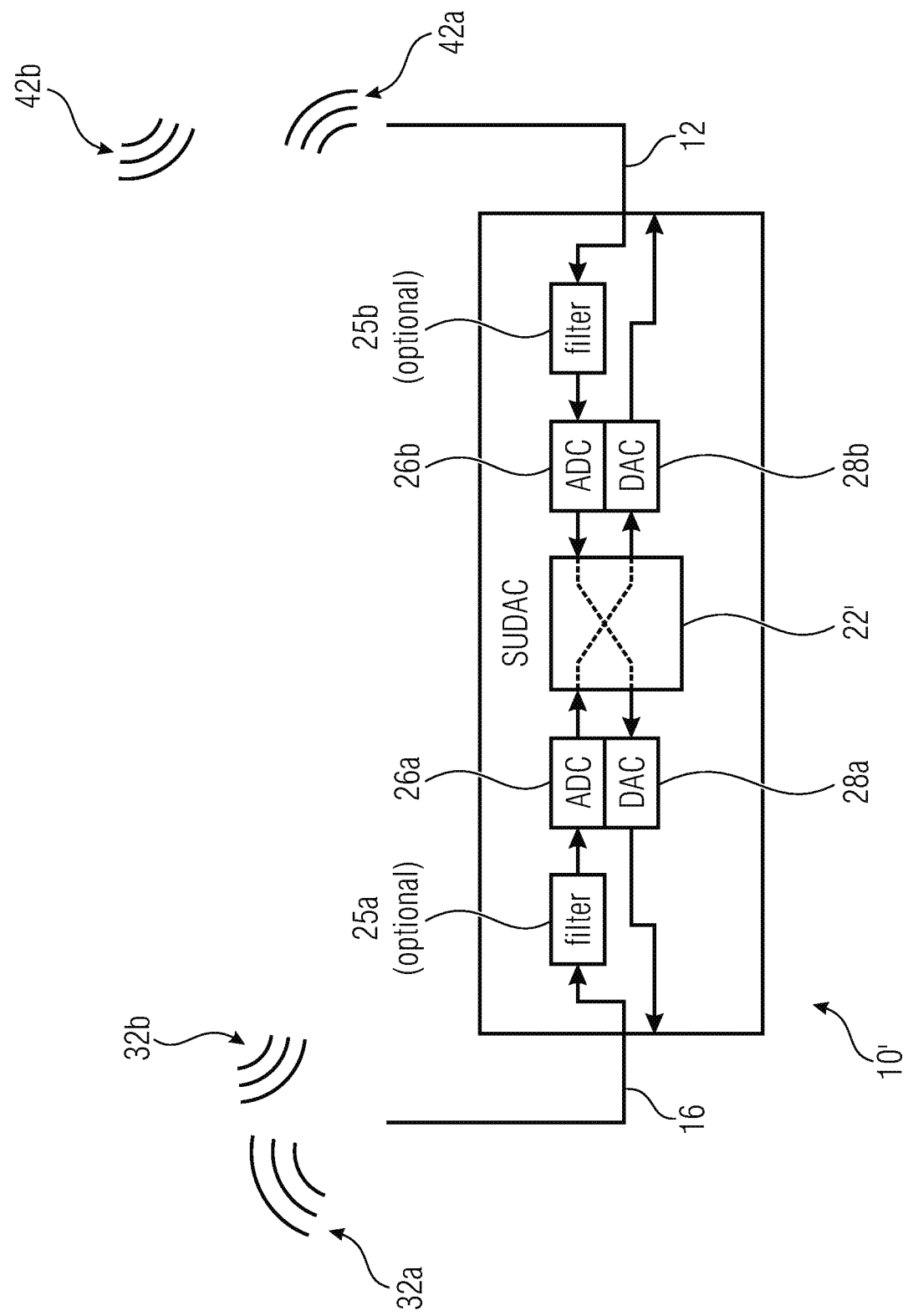
FIG. 2 is a schematic block diagram of a SUDAC being modified when compared to the SUDAC shown in FIG. 1 and comprising two filters according to an embodiment.

FIG. 2 shows a schematic block diagram of a SUDAC 10' being modified when compared to the SUDAC 10 and comprising a digital filter 25a and a filter 25b. The filter 25a and/or 25b may be implemented, for example as a field programmable gate array (FPGA), as a digital signal processor (DSP), a microcontroller or the like. The filter 25a is configured for filtering the user information signal 32b. The filter 25b is configured for filtering the communication signal 42b. The SUDAC 10' comprises an ADC 26a for digitalizing the filtered user information signal 32b to obtain a digitalized version thereof. The SUDAC 10' comprises an ADC 26b for digitalizing the filtered communication signal 42b. Further the SUDAC 10' comprises a DAC 28a and a DAC 28b, wherein the DAC 28a is configured for analogizing a signal obtained from the processor 22' and based on the signal digitalized by the ADC 26b. Thus, the processor 22' may be configured for modifying the digitalized version of the communication signal 42b. The DAC is configured for analogizing the signal obtained from the ADC 26a which is processed by the processor 22'. The modification of the digitalized version of the communication signal 42b and/or of the user information signal 32b may comprise an insertion or an extraction of a signal that was received indirectly from a further user equipment via the user equipment 30, e.g., by using a so called piggyback function which is described below. In simple words, the user equipment 30 may be utilized as a relay by the further user equipment. Multiple user equipment may build a SUDA System (SUDAS).

The filters 25a and 25b may be implemented as analog or digital frequency adaptive preselector filters and allow for suppressing interferences. The interferences may result from other communication partners communicating in the same frequency range and/or from the SUDAC itself when it comprises further wireless communication interfaces for maintaining further frontend communication links and/or backend communication links.

Alternatively, the backend communication links and/or the frontend communication links may be implemented such that the frequency range of the respective link is divided, i.e., partitioned by filtering such that interference between partitioned portions of the frequency range is reduced or minimized. When the filters 25a and/or 25b comprise digital filters, this allows for a time variant filtering at low costs and low space requirements.

The SUDAC 10' is a so called dSUDAC comprising the ADCs 26a and 26b and the DACs 28a and 28b (digital frontend). The digital processing of the user information signal 32b and/or the communication signal 42b allows for an inclusion of the control information 24 depicted in FIG. 1 in a payload channel, i.e., the control information may be transmitted via the same frequency as the data to be forwarded, i.e., the control information may be included into the payload channel in a different time (t)/frequency (f)-resource block. The processor 22 may be configured for analyzing the control information 24 in the digital domain. In contrast, an analog SUDAC may forward the signals such that the payload channel is transferred in a purely analog way without using analog-digital and digital-analog converters.

In other words, a major difference between aSUDACs and dSUDACs is that the payload bandwidth of dSUDAC can be handled more flexibly as the filtering of the signal can be done in the digital domain. This basically means that filter coefficients are exchanged while an aSUDAC needs to physically switch between different filter implementations. Further, a dSUDAC may aggregate different carriers by changing the carrier frequency distances. A dSUDAC may synchronize to a common network clock. This allows the dSUDAC to apply a phase shift to the payload which allows to provide a kind of beamforming by using two SUDACs in which at least one is a dSUDAC. This means that both SUDACs receive the same payload signal on the ultra-high frequency (e.g. below 6 GHz) and transmits it on the same extremely-high frequency (e.g. in the range of 60 GHz) frequency. By applying the correct phase shift both signals will constructively interfere. Further, a dSUDAC may change the payload data transmission mode from TDD to FDD and vice versa. A dSUDAC may provide the same discovery and acquisition methods on the backend communication link as on the frontend communication link. A dSUDAC may provide compress and forward methods and decode and forward methods for frontend and backend link signals.

For example when the processor 22' is configured for compress and forward a received user information signal 32*b*, a compression rate applied to obtain the communication signal 42*a* may be varied by the processor 22' dependent on a rate of overhead included, for example, based on further or redundant information due to channel estimation and interference avoidance.

FIG. 3 shows a schematic block diagram of the user equipment 30 maintaining the direct communication link 34 to the base station 40 and the frontend communication link 18 to the SUDAC 10 or alternatively to the SUDAC 10'. The user equipment 30 comprises a processor 31 configured for signal processing. The user equipment 30 comprises a first wireless communication interface 36 which is configured for using the ultra-high frequency to establish the direct communication link 34. The user equipment 30 further comprises a second wireless communication interface 37 which is configured for using the extremely-high frequency to establish the frontend communication link 18. The user equipment 30 is configured for receiving a user signal, for example, data to be downloaded, partially via the direct communication link 34 and at least partially via the frontend communication link 18. As stated above, the SUDAC 10 may be utilized as a further wireless communication interface such as a spaced antenna of the user equipment 30. Thus, data of the base station 40 to be transmitted to the user equipment 30 may be partially transmitted via the direct communication link 34 and at least partially or even completely via the frontend communication link 18 which means that the SUDAC 10 receives the communication signal 42*b* and forwards the user signal in form of the user information signal 32*b* via the frontend communication link 18. The user equipment 30 is associated to the base station 40. For example, the base station 40 is operated by a service provider that provides services to the user equipment 30 as it is known from mobile telecommunication or data service providers.

The user equipment 30 is configured for receiving a signal 38 via a direct communication from a further user equipment 39 which also requests to send data to the base station 40 or another base station. For example, the user equipment 39 is unable to maintain a direct communication link to a base station it is associated to and/or it requests also an enhancement of communication by the SUDAC 10. When the SUDAC 10 is utilized, i.e., controlled, by the user equipment 30 the SUDAC 10 may be unable or may deny to be controlled by the user equipment 39 and to implement communication enhancement as it is requested by the user equipment 39. Therefore, the user equipment 39 may transmit the data signal 38 via a direct communication link to the user equipment 30 which may forward it at least partially to the SUDAC 10. Alternatively, the frontend communication link 18 may comprise a random access channel, i.e., parts of the resources utilized may be open to be utilized by third parties such as the user equipment 39. When the SUDAC 10 receives a data signal 38 transmitted by the user equipment 39 utilizing the random access channel, the SUDAC 10 may simply retransmit the data signal 38 as the data signal 38' (user information signal) such that the user equipment 30 receives data from the user equipment 39 by the (indirect) link via the SUDAC 10. The user equipment 30 is configured for generating the user information signal 32*a* based on data the user equipment 30 wants (requests) to transmit (upload data) and based on information received from the further user equipment 39.

This allows for a so called piggyback mode in which the user equipment 30 includes or combines the information received from the user equipment 39 to or with its own information and transmits both information to the SUDAC 10. This may also be regarded as a communication mode of the further user equipment 39. The SUDAC 10 may either transmit the piggyback information to the base station 40 or to a further base station 41. The base station 40 may be configured for separating the information from the user equipment 30 which is associated to the base station 40 from the information of the user equipment 39 which may be associated to the base station 40 or to the further base station 41. In the latter case, the base station 40 may be configured for transmitting the information from the further user equipment 39 to the further base station 41, i.e., the base station 40 is configured for receiving information (e.g., in a payload channel) related to the user equipment 30 via the backend communication link and via the SUDAC 10. The user equipment may be related to the base station. The SUDAC may transmit the information as a piggyback information piggybacked to the information. Alternatively or in addition the user equipment 30 may be configured for utilizing more than one carriers, i.e., to establish more than one frontend communication links and/or direct communication links. The piggyback function may then be implemented such that the further information is related to a further communication link to be piggybacked by another communication link of the user equipment 30. A single frontend communication link may comprise a plurality or even a multitude of carriers that may be separated and/or aggregated by an aSUDAC. In case of a dSUDAC a "broad" communication link may be realized comprising all the information and to be separated and/or aggregated by the dSUDAC such that a single frontend communication link may be mapped to a plurality or multitude of backend communication links and/or vice versa.

This allows for communication of user equipment devices to base stations even if they do not maintain a direct communication link to their base station and/or to reduce data overhead in terms of control information. In the piggyback mode, both information related to the user equipment 30 and to the user equipment 39 may be included into one payload channel which is associated to respective control channels configured for comprising control information. This means that for transmitting the information of the further user equipment an allocation of further control channels may be avoided such that the respective resources that would have been utilized may be saved and used for other services.

Alternatively or in addition, the SUDAC 10 may be configured for establishing a direct communication link (i.e., a further frontend communication link) to the further user equipment 39. By this information related to the further user information may be received via the SU DAC 10. The SUDAC 10 may then be configured for generating the communication signal 42 based on the information related to the user equipment 30 and based on the information related to the further user equipment 39 by piggybacking the information related to the further user equipment to the information related to the user equipment 30.

Figure 3B:
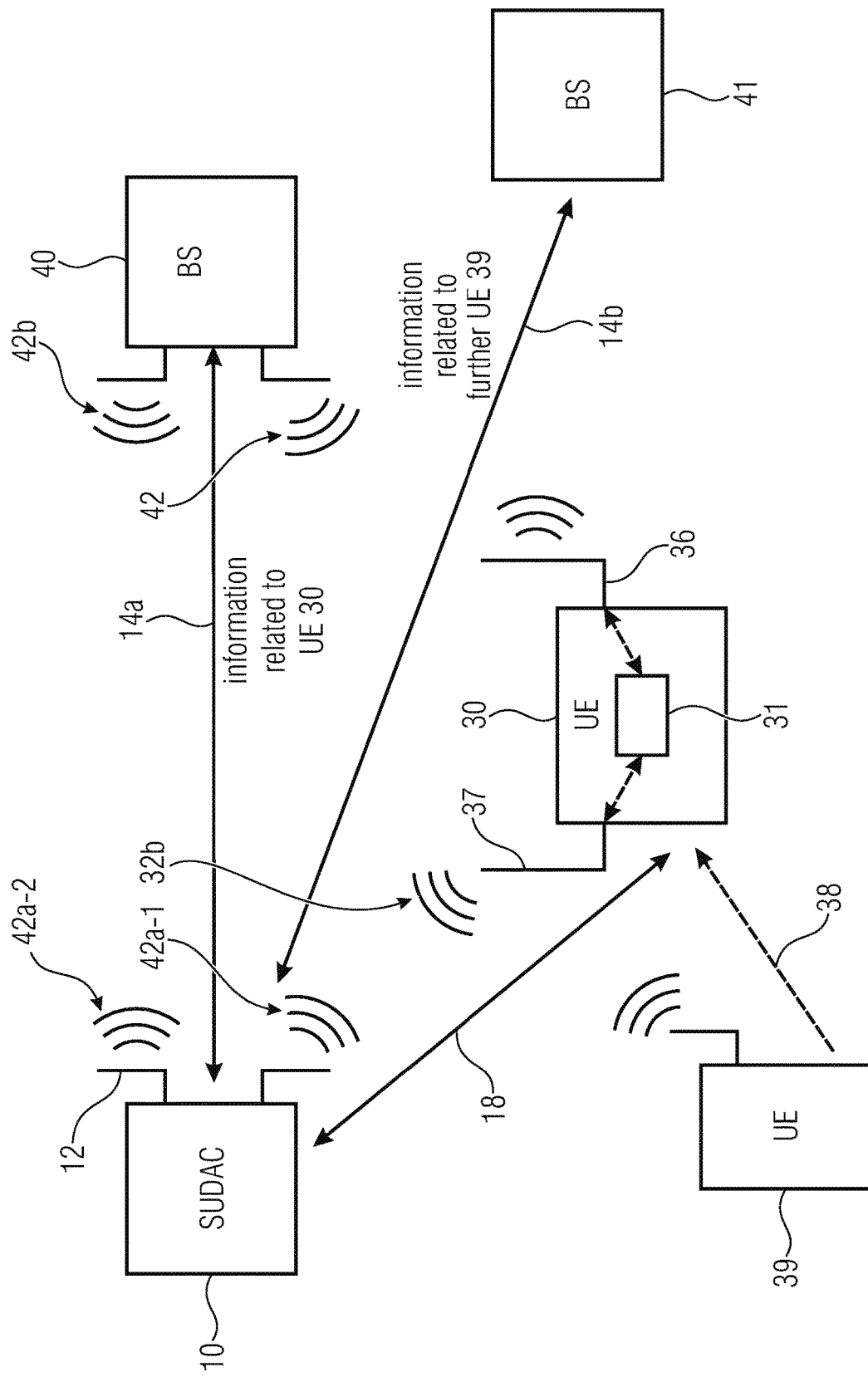
FIG. 3b is a schematic block diagram in which the SUDAC is configured for establishing a first backend communication link to a base station and a second backend communication link to a further base station.

FIG. 3*b* shows a schematic block diagram in which the first wireless communication interface 12 of the SUDAC 10 is configured for establishing a first backend communication link 14*a* to the base station 40 and a second backend communication link 14*b* to the further base station 41. The SUDAC 10 is configured for establishing both backend communication links 14*a* and 14*b* at the ultra-high frequency. The first wireless communication interface 12 may be realized as a plurality of wireless communication interfaces, each configured for communicating with a base station 40 or 41. Alternatively the first wireless communication interface 12 may be implemented as one interface configured for transmitting in a broad frequency range such that communication with both base stations 40 and 41 is enabled, the base stations transmitting in different frequency ranges, e.g., as utilizing frequency bands associated to different service providers as described in FIG. 21.

The SUDAC 10 is configured for receiving a user information signal 32b from the user equipment 30 via the frontend communication link 18. The user information signal 32b comprises information related to the user equipment 30 and a further information related to the user further equipment 39, i.e., the user equipment 30 transmits the information related to the further user equipment 39 by using the piggyback option. The information related to the further user equipment 39 is also related to the further base station 41. For example, the further information may comprise an information indicating that the further base station 41 is a designated receiver of the information.

The SUDAC 10 is configured for forming a communication signal 42a-1 to be transmitted via the first backend communication link 14a and comprising the information related to the user equipment 30 and for forming a communication signal 42a-2 to be transmitted via the second backend communication link 14b and comprising the information related to the further user equipment 39. In simple words, the SUDAC 10 is configured for separating both information and for transmitting them separately.

Figure 4:
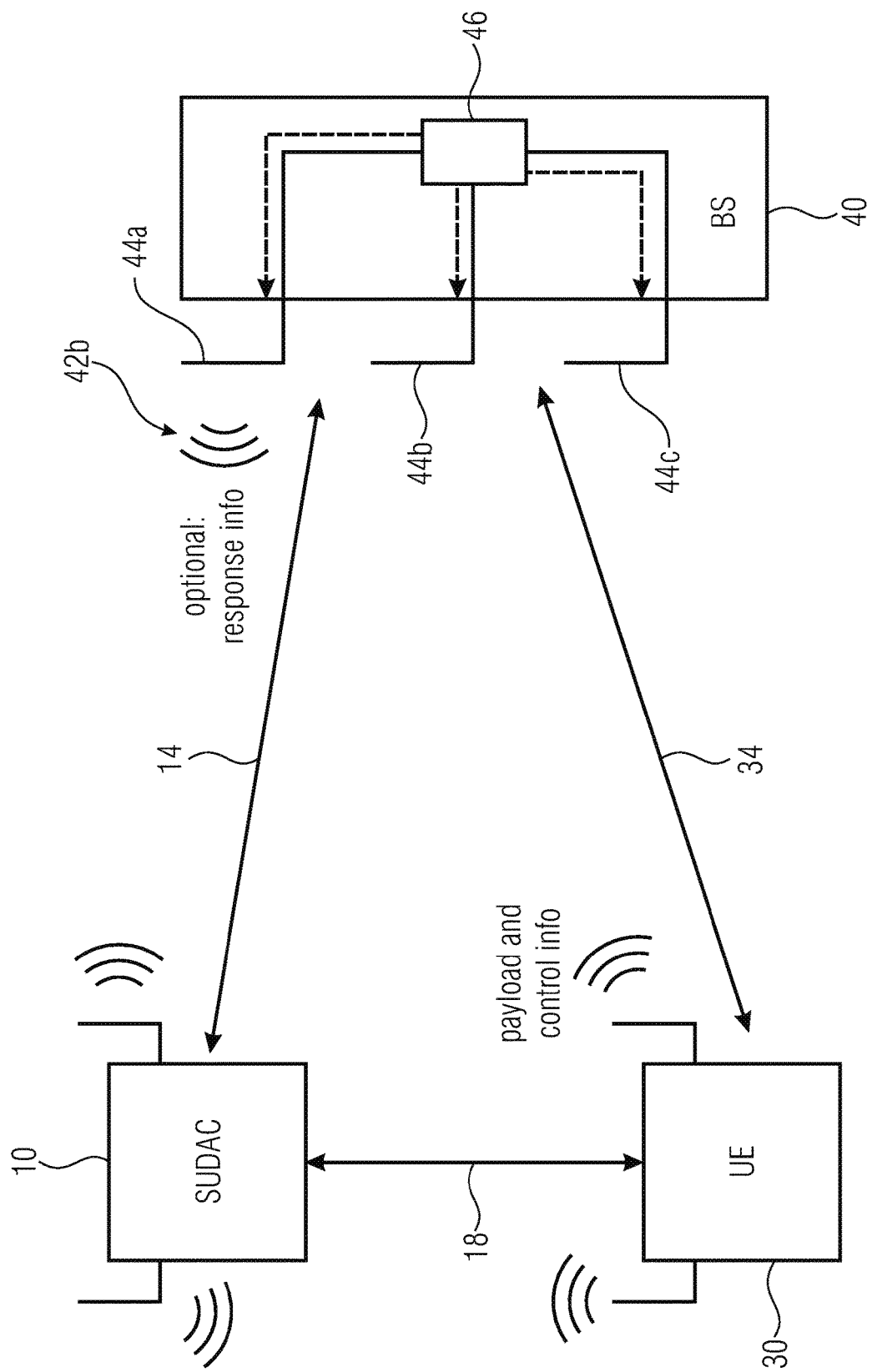
FIG. 4 is a schematic block diagram of the base station configured for communicating with the SUDAC via the backend communication link and to the user equipment via the direct communication link according to an embodiment.

FIG. 4 shows a schematic block diagram of the base station 40 configured for communicating with the SUDAC 10 via the backend communication link 14 and to the user equipment 30 via the direct communication link 34. The base station 40 comprises three wireless communication interfaces 44a, 44b and 44c and a controller 46 configured for controlling the wireless communication interfaces 44a-c such that a multiple antenna function, for example, a spatial multiplexing, a space-time-coding and/or a beamforming function of the wireless communication interfaces 44a-c is obtained. For obtaining a MIMO-function, the controller 46 may be configured for controlling each of the wireless communication interfaces 44a-c such that one or more of them maintain a direct link to a communication partner, e.g., a user equipment or a SUDAC. This is called a so called single-antenna mode, wherein the base station 40 may be configured to implement a plurality of single-antenna modes at a time to different communication partners. The controller may be configured for precoding the signals to be transmitted such that each signal to be transmitted to other communication partners is transmitted via all of the used wireless communication interfaces (antennas) to obtain a so-called spatial stream. Alternatively or in addition the controller 46 may be configured for controlling one or more of the wireless communication interfaces 46a-c such that the respective wireless communication interfaces 44a-c implement a beamforming function, e.g., by transmitting the same signal with a phase shift that corresponds or is related to a distance of the utilized interfaces (antennas) such that constructive and destructive interference may occur and/or a so called beam with a good signal quality along a beam direction is obtained.

The base station 40 is configured for receiving control information via the direct communication link 34 from the user equipment 30, e.g., as part of the control information for controlling and/or signaling communication parameters. The controller 46 is configured for adapting the transmission characteristics of the multiple antenna function based on the control information. The control information may include an identifier of a SUDAC which is utilized by the user equipment 30 or a request directed to the base station 40 indicating to establish the backend communication link 14. The request may be based, for example, on a signal quality information. Simplified, the user equipment 30 may select one or more SUDACs to which it may communicate allowing a good channel quality and send information related to the selected SUDACs to the base station 40. Alternatively or in addition, the control information may comprise information related to a location of the selected SUDACs such that the base station 40 adjusts the direction of one or more beams to a direction in which the one or more SUDACs is located with respect to the base station 40.

Alternatively or in addition, the control information may be transmitted by the SUDAC 10. Thus, operation of the base station 40 is at least partially controllable by the user equipment 30 and/or the SUDAC 10. This allows for a more efficient usage of the media accessed by the base station 40, as the other communication partners may control the base station 40 such that it utilizes the media efficiently with respect to the network.

The control information may comprise geographic information related to the user equipment 30 and/or to the SUDAC 10 or other communication partner such that a directional radio pattern of a signal transmitted by the base station may be modified. Especially, when the base station is formed by several transmitting masts spaced by large distances, the directional radio pattern may not be a beam, but resulting in a constructive interference at a position or area indicated by the geographic information. A beamforming in terms of a plurality of wireless interfaces being arranged at basically one position may lead to an adaptation of an advantageous direction of the backend communication link 14 wherein the advantageous direction may be directed towards the SUDAC 10. Alternatively, also the advantageous direction of the direct communication link 34 may be adapted, i.e., the beam or the area may be directed towards or adjacent to the user equipment 30 and/or the positive interference may be effective at a location of the user equipment 30. Alternatively or in addition the control information may also relate to a bandwidth information such that the controller 46 may be configured to modify or adapt a bandwidth of the direct communication link 34 and/or of the backend communication link 14 based on the control information.

Alternatively or in addition, the control information may also refer to a resource allocation (time frequency, code and/or space) that is requested by the user equipment 30 and/or by the SUDAC 10. The base station 40 may be configured to respond to that information, e.g., to acknowledge a new allocation scheme and to adapt the current resource allocation.

The base station 40 may be configured to communicate to a plurality of user equipment devices and/or to a plurality of SUDACs. In such a case, the base station 40 may be a or the network node having almost or all information with respect to the communication partners within the network especially when SUDACs and/or user equipment devices are only able to reach some but not all of the other communication partners. The control information may comprise an information indicating that the base station is requested to organize a configuration of a network formed by the communication partners such that the controller 46 modifies resources like transmission frequencies, transmission times, codes or transmission spaces of the base station, the user equipment or of the SU DAC, i.e., the user equipment 30 and/or the SUDAC 10 may be configured for transmitting the control information indicating that the base station is requested to organize the network.

The base station 40 may be configured for transmitting a response information to the SUDAC 10 and/or to the user equipment 30 based on the control information indicating that the SUDAC 10 and/or the user equipment 30 are requested to utilize parts of the frequency domain, the time domain, the code domain or the space domain. I.e., the response information and/or the allocation information may related to the SUDAC 10 and/or to the user equipment 30 and to transmission domains of transmission or reception signals of the SUDAC 10 and/or of the user equipment 30.

A network node configured to control resource allocation may be configured to determine a resource allocation rate, e.g., if a resource is utilized in some or all parts of the network by at least on network node. Further, this network node may be configured, to determine, if a resource is unused or used suboptimal, e.g., used less than possible while the same or other resources suffer from an overload. The network node may be configured to compare the resource allocation with a threshold value. The threshold value may be, for example, maximum resource usage at a time or during a past time or may comprise a predefined value. The network node, i.e., the user equipment 30, the SUDAC 10 and/or the base station 40 may be configured for determining a resource allocation for parts of the network or all of it such that a rate of a resource utilization of the base station, of the user equipment or of the SUDAC is above the threshold, i.e., such that a resource usage is shared amongst the network and such that network node may switch or modify resources they currently utilize for enabling other nodes with a low utilization rate (capabilities vs. resources) to increase the utilization rate.

Alternatively or in addition, the response information may be related to an information indicating that the user equipment 30 is requested to change a currently used SUDAC, i.e., to close the frontend communication link 18 to the SUDAC 10 and to establish another frontend communication link to another SUDAC. For example, the base station 40 may have knowledge of that two user equipment devices may establish communication to the SUDAC 10 which is controlled by the user equipment 30. The base station 40 may further have knowledge that another SUDAC is only reachable for the user equipment 30 (and not for others) such that when the user equipment 30 changes its SUDAC, both user equipment may utilize a SUDAC.

Although, the user equipment 30 is configured for controlling the SUDAC, the base station 40 may transmit control information to the user equipment 30 to for example change its SUDAC and/or a control information indicating that the SUDAC is requested to change to sleep mode, i.e., to stop transmissions to avoid interference. This control information may be transmitted based on a command initiated from the user equipment 30 indicating that the base station 40 is requested to control the network. The SUDAC 10 is configured to change to the sleep-mode in such a case. The sleep mode and possibilities for the SUDAC for a recovery from that will be described below.

Figure 5:
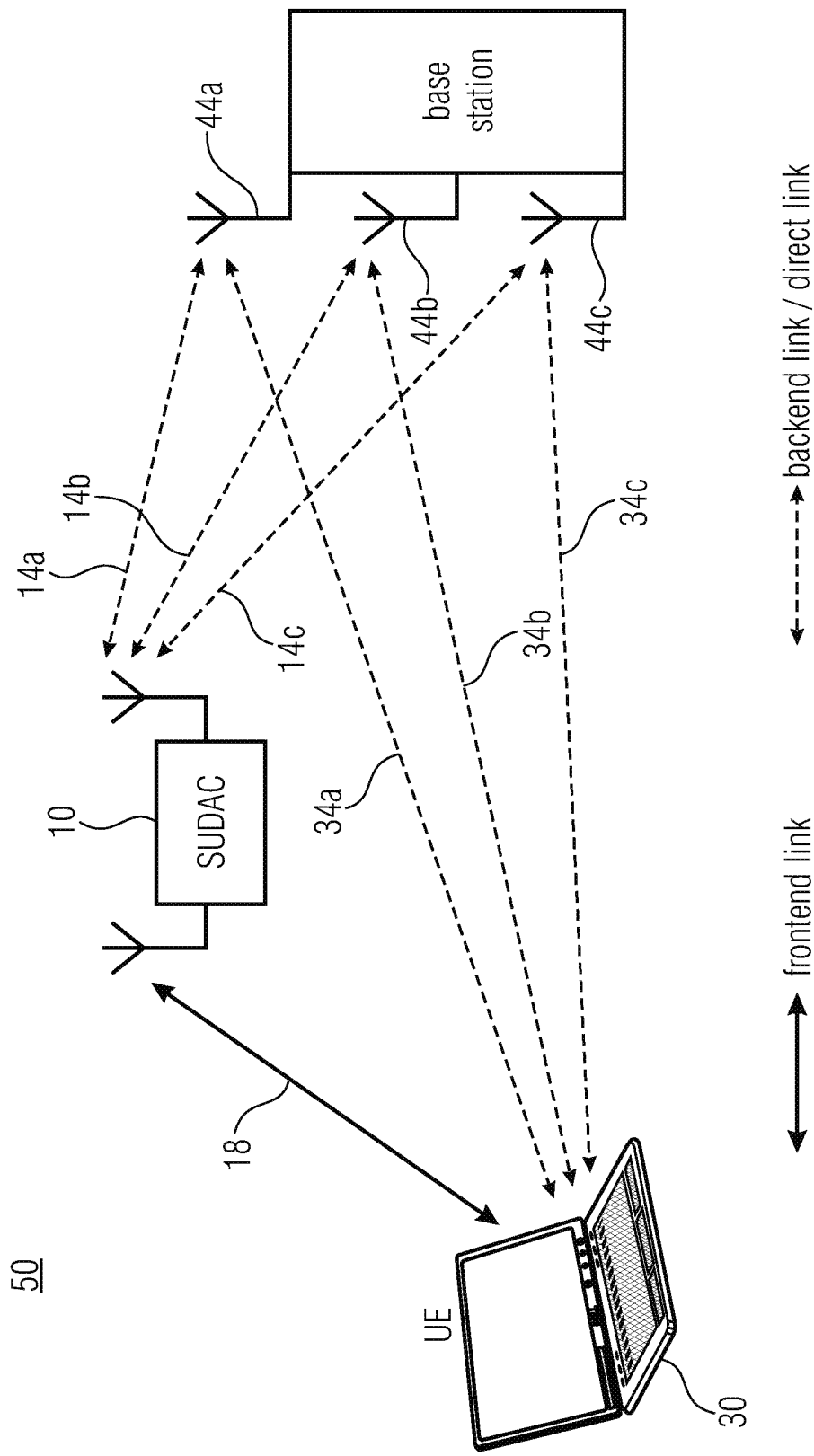
FIG. 5 is a schematic block diagram of a SUDAC system according to an embodiment.

FIG. 5 shows a schematic block diagram of a SUDAC system 50. The base station 40 is configured for maintaining a plurality of direct links 34*a-c* and a plurality of frontend communication links 14*a-c*. A frontend communication link 14*a-c* may be equal to a direct communication link 34*a-c* as, from the point of view of the base station 40, the SUDAC 10 may be an external antenna of the user equipment 30 such that the base station 40 may be configured to transmit the same signal in a frontend communication link 14*a-c* and a direct communication link 34*a-c*.

In other words, FIG. 5 shows an overview of communication links between the SUDAC 10, the user equipment 30 and the base station 40. It is envisioned to install a system of autonomous relaying antennas (SUDAS) that act assist for the communication to a user equipment (UE). This distributed antenna system which consists of one or more SUDACs is the key for employing MIMO techniques which unlock the gate to ultrafast data transmissions between UEs and the base station (BS) of a mobile communication system. The link between a SUDAC and the BS is called the backend communication link and uses frequency band 1 (ultra-high frequency) which for current mobile systems is below the frequency range of 6 GHz. The transmission between the UE (user equipment) and a SUDAC is done in the mm-wave frequency band (band 2) extremely-high frequency to allow high data rates for short range, mostly line of sight (LOS) transmissions. This link is called the frontend communication link. From the system point of view both links are bidirectional and as pair build up a single relay link. A single SUDAC incorporates one or multiple independent relaying links. The link direction from UE-to-SUDAC and from SUDAC-to-BS is labelled as uplink, the other direction is labelled as downlink.

Figure 6:
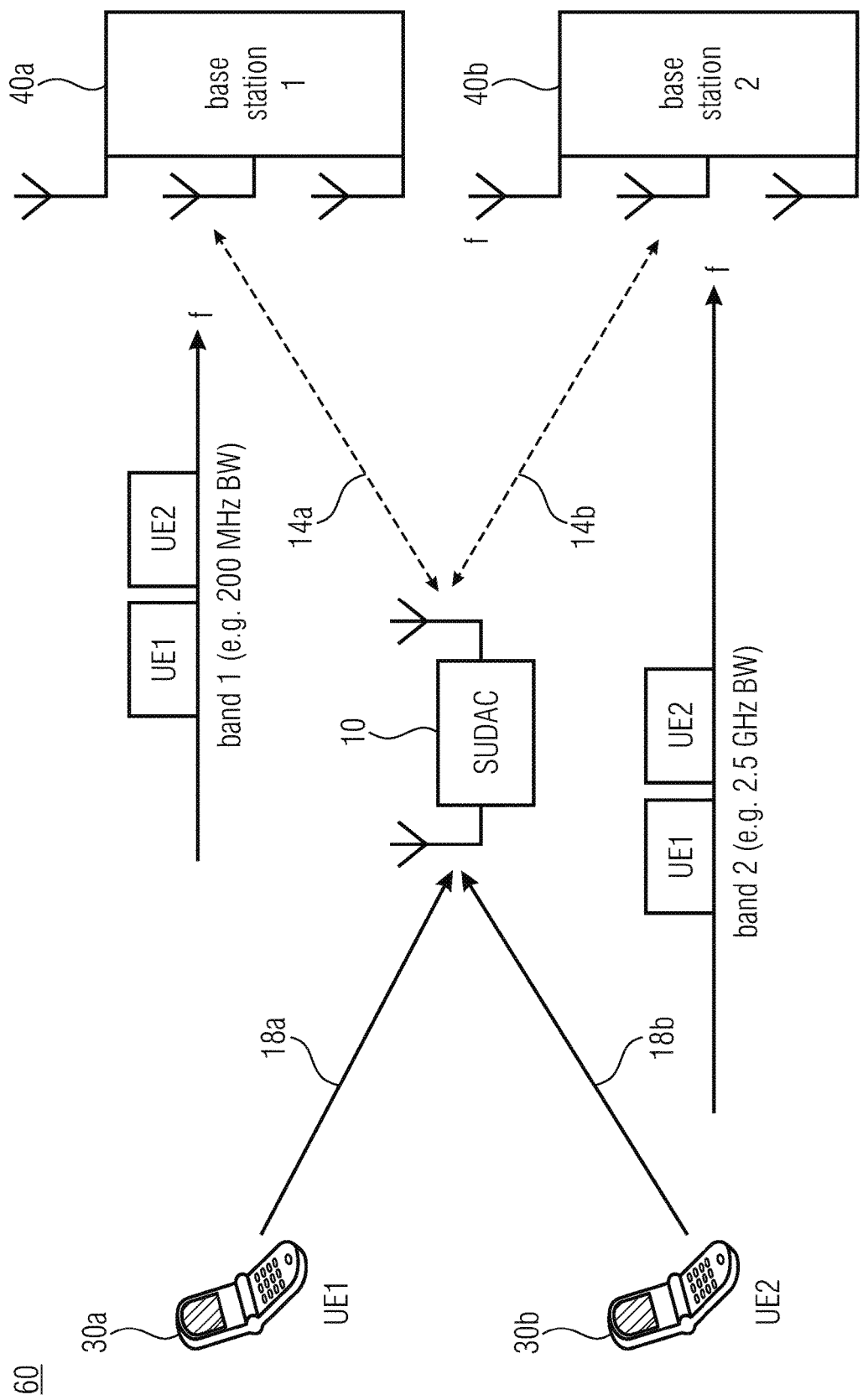
FIG. 6 is a schematic block diagram of a SUDAC system comprising two user equipment devices, the SUDAC and two base stations according to an embodiment.

FIG. 6 shows a schematic block diagram of a SUDAC system 60 comprising two user equipment devices 30*a* and 30*b*, the SUDAC 10 and two base stations 40*a* and 40*b*. FIG. 6 depicts a situation in which both user equipment devices 30*a* and 30*b* utilize the SUDAC 10 for enhancing their uplink connection to a respective base station, wherein the user equipment 30 may be associated to the base station 40*a* and wherein the user equipment 30*b* may be associated to the base station 40*b*. Both base stations 40*a* and 40*b* may operate in different frequency ranges or other parts of the media. The user equipment 1 maintains a (unidirectional) frontend communication link 18*a* with the SUDAC 10. The user equipment 30*b* maintains a (unidirectional) frontend communication link 18*b* with the SUDAC 10. The SUDAC 10 maintains two (unidirectional) backend communication links 14*a* and 14*b* with the base station 40*a*, 40*b*, respectively.

The overall frequency range of the backend communication links 14*a* and 14*b* in band 1 may be, for example up to 200 MHz or the like, wherein the overall bandwidth in band 2 may be, for example, in a range of up to 2.5 GHz or even more and thus significantly larger. Alternatively, the frequency range of the backend communication links may comprise a different bandwidth, for example less than 200 MHz (e.g., 100 MHz) or more than 200 MHz (e.g., 300 MHz).

The SUDAC 10 may operate in a compress and forward communication (operation) mode and may be configured to compress data or information received from the user equipment 30*a* and/or 30*b* when transmitting respective signals to the base stations 40*a* and/or 40*b*.

In other words, FIG. 6 shows a frequency usage in different bands for different base stations. The backend communication link 14*a* and/or 14*b* may be the most restricted resource and shared between different base stations. The frontend communication link is shared between different user equipment. The SUDAC 10 is relaying between the bands. Alternatively, a communication may also be directed towards the user equipment 30*a* and/or 30*b* (downlink). The SUDAC 10 may then operate in a decode-and-forward communication (operation) mode.

Figure 7:
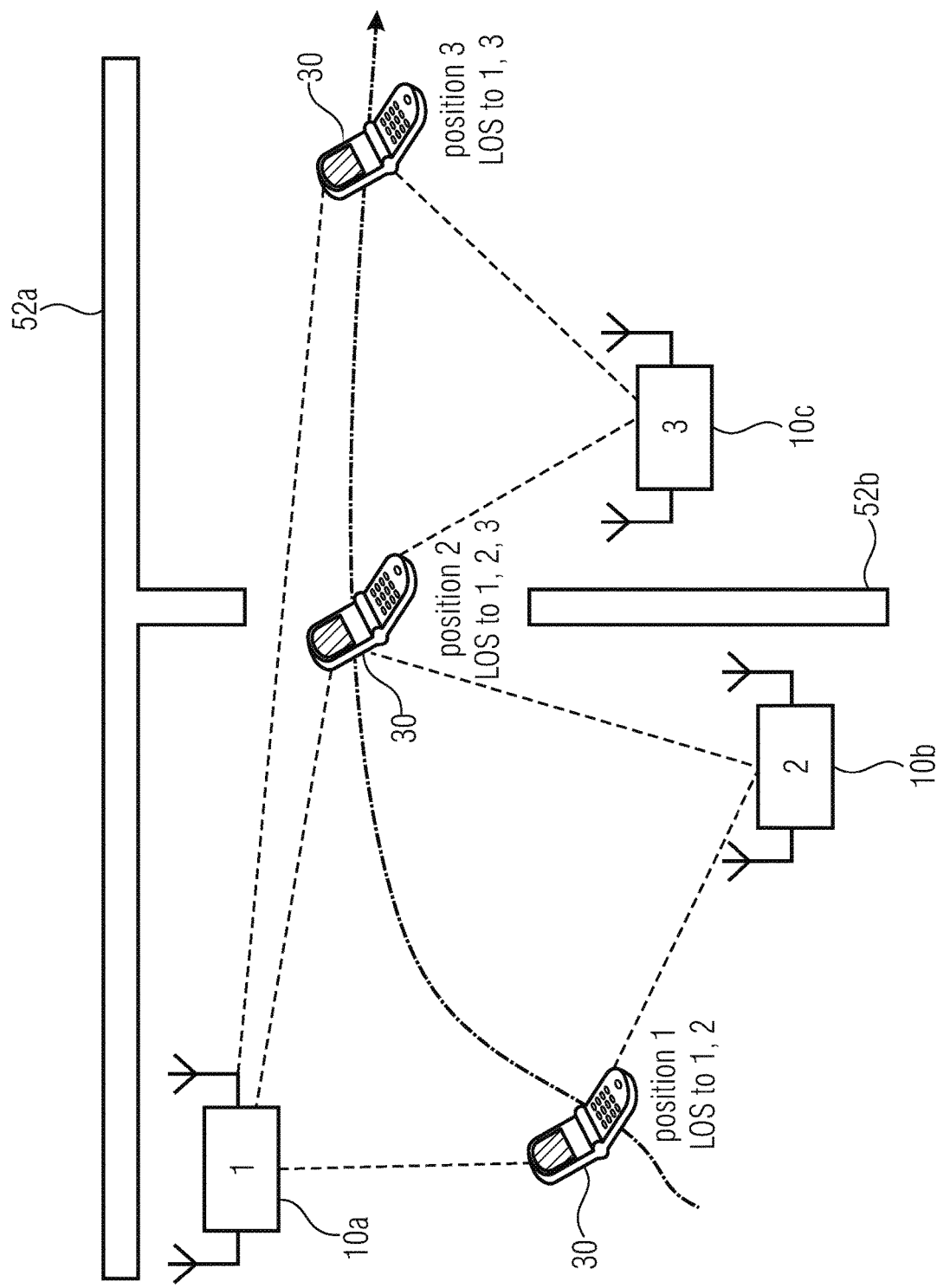
FIG. 7 is a schematic diagram of a SUDAC system comprising the user equipment, three SUDACs arranged at different locations, wherein a line of sight between two SUDACs is prevented by a wall according to an embodiment.

FIG. 7 shows a schematic diagram of a SUDAC system 70 comprising the user equipment 30, the SUDACs 10a, 10b and 10c arranged at different locations, wherein a line of sight between the SUDACs 10b and 10c is prevented by a wall 52b. The SUDAC system 70 shows a scenario for an indoor usage of a SUDAC system. The dashed dotted line indicates a movement of the user equipment 30 from a position 1 via a position 2 to a position 3. For example, the user equipment 30 may move at pedestrian speed inside a building and/or at car speed in a metropolitan area.

At position 1, the user equipment 30 has a line of sight to SUDAC 10a and 10b and thus may maintain a frontend communication link to one or both of the SUDACs 10a and 10b. At position 2 the user equipment 30 has line of sight to the SUDAC 10a, the SUDAC 10b and the SUDAC 10c, and may maintain a frontend communication link to one, more or all of the SUDACs 10a-c. I.e., the user equipment 30 may establish a further frontend communication link when compared to position 1. At position 3, the user equipment 30 has lost line of sight to the SUDAC 10b which may lead to a loss of connection in the respective frontend communication link thereto. The user equipment 30 may be configured to send a respective information to the base station and to control the base station in terms of establishing, maintaining or closing respective backend communication links between the base station and one or more of the SUDACs 10a-c.

The user equipment 30 may be configured for detecting newly "viewable" SUDACs by a discovery process and/or for closing connections to SUDACs that are to get out of sight. Such mechanisms are described later on.

In other words, considering the fact that the SUDAS topology may change, the system may be configured to ensure that it can cope with this and is able to allocate its resources in an efficient way. This implies that the resources may be allocated in such a way that the systems critical resource, which in the current mobile communication systems is the backend communication link, may be utilized in the best possible way. This of course also implies that the number of SUDACs used by a single UE is aimed to be maximized. In the light of the fact that multiple UEs, may rely on different BSs, a very flexible system for allocating the transmission resources may be necessitated.

This results to the idea that it is advantageous to allocate the resources in a way that a single relay link (frontend communication link and backend communication link) may be used for relaying the data of multiple UEs.

Mandatory for any method solving the network discovery and resource problem is that it is advantageous when it is feasible with only the basic infrastructure elements of a SUDAS which are UEs, BSs and SUDACs. Cooperation with other devices via the same frequency band (e.g. IEEE 802.11ad), a different frequency band (e.g. 802.11n, a, ac) or even a different medium (e.g. powerLan, wire based Ethernet) may be possible but is considered an extension of the basic functionality. Using such an extension adds a communication channel that is in the best case shared by all SUDACs and the UE.

If this communication channel is established new options arise for the system: a) all connected SUDACs and other UEs are known to the UE so the hidden node problem is solved; b) the resource allocation can be done for all SUDACs together to build one single SUDAS, i.e., there is no interference on the frontend communication links as all used frequencies are known, discovery is simplified as the UE is able to inform the SUDACs at which frequency it will transmit its requests and/or the status information of all SUDACs is available to the SUDAS (e.g. interferer frequencies). Further, c) a common timebase between the SUDACs can be established to achieve synchronicity, d) the SUDAS can become aware of its actual layout, i.e., the UE can force individual SUDACs to transmit a test sequence which is received by some of the other SUDACs, by analyzing the reception results the relative locations between the SUDACs can be estimated and also it becomes possible to locate unknown interference sources. For the transmission of control and system status information a suitable communication protocol may be necessitated that supports all addressed system properties.

Figure 8:
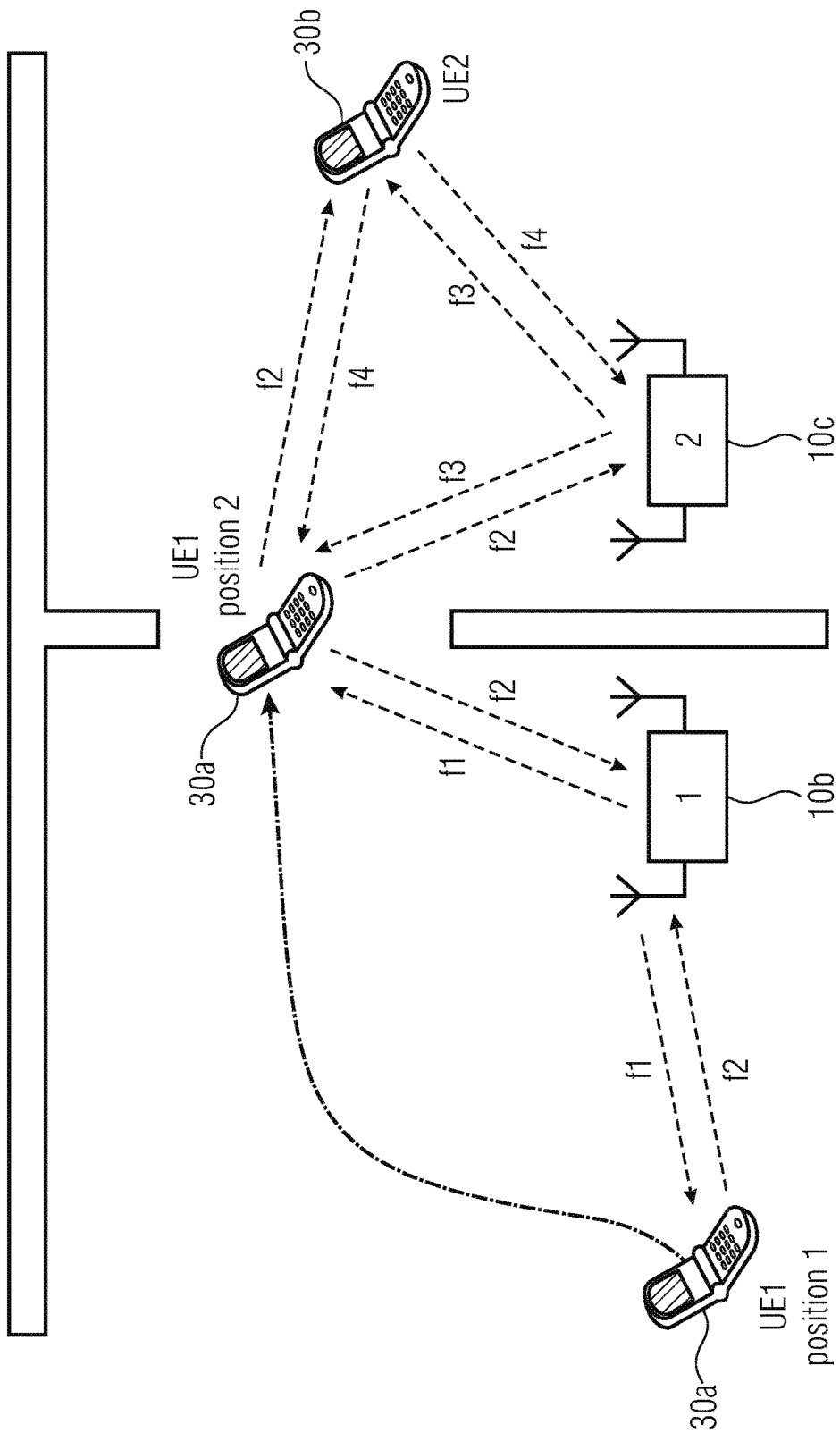
FIG. 8 is a schematic diagram of a SUDAC system that is modified when compared to the SUDAC system of FIG. 7 according to an embodiment.

FIG. 8 shows a schematic diagram of a SUDAC system 70' that is modified when compared to the SUDAC system 70. When compared to the SUDAC system 70, the SUDAC 10a is missing and a further user equipment 30b is present. The user equipment 30a moves from the position 1 to the position 2 as indicated by the dashed dotted line. At the position 1, the user equipment 30a may communicate with the SUDAC 10b. Therefore, it may transmit to the SUDAC 10b at a carrier frequency f2 and may receive from the SUDAC 10b at a carrier frequency f1. This does not change when the user equipment 30a moves to the position 2 where the SUDAC 10c and the user equipment 30b are in line of sight.

The user equipment 30b may be stationary (not moving) and may communicate with the SUDAC 10c while receiving from the SUDAC 10c at a frequency f3 and transmitting to the SUDAC 10c at a frequency f4. When the user equipment 30a is at position 2, communication of SUDAC 10c and user equipment 30b may be interfered by the user equipment 30a transmitting at frequency f2, wherein the communication of the user equipment 30a may be interfered by the SUDAC 10c transmitting at frequency f3 and/or by the user equipment 30b transmitting at the frequency f4. Alternatively, the user equipment 30b may also move.

Dependent on a relation between the carrier frequencies f1-f4 different scenarios may occur:

If all frequencies are different, then low or even no interference may occur such that probably no action is necessitated. In case f1=f3, SUDAC 10c may cause interference to the user equipment 30a in the respective frontend communication link to the SUDAC 10b. The user equipment 30a may discover the interference on the downlink and may detect that this is caused by the SUDAC 10c. There are several methods and concepts known for determining signal interference. The user equipment 30a may transmit a request for frequency change to the user equipment 30b, for example, via a loopback function described later on, to the base station or directly to the user equipment 30b. Alternatively or in addition, the user equipment 30a may change the frequency setup it maintains with SUDAC 10b.

If the carrier frequency f1 equals the carrier frequency f4, then the user equipment 30b may cause interference on the SUDAC 10b frontend communication link. The user equipment 30a may discover the interference on its downlink and may detect that this is caused by the user equipment 30b. The user equipment 30a may transmit a request for frequency change to the user equipment 30b, for example via the loopback method using the SUDAC 10c, transmitting the request for frequency change to the base station or via a direct link to the user equipment 30b. Alternatively to a direct communication to the user equipment 30b, the user equipment 30a may also utilize a loopback request slot of the frontend downlink of the SUDAC 10c. Alternatively or in addition, the user equipment 30a may change the frequency setup it uses with the SUDAC 10b.

If the carrier frequency f2 equals the carrier frequency f3, then the user equipment 1 may cause interference on the SUDAC 10c frontend downlink. This may result in similar actions as they were described for the scenario where the carrier frequency f1 equals the frequency f4 with changed partners.

If the carrier frequency f2 equals the carrier frequency f4, then the user equipment 30a may cause interference to the user equipment 30b frontend uplink. The SUDAC 10c may detect the interference and that it is caused by the user equipment 30a. The SUDAC 10c may send a frequency change request on the carrier frequency f1 via a loopback slot of the user equipment 30a downlink. Alternatively or in addition, the SUDAC 10c may send the interference information to the user equipment 30b. Then, the user equipment 30b may try to send a frequency change request to the user equipment 30a via a direct link and/or a loopback request slot of the frontend downlink of the user equipment 1. Alternatively or in addition, the user equipment 30b may transmit the frequency change request to the base station or change its configuration with respect to the SUDAC 10c.

If communication utilizes TDD mode, there may occur a scenario where all frequencies are equal (e.g. when TDMA is used for payload and status/control multiplexing). The status/control channels may bot not have to be transmitted at the same frequencies as the payload data. In this scenario, the user equipment 30a may first detect the interference caused by the SUDAC 10c and/or the user equipment 30b and the user equipment 30b may detect the interference caused by the user equipment 30a. Further, the SUDAC 10c may detect the interference caused by the user equipment 30a. This allows for a reaction of the communication partners according to the above described scenario. In other words, summed up, the options of the user equipment 30a and 30b for encountering interference by a SUDAC system participant are a) release of its own SUDAC so it can go to sleep mode and can be re-acquired later, b) reconfigure the frontend communication link of its own SUDAC to a frequency with less or low interference, c) send a request for a frequency change directly and/or via loopback command over the interfering SUDAC or to the other user equipment and/or by base station-request, d) force a shut-off of the interfering SUDAC via loopback command to the user equipment or base station request which can either forward the request to the other user equipment or submit the command directly over the s6G (ultra-high frequency) to the SUDAC if a backend communication link status/control channel has been implemented. Details to status-control channels are described below.

To reduce the chance of interference, it is of course possible to assign non-overlapping frequency ranges to SUDACs that are deployed in different rooms. A successful automatic assignment by the SUDAS depends on the existence of an additional information channel else the hidden node problem will occur. A more simple approach would be to implement a the selection of the allowed frequency range via hardware switches. Also the assignment can be done at installation time of the SUDAC.

Although the above described scenarios refer to frequencies 1-4, it is obvious that this also applies to frequency ranges in which communication links are established and/or messages or signals are sent.

Figure 9:
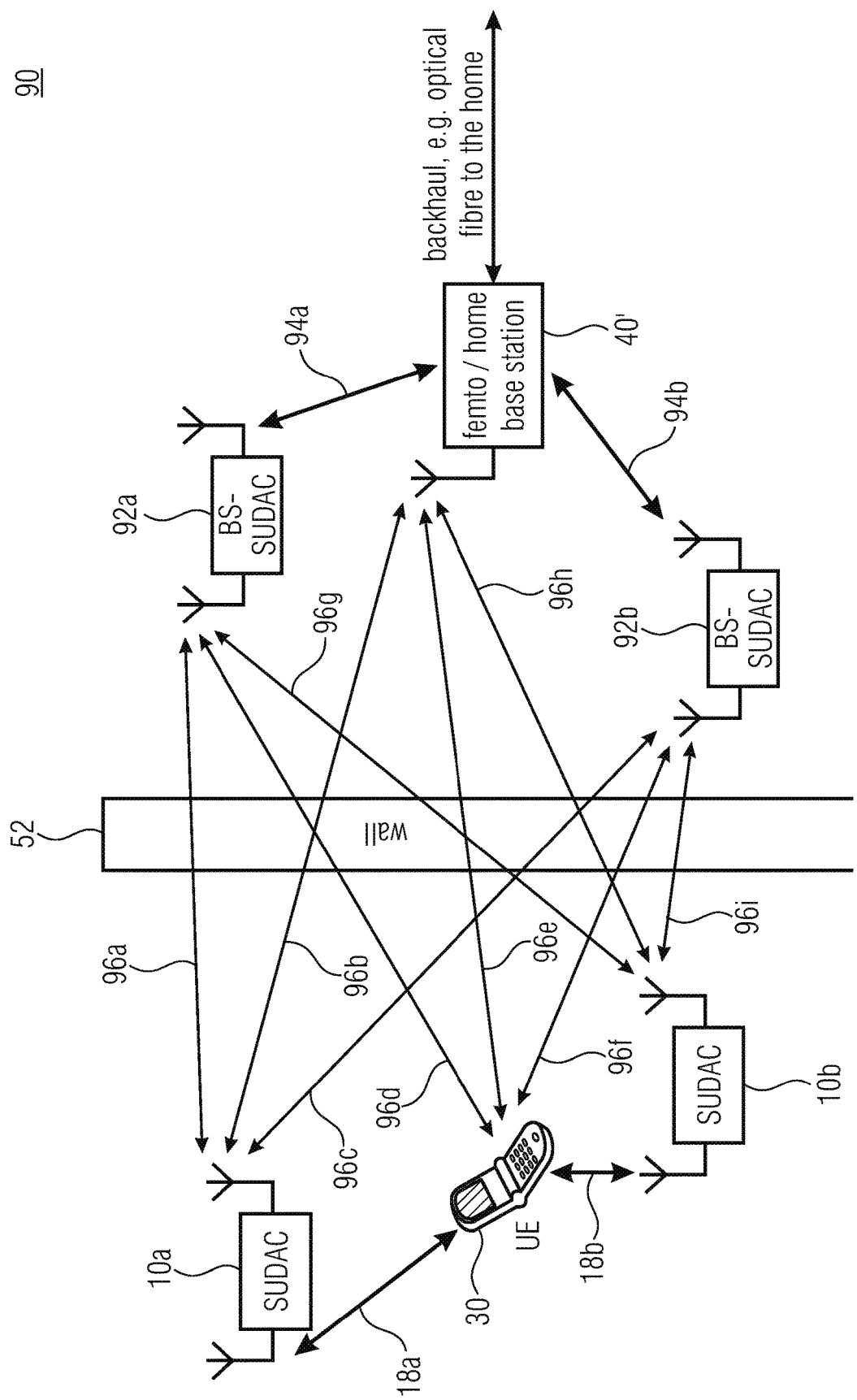
FIG. 9 is a schematic block diagram of a SUDAC system comprising a first and a second BS-sidel-SUDAC configured for establishing an inter-backend communication link with the base station using the extremely-high frequency.

FIG. 9 shows a schematic block diagram of a SUDAC system 90 according to an embodiment. The SUDAC system comprises a first and a second BS-side-SUDAC 92a and 92b configured for establishing an inter-backend communication link 94a, 94b respectively with the base station 40' using the extremely-high frequency. The base station 40' is configured for receiving information from a service provider, e.g., the base station 40' may be a local home base station such as a home server comprising a backhaul connection, e.g., via an optical fiber, a wired connection or a wireless connection. This may be called a femto base station or a home base station. The base station 40' comprises a plurality of wireless communication interfaces or antennas, e.g., 3, 4 or more. As stated above, a SUDAS may also be realized without a home base station.

The base station 40' is configured for establishing the inter-backend links 94a and 94b based on a LOS connection to the BS-side-SUDACS 92a and 92b. The BS-side-SUDACS 92a and 92b may thus be utilized as virtual antennas of the base station 40'. When compared to the SUDACs 10a and 10b utilized by the user equipment 30, the base station 40' utilizes the BS-side-SUDACs 92a and 92b in a similar way, wherein a communication between the base station 40' and the BS-side-SUDACs 92a and 92b on the first side and the user equipment 30 and the SUDACs 10a and 10b on the second side is enabled by intra network links 96a-i which are established using the ultra-high frequency. This allows for a distribution of information from the base station 40' to the SUDACs 10a and 10b in a more efficient way, as not only one connection link is established between the base station and a SUDAC each communication partner, user equipment 30, SUDACs 10a, 10b, BS-side-SUDACs 92a and 92b and base station 40', may communicate via a plurality or even a multitude of channels to each other.

The BS-side-SUDAC may be implemented by a SUDAC 10 or 10' configured for establishing a communication link to the base station 40' using the extremely-high frequency and to further SUDACs 10a and 10b and/or to the user equipment 30 using the ultra-high frequency. In simple words, the BS-side-SUDACs 92a and/92b may be a SUDAC 10 or 10' communicating with the user equipment and the base station in swapped roles.

Alternatively the SUDAC system 90 may comprise only one BS-side-SUDAC 92a or 92b and/or a different number of SUDACs, e.g., zero, one or more than two.

In other words, the SUDAS infrastructure can be used to communicate not only from outside a house (Base Station) to the inside, but also for communication between rooms. As depicted in FIG. 9 a home has an (optical) fiber-to-the-home connection that terminates e.g. in the living room. Hence, there is a femto (or home) base station 40' in the respective room, e.g., the living room that possibly uses EHF (band 2) communication in order to provide high data rates to all devices inside the living room. However, in order to reach high data rates also in other rooms (e.g. in the home office), EHF communication is not possible as it might not penetrate the walls. Conventional W-Fi might not deliver the desired high data rates, as the MIMO gain is too small (e.g., when the femto base station 40' has at most 4 antennas). However, the femto-BS could communicate to multiple SUDACs in the living room using EHF and transmit a precoded virtual MIMO (VMIMO) signal to these SUDACs 92a and 92b, which then relay the signal over a s6G frequency band (band 1) to the home office. Here, several SUDACs 10a and 10b receive the VMIMO signal and forward it over EHF to the user equipment 30, which can then carries out the VMIMO decoding. Of course, the same applies in the other direction for the uplink. This scenario may necessitate for a resource allocation, which includes also the femto base station 40', as it makes use of links/channels in band 2 (which are called "frontend links", but the meaning of this is breached in this scenario).

Figure 10:
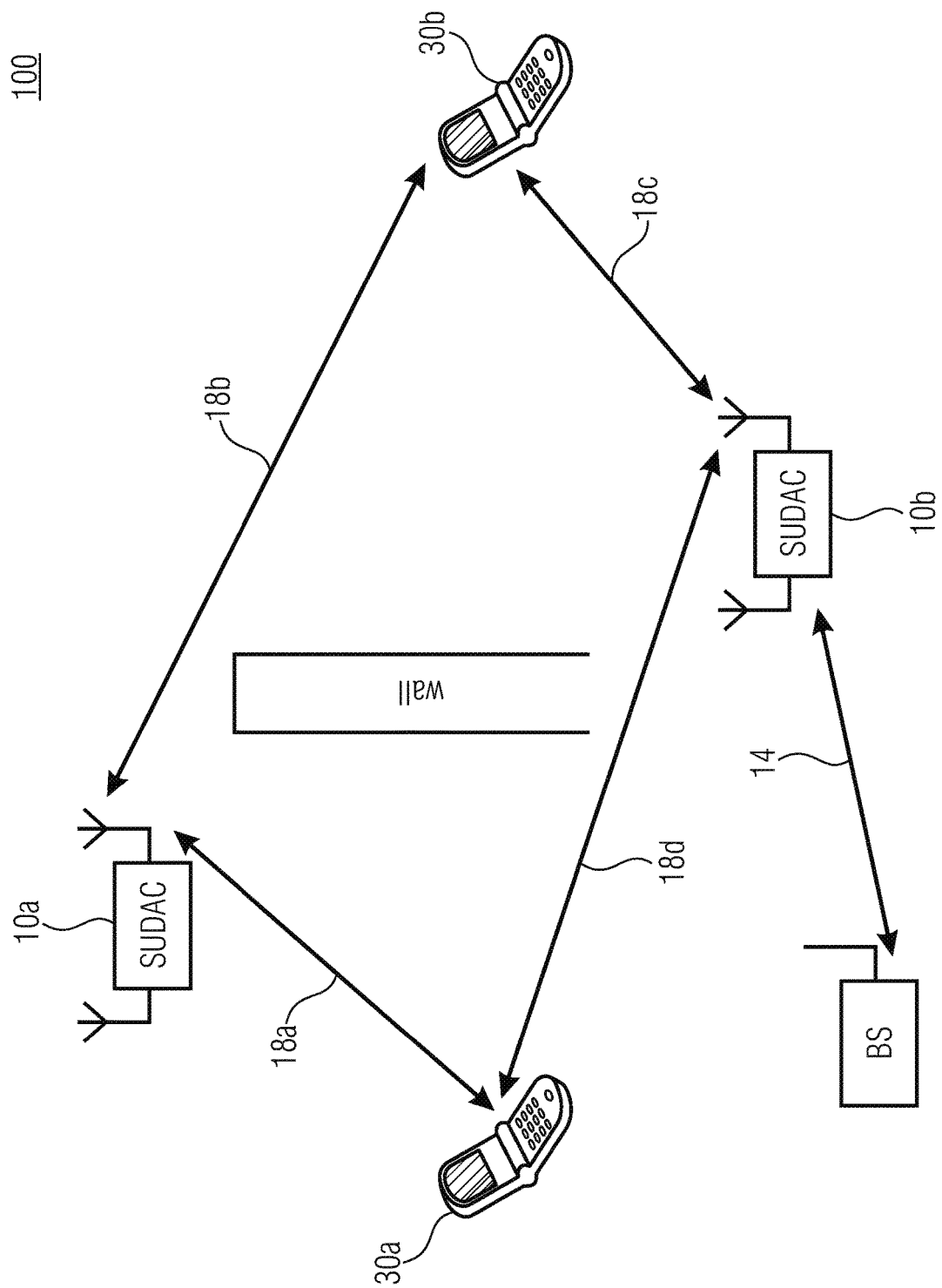
FIG. 10 is a schematic block diagram of a SUDAC system comprising two user equipment and two SUDACs, wherein a backend communication link from a SUDAC to the base station is inactive.

FIG. 10 shows a schematic block diagram of a SUDAC system 100 comprising two user equipment 30a and 30b and two SUDACs 10a and 10b. The SUDAC 10a has established a frontend communication link 18a with the user equipment 30a and a frontend communication link 18b with the user equipment 30b. The SUDAC 10c has established a frontend communication link 18c with the user equipment 30b and a frontend communication link 18d with the user equipment 30a. The backend communication link 14 between the base station 40 and the SUDAC 10b is (temporarily) inactive, e.g., as none of the user equipment 30a and 30b requests service from the base station 40. Thus, the user equipment 30a and 30b and the SUDACs 10a and 10b may switch to a device-to-device (D2D) operation mode, e.g., based on a missing or inactive communication link to the base station 40 or based on a user command transmitted by the user equipment 30a or 30b.

The SUDAC System 100 allows for an efficient propagation of information and/or data from one user equipment 30a or 30b to another. This may be intended, for example, for video or audio broadcasting or sharing within a small room or space, e.g., inside a building or a car. The SUDAC System 100 may switch back to regular operation as described above, for example based on a user command or based on a communication request from the base station to a user equipment 30a or 30b or vice versa. Resource allocation may be performed by the SUDAC 10a, 10b, the user equipment 30a and/or 30b. Thus, at least one of the communication partners 10a, 10b, 30a and 30b may be necessitated to be aware of the rest of the communication partners to determine and propagate resource allocation.

Alternatively, only one or more than two SUDACs may be arranged. Alternatively or in addition more than two user equipment may be arranged.

In other words, a scenario similar to the scenario depicted in FIG. 9 exists, when two UEs want to exchange data directly (not via a Base station). This is called device-to-device (D2D) communication. One use case is inside a car, where a video player wants to transfer a video to the rear-seat entertainment system including the screens. If the UEs do not "see" each other, they have to communicate using the SUDAS infrastructure in the car. Observe that all communication between the two UEs/devices (by way of the SUDACs) may take place in EHF in this case (in s6G, propagation conditions may be better, but possibly the desired data rate is not reachable in this case). Basically, a single SUDAC would suffice to relay the EHF signal from UE 30a to 30b and/or vice versa. However, there may be reasons, why multiple SUDACs are involved. For example, each individual SUDAC does not provide channels of large enough bandwidth, such that the desired data rates cannot be reached, when using a single SUDAC, but multiple SUDACs have to be used together. Alternatively or in addition, space diversity might be a further reason, as people are moving in the car, and the car is moving in the street, such propagation conditions can vary rapidly. Such a scenario may be taken into account, when the resources in EHF are allocated.

Figure 11:
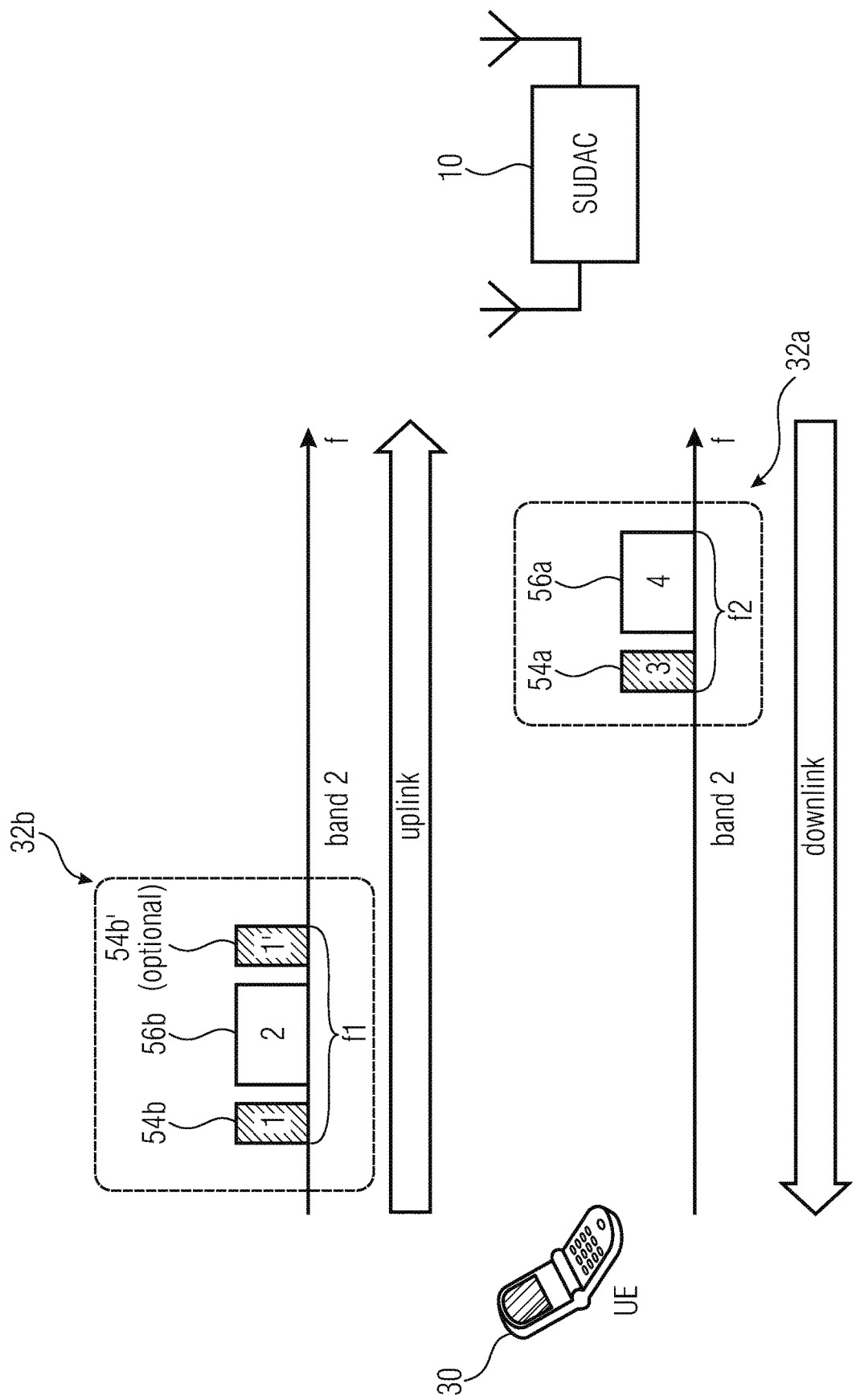
FIG. 11 is a communication between the user equipment and the SUDAC and in particular a payload and status-control channel association according to an embodiment.

FIG. 11 illustrates a communication between the user equipment 30 and the SUDAC 10 and in particular a payload and status-control channel association. For the sake of clarity the user information signals 32a sent by the SUDAC 10 and 32b sent by the user equipment 30 are depicted as being spaced in the frequency domain. Alternatively or in addition, the signals 32a and 32b may also be separated in the code domain, in the time domain and/or in the space domain. Both signals 32a and 32b comprise a status/control channel 54a and/or 54b, i.e., a resource configured for comprising status information and/or control information, for example, the control information 24 described in FIG. 1. The signals 32a and 32b also comprise a payload channel 56a and 56b configured for comprising payload data, i.e., information related to services like email, videos, pictures, messages or the like.

The user information signals 32a and 32b are transmitted in the extremely-high frequency and may be, for example, be transmitted at different frequencies, frequency ranges respectively at f1 and f2. Thus, interference between the user information signals 32a and 32b may be reduced or avoided. In case of time division multiple access (TDMA) the status/control channel 54a and/or 54b may be embedded in the payload channel 56a and/or 56b. The status/control channel 54a or 54b will in this case be transmitted in the same time-slot as the associated payload which allows to switch off all transmitters while receiving and vice versa. This may result in a scheme as it is similarly used by IEEE802.11ad but with a much higher degree of freedom. Although the status/control channels 54a and 54b are described in the frontend communication link, the status/control channels may alternatively or in addition also be implemented in the backend communication link.

The status/control channel 54a is associated with the payload channel 56a. The payload/control channel 54b is associated with the payload channel 56b such that the SUDAC 10 and/or the user equipment 30 may receive information on how to proceed with the payload data in the associated status/control channel. This allows for forwarding the data of the payload channel while maintaining the data itself unchanged. Alternatively, the data may be changed and information referring to the changes may be transmitted via the status/control channel 54a and/or 54b.

The status/control channels 54a and 54b may comprise information related to channel estimation. For example the information related to channel estimation may comprise parameters indicating a phase shift or allowing for a compensation of the phase shift of the transmission channel. Based on a comparison of a received symbol received at a known frequency range and a known symbol, distortions of the channel may be derived. I.e., by transmitting the known symbol at the known frequency in the status/control channel 54a and or 54b channel distortions may be estimated by a receiving communication partner 10 or 30. Alternatively or in addition information related thereto (e.g., already derived channel distortions) may be transmitted by the transmitting communication partner 10 or 30. The receiving partner 10 and/or 30 may be configured for equalizing the received signal 32b and/or 32a to increase signal quality and thus channel throughput.

As channel distortions such as fading may be frequency selective, also the possibilities of equalization may be frequency selective. In simple words, a status/control channel may allow for equalization in a frequency range, for example of approximately 10, 20 or 30 MHz. The status control channels 54a and 54b are depicted exemplarily as being arranged at a lower frequency when compared to a frequency of the payload 54a, 56b respectively. Alternatively, the status control channel of the user information signal 32a and/or 32b may be arranged at a higher frequency. Optionally, a second (or even further) status control channels may be associated to a payload channel as it is indicated by the optional status control/channel 54b' arranged at a higher frequency than the payload channel 56b associated thereto. A second (or even further) status/control channel 54b' may allow for an increased bandwidth that may be equalized. This may allow for an increase of a bandwidth of the payload channel 56a and/or 56b.

Alternatively or in addition, a payload information to be forwarded may be divided into a plurality of portions, the plurality of portions being divided (when considering a FDD transmission) by status/control channels 54a and/or 54b, 54b' respectively. Alternatively, when transmission utilizes TDD, space division and/or code division above descriptions may also apply in the respective domain although, for example in TDD a frequency range of status/control channel 54a respectively 54b and optionally 54' and of the payload channel 56a respectively 56b is the same.

Figure 12:
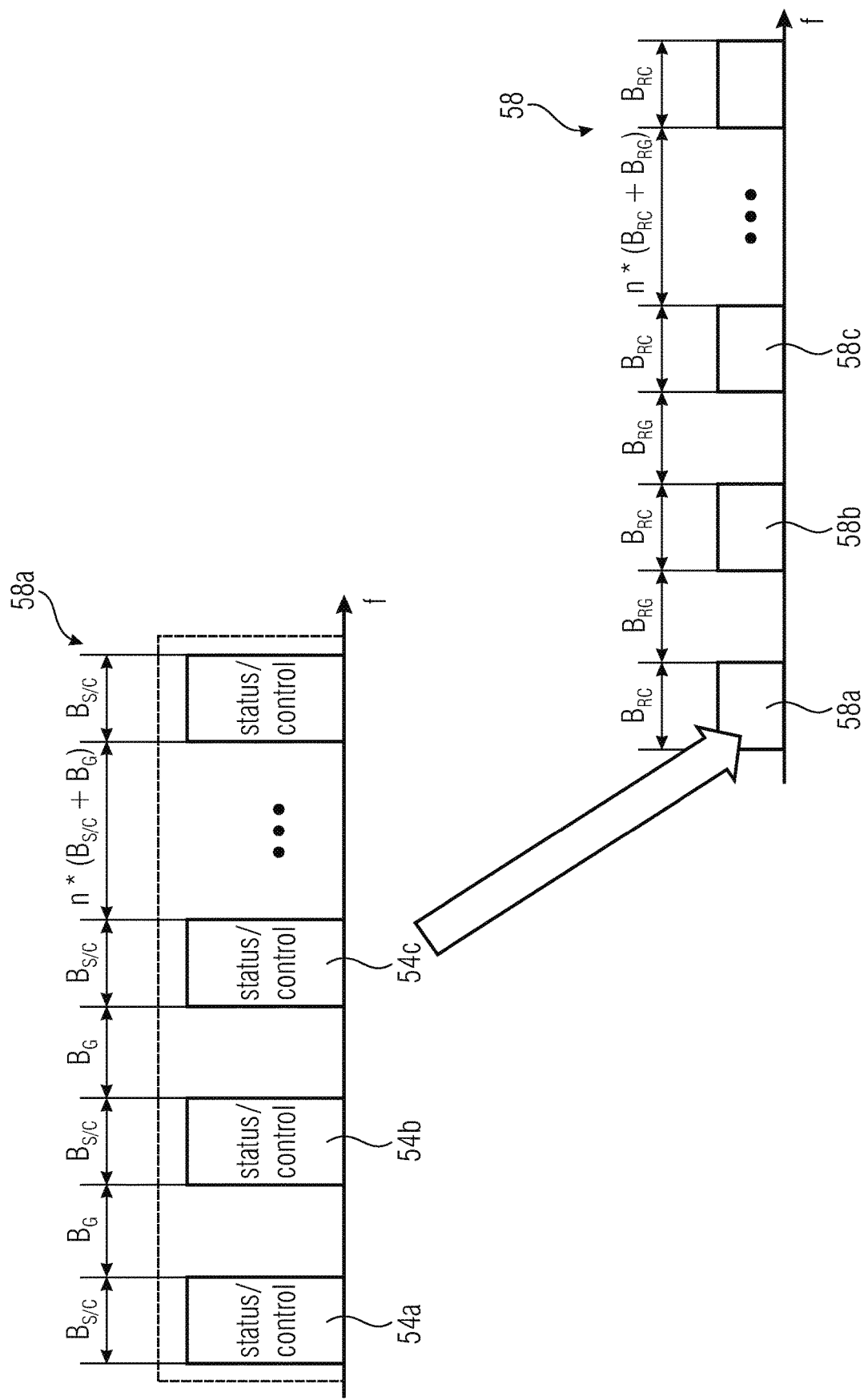
FIG. 12 is a schematic structure of a plurality of rendezvous-channels that may be implemented in the extremely-high frequency in communication links between a SUDAC and a user equipment according to an embodiment.

FIG. 12 shows a schematic structure of a plurality of rendezvous-channels that may be implemented, for example, in the extremely-high frequency in communication links between a SUDAC and a user equipment. A plurality of rendezvous channels 58a-c each comprising a bandwidth of the respective rendezvous-channel indicated as $B_{RC}$ are arranged adjacent to each other in the frequency domain and spaced to each other by a bandgap between the rendezvous channels 58a-c, the bandgap indicated as $B_{RG}$. Alternatively, the rendezvous channels 58a-c may be arranged such that the rendezvous channels 58a-c are spread across the spectrum, e.g., such that a payload channel 56a or 56b is arranged between two rendezvous channels 58a-c. A rendezvous channel 58a-c comprises at least one status/control channel 54a, 54b or 54'. A spreading of the rendezvous channels 58a-c and therefore of the status/control channels may allow for a good estimation of signal distortions as it is described for FIG. 11.

Each rendezvous channel 58a-c may comprise a plurality of status/control channel 54a-c, each comprising a respective bandwidth in the frequency range and indicated as $B_{SC}$, wherein the status/control channels are separated to each other by a bandgap between the status/control channels indicated as $B_G$. Thus, a plurality of status/control channels may be aggregated into one rendezvous-channel 58a-c and a plurality of rendezvous-channels 58a-c may be arranged in the frequency range. This allows for flexibly assigning status/control channels 54a-c to payload channels. In addition, the status/control channels 54a-c may be used as a wake-up signal for SUDACs being in a low-active (operation) mode (sleep-mode) for indicating that the respective SUDAC may change into an active operation mode. A bandwidth of status/control channels 54a-c, of the bandgaps $B_{RG}$ and/or $B_G$ and/or of rendezvous-channels 58 may be highly flexible. A reduced bandwidth may allow for density of the status/control channels 54a-c and therefore for a reduced bandwidth of the rendezvous-channels 58a-c.

Alternatively or in addition, one or more rendezvous-channels may also be implemented in the backend communication link between the SUDAC and the base station and using the extremely-high frequency.

In other words, in band 2 (extremely-high frequency) certain frequency bands may be reserved as rendezvous-channels. The frequency distance spacing of the rendezvous-channels is, for example, predefined in the SUDAC. An actual layout may be definable for example as regular distance, regular distances omitting certain frequency bands like, for example, those in the frequency range of the low-rate channels of IEEE 802.11ad or completely arbitrarily. In the latter case the frequency positions of the SUDACs rendezvous-channels may be shared between the user equipment and the respective SUDAC as a fixed set of parameters that nevertheless have to be available in all system configurations or on an alternative interface such as Bluetooth, wired internet, USB or the like. Within a rendezvous-channel 58a-c a number of status/control channels 54a-c may be provided.

These channels incorporate a much smaller bandwidth than what may be necessitated to transmit payload data. By that it is possible to separate a large number of status control/channels by frequency and keeping a relative small bandwidth. An additional separation in the time/code-domain is still possible. The purpose of the status/control channel is manifold. It may act as beacon signal for the purpose of discovery, it may provide status information on the SUDAC and also on the SUDAS and/or may be a payload independent interface for acquiring control of a SUDAC. Also the status/control channel may be used to sustain an established SUDAC acquisition, i.e., a user interface and/or a base station may continue to control the SU DAC.

The status/control channels may be defined in an additional channel to the payload channel in the time-frequency-code-space. The overall bandwidth of a channel (consisting of status/control and/or payload channel) is configurable.

The frontend communication link can be used, for example, in frequency division duplex (FDD) or time division (TDD) mode. The latter one may necessitate the SUDAC and UE to synchronize their transmissions while FDD allows completely asynchronous transmissions.

If the fronted link is used in frequency division multiple access (FDMA) mode, a part of the spectrum may be reserved for the status/control channel. The status/control channel may be positioned in a well-defined distance close to the frequency band used for the payload so that both can be received or transmitted by the same RF-stage. The transmission direction (uplink or downlink) of the payload and its associated status/control channel may be in this case identical.

In case of time division multiple access (TDMA) the status/control channel is embedded in the payload channel. The status/control channel will in this case be transmitted in the same time-slot as the associated payload which allows to switch of all transmitters while receiving and vice versa This results to a similar scheme as used by IEEE 802.11ad but with a much higher degree of freedom: A number of rendezvous channels is configurable, FDD is implemented as a further degree of freedom for the rendezvous channels and/or the frequency location of the rendezvous is configurable.

Attention shall now be given to the association of payload and status/control channels. The payload channel contains the data that are intended for the BS (uplink) or the UE (downlink). The payload is not analyzed but only forwarded directly or by compress and forward/decode and forward methods. As described above the status/control channel provides an interface for the UE or SUDAC to get access to the transmission partner, allow a synchronization of the devices and estimation of the propagation channel and to provide status information to the link partner and other listening devices. An additional function of the status/control channel is to provide extra information (e.g. pilot symbols) that is necessitated for reliable and accurate the channel estimation. To be able to provide this each payload channel is associated with one or multiple status/control channels.

The status/control channel as described above is defined for band 2 (extremely-high frequency). This status/control channel terminates/origins in the SUDACs and UEs. An additional status/control channel to the BS can be established in band 1 (ultra-high frequency). For this the BS may implement, i.e., may be configured for a switching between a spatial multiplexing mode and a beamforming mode to establish a connection with the SUDAC. A SUDAC is necessitated to provide only a single antenna for band 1. More antennas are possible but due to the sub6G link's frequency the correlation distances between 2 antennas may be larger than a typical SUDAC size. Therefore multiple antennas in the sub6G are probably provided via external interfaces to the SUDAC (e.g. an antenna connected via cable) although SUDACs with a large enough size for multiple antennas are feasible (e.g. integration of a SUDAC into a Television set). Finally a SUDAC could act as use other SUDACs from its SUDAS as external antennas similar to a UE. Then, this requirement may become obsolete. Transmission of different information to different communication partners may be enhanced by the base station by adapting transmission modes. For example, when the base station transmits or receives information via the backend communication link to or from the user equipment, the base station may implement a spatial multiplexing. When the base station transmits or receives the status/control information to or from one or more SUDACs, the base station may implement a beamforming. The controller of the base station may switch between this two modes and/or other modes in constant or variable intervals. Alternatively or in addition, the controller may be configured for switching between the modes based on the message or information to be sent or expected to be received. Alternatively, the base station may implement both functions at the same time, for example when using different antennas for each function.

Both payload and status/control channel can be disabled for certain modes of operation. While a SUDAC is waiting for configuration i.e., by a user equipment or an base station, (rendezvous mode) the payload channel may be disabled. This allows maximizing the number of SUDACs that can utilize a single rendezvous band, as the channel bandwidth requirement of a single channel can be minimized by transmitting only the narrowband status/control channel. In case of unidirectional data transmissions (e.g. broadcast or unidirectional (uplink/downlink) time spans in TDD mode) the payload channel is deactivated for one direction. The status/control channel has to be available nevertheless as it is necessitated for a connection between SUDAC and UE. The status/control channels for such transmissions may be located in the rendezvous channel range if FDD is used and no return channel is needed to the payload origin (e.g. BS). Else it can be used in FDD and also in TDD to feed-back continually status information to the payload transmitter (UE or SUDAC).

In case of unidirectional data transmission the payload channel may be disabled for the direction where there is no data transmission. In case a second UE is using the same SUDAC piggyback together with the first UE (FDD mode, shares the same frequency range but uses a different frequency) it does not transmit a status/control channel to provide a continuous use of the backend spectrum.

In other words, a user equipment may comprise a regular mode, wherein it transmits a payload data and an associated status/control channel and a piggyback mode in which it simply transmits the payload data, for example to another user equipment which piggybacks the data.

Thus, a bandwidth of the status/control channels, of the rendezvous-channels and/or of the payload channels may be adaptable. The processor of the SUDAC may be configured for adapting parameters of the signaling/control channel while frequency converting a received signal. This allows for updating or changing the respective information associated with a probably changed payload data. For example, the SUDAC may indicate with the changed status/control channels that a piggyback mode is used and that further data extending to the data of an associated user equipment is included in the payload channel.

Alternatively or in addition, the processor of the SUDAC may be configured for changing a bandwidth of the payload channel, i.e. to increase or to reduce it. If the bandwidth is increased, this may be indicated in the status/control channels with a respective information. For example, if a lower bandwidth of status/control channels is used or necessitated, the now unused bandwidth may be used for transmitting payload data, for example with a lower compression rate which may allow for less computational effort and less time delay. I.e., This allows for the processor of the SUDAC to implement a variable rate of compression or decompression based on the control information from the user equipment or from the base station.

Alternatively, if a higher bandwidth of the status/control channels is used or necessitated, the bandwidth of the payload channel may be reduced such that a higher bandwidth is available for signalizing. Then, when comparing two time frames having the same length, in a first time frame (time duration) in which the bandwidth of status/control channels is increased, a lower number of bits will be transmitted via the payload channel when compared to a time frame (time duration) where the bandwidth of status/control channels is not increased. Alternatively or in addition, also a number of status/control channels may be varied, e.g., in a scenario where a payload channel is temporarily associated to further status/control channels.

Alternatively or in addition, the status/control channels may be implemented in the backend communication link as it is stated above. The SUDAC may be configured for transmitting or receiving control data via the control/status channels to or from the base station. The processor of the SUDAC may be configured for adapting the status/control channels to adapt a channel allocation or bandwidth allocation of the base station based on received control data in the status/control channels. For example, if the user equipment sends a request for higher data rates, the SUDAC may use the status/control channels to control the base station accordingly. Alternatively or in addition, the base station, when being requested to organize the network, may send control data to the SUDAC such that the SUDAC changes parameters of the frontend communication link or alternatively switches to the sleep-mode.

Depending on a decision of the user equipment (e.g., by algorithm aiming for high resource utilization and/or based on a user command), which instance is selected to organize the network, (which may be the user equipment itself, the SUDAC or the base station), also the user equipment may request the base station for controlling the network.

Thus, the user equipment may transmit control information via the status/control channels of the frontend communication link or via the direct link to control the SUDAC. For example, the user equipment may send control information to the base station via the direct link, the information related to the SUDAC such that the base station controls the SUDAC based on the control information.

Figure 13:
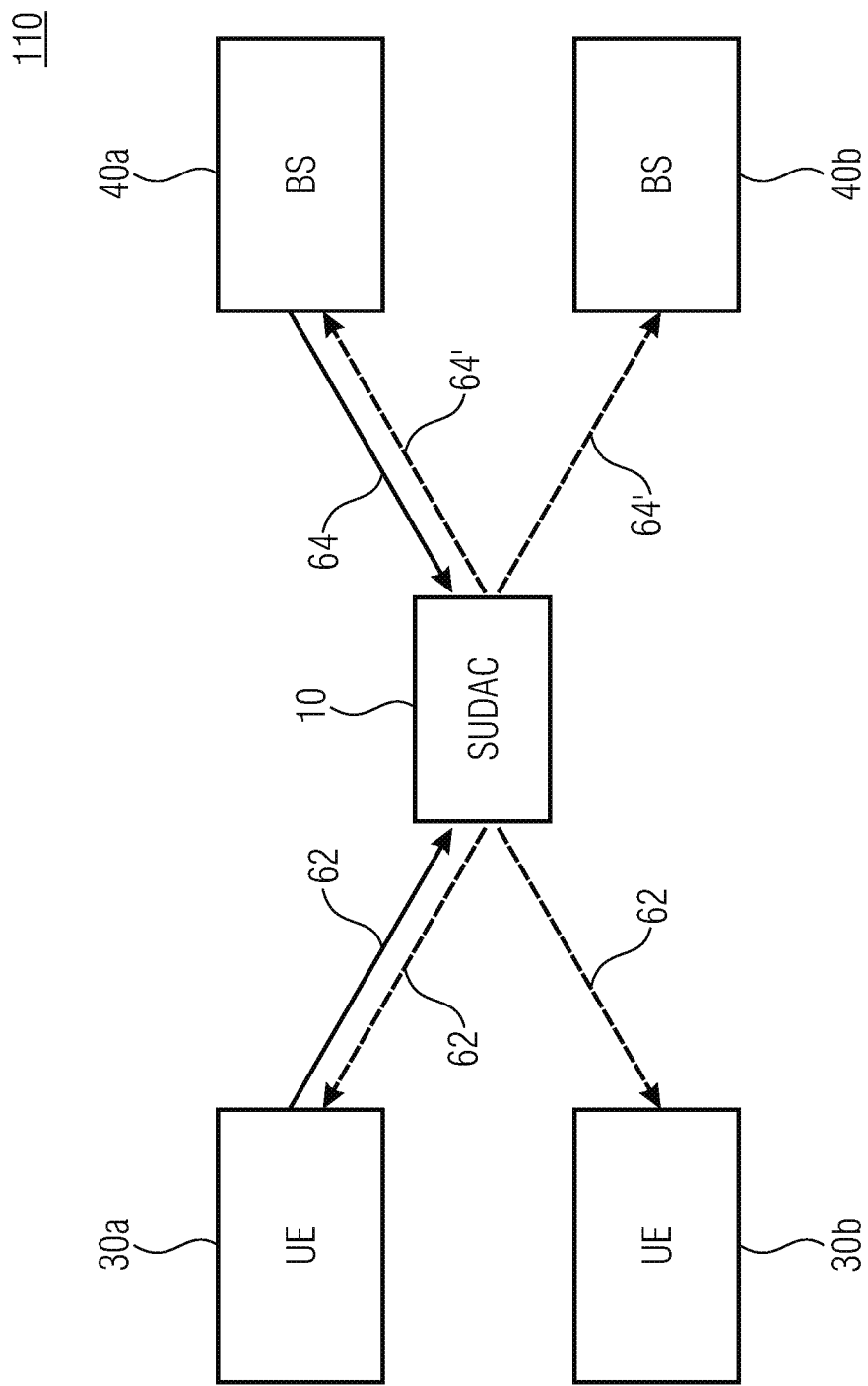
FIG. 13 is a schematic diagram of a SUDAC system comprising the SUDAC, two user equipment devices as well as two base stations according to an embodiment.

FIG. 13 shows a schematic diagram of a SUDAC system comprising the SUDAC 10, the user equipment 30a and the user equipment 30b as well as the base station 40a and the base station 40b. In wireless networks, it may be important to provide and propagate information of a user or a network node to other participants. Therefore, the frontend communication link and/or the backend communication link may comprise a random access channel (RACH) in which regular communication may be skipped. Other participants or participants who want to transmit data further to normal communication may access the random access channel and transmit data as it is depicted for the user equipment 30*a*. The user equipment 30*a* transmits the random access data or random access information 62 via the frontend communication link. The SUDAC 10 is configured for retransmitting (loopback) the random access information 62 such that a loopback function is implemented. As wireless communication may be regarded as a broadcast, all user equipment 30*a* and 30*b* in range receive the information. The user equipment 30*a* may use the received information for performing additional functions such as channel estimation as it knows the random access information 62 it has sent. The user equipment 30*b* controlling the SUDAC and transmitting its data via the SUDAC 10 to the base station 40*b* may receive data from the user equipment 30*a* by this procedure even if there is no direct connection between the user equipment 30*a* and 30*b*. Thus, the user equipment 30*a*, respectively the processor (e.g., by the processor 31 depicted in FIG. 3) may be configured for evaluating (comparing) the transmitted random frontend information 62 and the received random access information 62 such that an information related to the frontend channel is obtained. Alternatively, the random access information 62 may be evaluated to obtain information from the further user equipment 30*b* or from a (further) base station 40*a* or 40*b*, especially when the user equipment has not sent the random frontend information 62. The base station 40*a* is configured to access a backend random access channel by transmitting a random backend access information 64 which may be processed by the SUDAC 10 in terms of retransmission in the frontend link and/or in the backend link.

The SUDAC 10 may be configured to evaluate the random access information 62 or the random backend information 64 and to execute operations or to adapt an operation mode according to the random (backend) access information 62 and/or 64. An operation executed may be, for example a transmission of an information related to an acknowledgment indicating that the random (backend) access information 62 or 64 was received correctly. Alternatively the operation executed may be a newly generated message informing communication partners 30*a*, 30*b*, 40*a* and/or 40*b* in range about received information. Alternatively, the random access information 62 may comprise a priority information of the user equipment 30*a* not controlling the SUDAC 10. For example, the SUDAC 10 is located inside a building (home) of a user of the user equipment 30*a*. The user equipment 30*b* is operated by a guest. The user equipment 30*a* may be associated with the SUDAC 10. The user equipment 30*b* may control the SUDAC 10, e.g., as the user equipment 30*a* is not present. If the user equipment 30*a* starts operation (is present) and/or a user command is performed at the user equipment 30*a*, the random access information 62 may comprise the priority information indicating that the SUDAC is requested to be controlled by the user equipment 30*a* and not by the user equipment 30*b*. The SUDAC may then be configured to change the operation (mode) according to the commands received from the user equipment 30*a*. The changed operation may also comprise a command to stop operation and/or to change to a sleep mode. Such commands may alternatively or additionally be received by the base station 40*a* and/or 40*b*, by the random backend access information 64.

Alternatively or in addition, the SUDAC 10 may be configured for transmitting the random access information 62 via the backend communication link after frequency converting the random access information 62 to a random access information 62' which is compatible to the requirements of the backend communication link. Alternatively or in addition, the base station 40*a* may be configured for transmitting random access information via a random access channel of the backend communication link to the SUDAC 10. The SUDAC 10 may retransmit the random backend information on the backend communication link which may enable an interbase station communication. Further, the SUDAC 10 may be configured for transmitting the random backend information via the frontend communication link to broadcast the information to the user equipment 30*a* and/or to the user equipment 30*b*.

One other special case of transmission is a payload channel loopback on the EHF as well as on the s6G side of the relay. This is an optional mode that allows a SUDAC to act also as an inband (EHF-EHF or s6G-s6G) or as an interband (EHF-s6G or vice versa) relay.

In other words, a novelty of the concept is the loopback part of the status/control channel. This concept may become advantageous if a UE wants to use a SUDAS, only discovers used SUDACs and is not able to establish a direct connection to the UE which uses the SUDACs.

The loopback information can be also analyzed by the SUDAC-processor. This can decide to act to some special commands (e.g. forward some information to a backend status/control channel, force a connection release to a user equipment (e.g., 30*b*) or the like. By this a loopback forward to the backend side (or vice versa) can be done (if a backend status/control interface is implemented. Nevertheless all devices that have a status/control interface (SUDAC, UE, BS) have to retransmit the loopback data as an acknowledge and relaying of the data.

FIG. 14*a* and FIG. 14*b* illustrate details on the loopback function. In FIG. 14*a* the user equipment 30*a* is associated with the control/status channel 54*a* of the SUDAC 10. During a time not used by the user equipment 30*a* the user equipment 30*b* transmits a loopback request, i.e. the random access information 62. The time in which such a transmission is allowed may be indicated by so-called pilot symbols 66*u* transmitted by the user equipment 30*a*. The further user equipment 30*a* is configured for transmitting the pilot symbols 66*u* according to a pattern (e.g. time distance between the pilot symbols 66*u*). The further user equipment 30*b* is configured for synchronizing to the pattern, i.e., to the pilot symbols 66*u* and for transmitting the random access information 62 at a time (or frequency) slot reserved for therefore.

FIG. 14*b* shows the retransmission of the SUDAC 10 in which the loopback response is inserted between two pilot symbols 66*s* transmitted by the SUDAC 10. Thus, the SUDAC 10 relays the loopback request 62 to its downlink channel. Alternatively, the SUDAC 10 may also send a modified version of the random access information 62. For example, the user equipment 30*b* may recognize the SUDAC 10 and may also recognize that the SUDAC 10 is in use, i.e., controlled by another user equipment. The random access information 62 may relate to requesting information related to the user equipment controlling the SUDAC 10, to an information related to a base station associated to the SUDAC 10 or the like. The loopback response of the SUDAC 10 may then comprise the requested information, i.e., the SUDAC may provide the requested information. Alternatively or in addition, the SUDAC 10 may be configured for only transmitting a payload portion of the random access information 62.

Alternatively or in addition, the pilot symbols 66u and/or 66s may be included into a status/control channel as it will be described in FIG. 19.

In other words, while user equipment 30a is the only user equipment that is allowed to transmit status, commands, and command response information, user equipment 30b sends data in the loopback request slot. This data is later retransmitted as a loopback response on the downlink channel of the SUDAC 10. The message indicated as L1 may also contain additional pilot symbols for synchronization and channel estimation purposes.

Any UE that is aware of the frontend-link configuration of the SUDAC may synchronize to that SUDACs transmission structure by listening to its frontend-downlink channel. It then is able to insert information to the SUDACs frontend uplink channel which is in the further relayed on the SUDAS frontend downlink channel. By that it may be ensured that especially the UE which control the SUDAC and the UE which transmits the information receive the relayed message. This method can for example be used to enable communication between 2 UE, broadcast messages to all listening UE just as a direct loopback link for a single UE.

FIG. 15a illustrates the conversion of the frontend communication link 18 to the backend communication link 14 in an uplink direction and performed by the SUDAC 10. The SUDAC 10 receives the user information signal 32b comprising the status/control channels 54 and the payload channel 56. The SUDAC converts the payload 56 to a payload 56', e.g. by a compressed and forward method. The communication signal 42a is sent at a different frequency as indicated by the terms $f_{tuneBand2a}$ and $f_{tuneBand1a}$. The payload 56'a is separated by a bandgap $B_{G2}$ from payload from other SUDAC 56'b. The payload 56 is separated by a bandgap $B_{G1}$ from the status/control channel 54. The bandgaps $B_{G2}$ and $B_{G2}$ may comprise a bandwidth equal or different to each other. Alternatively or in addition, information transmitted via the payload channel 56'a may comprise a plurality of portions of information received via the payload channel 56 received by the SUDAC 10 and aggregated to the payload 56'a. As stated above, although the status/control channels 54 are depicted as being separated from the payload channels in the frequency domain, they may also be transmitted via the same frequencies, for example, when using a TDMA transmission mode.

FIG. 15b depicts a conversion of the SUDAC 10 in a downlink direction. The communication signal 42b comprises the payload channel 56 at a center frequency ftuneBand1b that may be different from the center frequency ftuneBand1a depicted in FIG. 15a such that interference between the signals 42a and 42b is reduced or avoided. The SUDAC 10 converts the communication signal 42b to the user information signal 32a comprising the status/control channel 54 and payload 56 that may be, for example, compressed when compared to the payload 56'. A center frequency of the user information signal 32a is denoted as $f_{tuneBand2b}$ and may be different from the center frequency $f_{tuneBand2a}$ depicted in FIG. 15a.

FIG. 15a and FIG. 15b exemplarily depict a relation between a status/control channel 54 and payload channels 56, 56', 56'a and/or 56'b. The status/control channel 54 and the payload channel 56 may be transmitted at different frequencies as it is depicted in FIG. 15a and FIG. 15b. In case of time division multiple access (TDMA) the status/control channel 54 may be embedded in the payload channel 56. The status/control channel 54 will in this case be transmitted in the same time-slot as the associated payload which allows to switch off all transmitters while receiving and vice versa. Utilization of other modulation schemes such as a CDMA or a SDMA may result in similar effects.

FIG. 16a shows a situation modified when compared to the FIGS. 13a and 13b, wherein a bandwidth for payload data denoted as $B_{Relay}$ is larger. The payload data is transmitted in two payload channels 56a and 56b converted to 56'a and 56'b (FIG. 16a) or vice versa (FIG. 16b). I.e., the payload channel can comprise a plurality of different payload information, wherein the bandwidth $B_{Relay}$ may be varied dependent on an actual situation as it was described above. Different payload information may be separated by a bandgap. As in the piggyback mode depicted in FIGS. 14a and 14b the payload data labeled as payload 2 is transmitted without separate status/control information a separation may be implemented. The payload channel 56a is separated by a bandgap $B_{G3}$ from the payload channel 56b. An option is to introduce a guardband comprising a bandwidth $B_{G4}$ of at least $B_{G1}+B_{G3}+B_{S/C}$ between the payload signals in band 1, i.e., in the ultra-high frequency. Although this might be suitable, effects due to noise and interference amplification in the unused bandgap have to be taken into account with a suitable filtering strategy. Alternatively, the bandwidth $B_{G4}$ may comprise a different value, for example a higher bandwidth allowing for filters with less complexity (more flat slope—indicated by the dashed lines around the channels—of the filter function in the frequency range) or a lower bandwidth (allowing for an increased throughput through the media). The bandwidth $B_{G4}$ may also comprise a value of zero, for example, if a single wideband channel is to be aggregated for band 1 (e.g. 200 MHz) from multiple EHF payload channels In other words, the piggyback method is a generalization of dynamically changing the channel payload bandwidth. Through this method it becomes possible to maximize the relay paths of a system as the frontend communication links can be allocated in the same way as the backend communication links are allocated. Therefore simple relaying with an adaptive bandwidth can be used to relay multiple channels.

FIGS. 17a-d illustrate a comparison between a normal allocation and a piggyback allocation. In FIG. 17a it is schematically illustrated that of three user equipment each uses a channel to communicate resulting in three status/control channels 54a-c and three payload channels 56a-c. FIG. 17b illustrates that this might result in a usage of three SUDACs for the backend communication link communication, wherein each SUDAC is configured for performing communication to one base station.

In FIG. 17c it is depicted that by allowing piggybacking, only one status/control channel 54a associated with the payload channels 56a-c is necessitated. Based on the one status/control channel in the backend communication, the information may be transmitted to one base station as it is indicated in FIG. 17d. Thus, the allocation for the extremely-high frequency (band 1) necessitates only one SUDAC.

In other words, to use this method predictably the BS may be necessitated to be aware of the SUDAS. This means that either: a) the BS queries a UE if it uses a SUDAS via the direct UE-BS link and/or relayed link, b) the UE publishes to the BS that it uses a SUDAS (via direct UE-BS link and/or relayed links) and/or c) the SUDAS publishes to the BS its existence (for example by tagging the payload according to the used mobile standard or via backend-link status/control channel).

Having the knowledge of the existence of the SUDAS the BS can allocate the backend communication link channels so that the frontend communication links can be allocated accordingly, e.g. in contiguous frequency blocks. This also includes an allocation across multiple BS. For example 2 UEs that are all connected to a BS of their own operator try to share one SUDAC. One UE has control of the SUDAC. The other UE discover the SUDAC and the configuration and tries to use the piggyback mode. For that the UEs can negotiate via the SUDAC (for example via loopback transmissions) on a valid frequency map. Then they publish the planned piggyback mode to their respective BS which provide information if they are able to support the requested setup or propose and configure alternative allocations. From that the optimum setup may be selected, e.g., by a weighting algorithm. This may even include a forced change of which UE controls the SUDAC.

The status/control channels are used for uplink and downlink. Examples of information that may be supported is provided in the following, wherein it can alternatively or in addition comprise custom information. The mandatory information needs not be provided all the time but can also be transmitted on request (for example the interferer map is a good candidate that needs not be transmitted all the time).

| Information/Function | Explanation |
| --- | --- |
| Pilot Symbols | Special Symbols that allow channel estimation |
| Internal status | Internal information like power consumption, temperature, configuration information, SUDAC capabilities etc. |
| Local MAC address | Unique ID of the device that transmits the status/control info (this may be used to define a SUDAC/UE pairs) |
| Remote MAC address | Unique ID of the device may receive the transmission (this may be used to define SUDAC/UE pairs). This MAC is selected for the duration of a transmission to ensure that only one UE controls a given SUDAC relaying link at a certain time. |
| Frontend Uplink Frequency | Frequency in Hz of the frontend communication link uplink, may of course be an ID if fixed frequency slots are defined |
| Frontend Downlink Frequency | Frequency in Hz of the link downlink, may of course be an ID if fixed frequency slots are defined |
| Backend Uplink Frequency | Frequency in Hz of the backend communication link uplink, may of course be an ID if fixed frequency slots are defined |
| Backend Downlink Frequency | Frequency in Hz of the backend communication link downlink, may of course be an ID if fixed frequency slots are defined |
| Frontend Bandwidth | Bandwidth of current filter used in the frontend |
| Frontend TDMA information | Information on the schedule and usage in case of a time multiplex in the frontend link |
| Backend TDMA information | Information on the schedule and usage in case of a time multiplex in the backend link |
| Backend Bandwidth | Bandwidth of current filter used in the backend |
| Number of UEs using the relaying link | Indication if piggyback mode is used for a certain link |
| ID of UEs using the frontend communication link s | Indication which UEs are using piggyback mode |
| Number of provided relaying links | A SUDAC may implement an unconstrained number of relaying links. |
| Number of used relaying links | A SUDAC may implement an unconstrained number of relaying links. |
| Frontend interferer frequencies | A list containing information on discovered interferers |
| Link Quality indicators | Information on the quality of backend and frontend communication links e.g. signal to noise ratio (SNR) |
| Status/Control layout | Information on which predefines layout or custom layout of the status/control channel is used |

Figure 18:
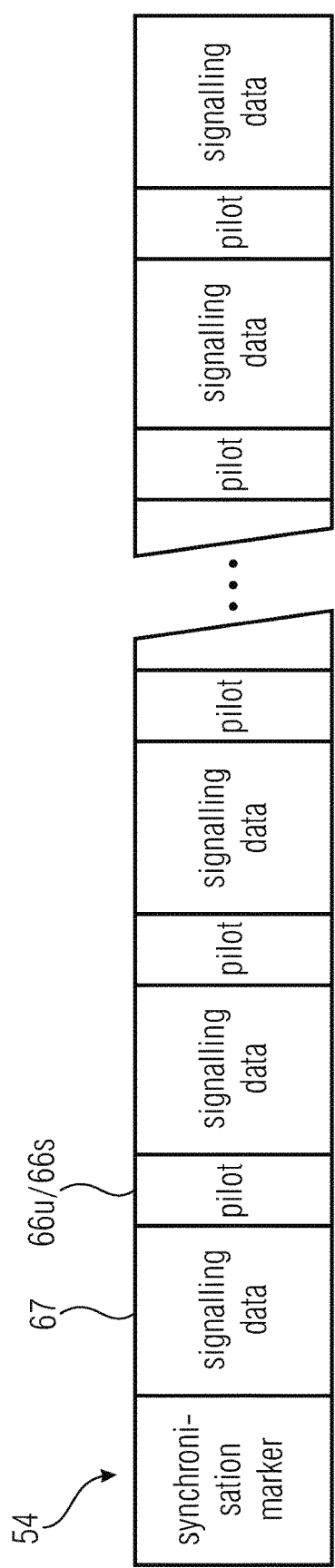
FIG. 18 is a usage of synchronization symbols which are embedded in the status/control channel according to an embodiment.

FIG. 18 depicts a usage of synchronization symbols which are embedded in the status/control channel. The pilot symbols 66 may also be denoted as synchronization markers in the status/control channels 54. The status/control channels 54 contains a frame structure comprising the pilot symbol 66 for a channel estimation and signaling data 67. The signaling data 67 contains different types of sections, as it is depicted in FIG. 19.

Figure 19:
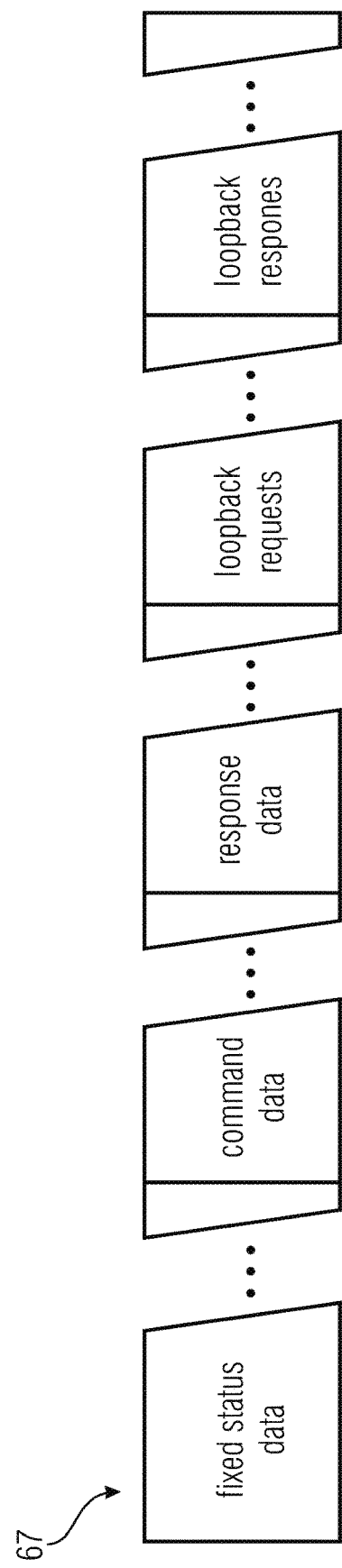
FIG. 19 different types of sections of the signaling data of the status/control channel according to an embodiment.

According to the illustration shown in FIG. 19 but not limited thereto, there are five different types of content in the signaling data: a) a fixed status data: these are transmitted at regular intervals, b) a command data: the transmitter sends commands to the receiver. Usually this is used by the UE to control a SUDAC, but can also be used from SUDAC to UE e.g. when the BS controls the SUDAC and then uses the SUDAC to configure the UE accordingly. A response data (c) may contain data associated with a received command. Usually this is used by the SUDAC to acknowledge a command sent by the UE but is not restricted to this usage as the SUDAC may also send commands (or requests) to the UE. A loopback request (d) may be transmitted in a data slot reserved for UEs that are not associated with the active SUDAC link to insert commands or status information into the control/data stream, creating a random access channel A Loopback response (e) may be implemented as a channel containing the loopbacked data from a Loopback request slot.

This concept is independent of the actual realization in the time-frequency-code-space. The actual distribution of the pilot symbols may be defined arbitrarily or according to existing protocols.

For implementing a network structure that takes into account a variable infrastructure, further functions of the network nodes are implemented as it will be described in the following:

For using a SUDAS at the UE it has to be aware of the existence of the SUDAC. Therefore the UE supports methods for discovering SUDAC. The discovery process in the EHF band is initiated by the UE or a SUDAC. The BS may support similar methods in the s6G band in case the SUDAC is able to communicate with the BS directly. In the following a method is described that assumes that the UE initiates the process. This is a power efficient method that minimizes the overall radiated power as it discovers and configures the SUDAS only when it is actually needed. The method can of course be extended in such a way that SUDACs are also allowed to do an active discovery of other participants of the SUDAS. This will of course be more power consuming which may become an issue especially if a UE listens constantly for the presence of a SUDAS.

After a SUDAC has been powered on, it will enter the rendezvous mode as default. After that the SUDAC waits, will timeout and enter sleep mode if no connection with an UE is established. If a connection is established the SUDAC will be configured to receive and transmit at frequencies different from the rendezvous frequencies by the UE.

This means that an UE may try to discover a SUDAC which may have one of four or more different states:

A purpose of a sleep mode (which may also be called a power down mode) is to minimize power consumption while a SUDAC is not active. Some or all air interfaces are disabled and the SUDAC cannot be discovered. Sleep mode is ended after a configurable time and listen mode is entered.

In a listen-(operation) mode, the backend communication link interface is disabled. The frontend-downlink interface is disabled. The frontend uplink interface is enabled. The SUDAC cycles its status/control receive interface through the rendezvous frequencies and listens for "wake up" commands. The SUDAC may analyze the received power in the rendezvous frequencies. In case the power is not caused by another SUDAC, the frequency band can be marked as "interfered" and may be omitted from the scanning process for configurable number of scanning cycles (remark: the interferer table can be transmitted over the status/control channel). After stepping through all rendezvous frequencies plus its last active frequency, the SUDAC enters sleep mode. If a wake up command is discovered the SUDAC enters rendezvous mode at/close to the frequency the wake up was discovered. If the SUDAC are allowed to do an active discovery, the SUDAC may enter discover mode. Entering discover mode may also be forced by external interfaces like a pushbutton In an optional discover-(operation) mode, the backend communication link uplink interface is disabled. The backend communication link downlink interface is disabled. The payload channel is disabled. The frontend-downlink interface is enabled at a low interference frequency in a rendezvous channel. A wakeup command is transmitted and the frontend-uplink interface is enabled. Scanning of rendezvous channels is performed to detect interference, SUDAC or UE. If no SUDAC or UE are detected interference information is provided for configuration of the downlink interface. If status and control information of the UE or other SUDAC are received the information on the network layout is stored. After a given time where no additional SUDACs ore UEs are detected the SUDAC enters sleep mode In a Rendezvous-(operation) mode, the backend communication link uplink interface is disabled and the backend communication link downlink interface is enabled. The UE configures the backend communication link frequency of the SUDAC according to the BS configuration (this may also be done by the BS itself if a BS-SUDAC status/control channel is implemented). The SUDAC continually measures the quality of the backend communication link (e.g. power, SNR etc). The payload channel is disabled and the frontend-downlink interface is enabled. The status/control information of the SUDAC is transmitted this includes the quality indicators of the backend downlink. The frontend-uplink interface is enabled. Status and control information of the UE are received. Upon command of the UE the SUDAC enters active mode. For this the frequency may be changed as no payload is allowed within the rendezvous bands. For this the frontend frequencies are configured by the UE. To decide on a frequency the UE can scan the frequency region and select a frequency with low interference, use knowledge of the network layout that it has stored or is provided by other UE, the SUDAC or the BS. The UE nevertheless may confirm the validity of the frequency assignment by scanning for interference. Upon not receiving status/control of the UE for a configurable amount of time the SUDAC enters sleep mode.

In an active (operation) mode, all air interfaces are enabled. Payload and status/control channels are being enabled according to the configuration. Upon not receiving status/control of the UE for a configurable amount of time the SUDAC disables all air interfaces and enters sleep mode.

To discover a powered down SUDAC, the first step of the UE is to wake up all reachable powered down SUDAC and force them to enter rendezvous mode. This is done by transmitting a wake up command at the rendezvous frequencies. This may be done for the duration of a sleep cycle of the SUDAC to ensure the signal is received by all available SUDAC. The UE transmits the wake up command on at least one rendezvous frequency. The selection of this frequency is done by scanning candidate frequencies for interference power and selecting a frequency with low enough interference power. The scanned frequency range also encompasses the frequency band where the wakeup answer of a SUDAC is expected. In FDD mode this is at another frequency than the request frequency, in TDD mode this is obviously the same frequency as the request frequency.

Alternatively the SUDACs may scan the s6G or EHF band for activity (received power) to wake up and transmit status/control on a rendezvous channels. The UE may then simply scans for the status/control (i.e. for information transmitted via a status/control channel). Of course the SUDACs could also continually or discretely sweep the used rendezvous frequencies. This would be a transmit of status/control and wait for a response before stepping to the next frequency.

To discover a SUDAC in rendezvous mode the UE scans its selected rendezvous acknowledge frequency for received control channels. This frequency is the same as the wakeup frequency in case of TDD or a different frequency with a known relative position to the wakeup command frequency in FDD (for example defined by the wakeup command). A random access channel (RACH) protocol is used for discovering multiple SUDAC answering the wake up command. After reception of the downlink control channel the UE transmits the uplink control channel and configures the chosen SUDAC to a different frontend communication link frequency according to some decision rule like for example best SNR. Then the UE can hold the already acquired SUDAC by regularly transmitting status/control messages on this channel. While thus inhibiting the acquired SUDAC from falling back to sleep mode the UE can try to discover further SUDAC.

An active SUDAC may be discovered by a UE which scans the EHF band and searches for transmitted power in the frontend communication link. If a payload channel with significant power is found the UE tries to decode the SUDACs control channel which is found at a well-defined frequency distance from the payload channel's carrier frequency or at the payload frequency depending on the SUDACs transmission capabilities. In case a SUDAC control channel is found the UE analyzes the content to decide if the SUDAC may be used piggyback, which means that the unused payload bandwidth of a SUDAC is used by a second UE without providing a status/control channel.

While using a SUDAS the discovery process is initiated regularly by a UE to ensure that new SUDACs are being detected while the UE moves and decisions for new resource reallocation can be made. This discovery process also includes a regular scanning of the EHF band for active SUDACs to enable the UE to maybe handover to a SUDAC with a better connection. This has of course to be negotiated with the UE that currently uses the other SUDAC.

It is noted that of course other applications may use the infrastructure provided by a SUDAS. For example indoor navigation can be based on status/control channels provided by the SUDAS.

After all reachable SUDACs have been discovered the resources have to be allocated in the optimum way by resource allocation and channelization. Points that may be taken into account are: a) The backend communication link bandwidth is the most limited resource in the system, b) The system is advantageously able to serve multiple UEs, c) The system is advantageously able to serve multiple BSs, potentially from multiple mobile network operators, d) The network topology is not static as UEs may be moved or the surroundings of UEs may change (e.g. body movement), e) Data rate (and hence link quality) necessitated by a UE changes over time, f) SUDAC and UE may act as interferer to each other (at EHF) and/or g) Other devices may act as interferer for a SUDAC, wherein the UE can decide which SUDAC to use for the data transmission and which to release. This can be done in cooperation with the BS. The type of cooperation depends on the capabilities of the SUDAC.

The frontend status/control channels may make use spatial MIMO techniques or beamforming as the necessitated antenna for EHF can be provided in SUDACs and UEs, i.e., the status/control channels may be transmitted according to the allocation scheme. For the sub6G band a SUDAC will mostly incorporate a single antenna only. In this case the BS may only apply beamforming techniques for the backend status/control channel. This means that in case a status/control channel is implemented in the backend communication link the BS may discern between MIMO and beamforming modes. In case of aSUDACs the BS would transmit the beamformed status/control channel at a different frequency while a dSUDAC may alternatively do a switching between spatial multiplexing or space-time-coding and beamforming depending on what type of data is to be transmitted. For status/control data the BS switches to beamforming mode while for transmitting payload data the spatial multiplexing or space-time-coding MIMO mode is used.

In case backend status/control channel is available the SUDAC may be configured either by the BS, the UE or both. The negotiation may occur directly between UE and BS or via the individual SUDAC e.g. in case a mixed SUDAS consisting of aSUDACs and dSUDACs is used or the UE configures the resource allocation of the frontend communication links while the BS configures the resource allocation of the backend communication link s.

The decision on the used SUDACs and the configuration of their t-f-resources is done in a stage process. Stage 1 is the based on the quality and availability of frontend links. The UE is able to decide on the frontend-link quality by analyzing the downlink status-control channels. The UE may use the loopback method to receive information on uplink channel quality and channel distortion by transmitting test data on the uplink channel to the SUDAC and analyzing the loopbacked signal. Alternatively the SUDAC may provide the quality-information by analyzing the UE uplink status/control data and including the results of the analysis as status information in the frontend downlink status/control channel. In this way the UE can decide on using only SUDACs with a good frontend connection. Alternatively the BS can decide on the used frontend communication link resources by receiving the quality information from SUDACs and UE. The type of used frontend communication link (TDD or FDD) is decided by the SUDACs capabilities and the overall planning of the network layout. A mixture of different link types within the SUDAS is allowed.

The stage 2 of evaluation of the link is to analyze the quality (e.g. the signal to noise ration—SNR) of the backend link in downlink and uplink. Depending on the SUDAC type, a SUDAC may be able to directly provide a quality indicator (e.g. received power, SNR) of the backend downlink to the UE. Alternatively the UE can calculate a quality measure on the relayed payload provided through the frontend downlink. With this the UE can select to use SUDACs with a good downlink connection to BS. The quality of the backend uplink can only be evaluated by the BS feeding back it's reception condition to the UE. For this the transmission power of the SUDAC may be configured by UE or BS to provide the optimum power distribution for achieving a good MIMO matrix at the BS.

In case a status/control channel between SUDAC and BS is established the quality of the channel can be estimated by analyzing this channel like in the frontend communication links.

On top of that the UE can cooperate with the BS for allocating the frequency resources. This allows the optimization of the overall transmission from UE to BS in the sense of resource allocation.

A maximum number of UEs may be allowed to share the SUDAS. In case multiple UEs are using one SUDAS and to enable piggyback mode, the UEs can request the BS (or the BS decides) to allocate the transmission frequencies beside each other so that a single SUDAC can transmit the payload data of multiple UEs. In case of a SUDAC shall transmit payload channels in TDD mode from different unsynchronized BSs (meaning these will have to be on different frequencies), these channels may also be separated by frequency in band 2 to prohibit symbol interference. In case of a bad BS to SUDAC connection caused by frequency selective fading or interference, the UE can request the BS to shift the uplink frequency in band 1 to avoid bad backend communication links. In case of a bad SUDAC to BS connection caused by frequency selective fading or interference, the BS can decide on shifting the backend communication link frequency in band 1

A piggyback transmission may alternatively or in addition also be implemented from the base station to different user equipment devices. The SUDAC may receive payload information in two payload channels that may be arranged adjacent to each other or spaced, i.e., other channels are arranged between. The SUDAC may be configured to aggregate the different payload information to one payload channel and to transmit the payload channel to the user equipment device controlling the SUDAC and/or to the further user equipment. Thus, a piggyback mode may be implemented in combination with a carrier aggregation to aggregate carrier frequencies (or other resources) dedicated to different payload channels to one channel in the frontend communication link. An aSUDAC may arrange the payload channels adjacent to each other in the frequency domain. A dSUDAC may perform other signal processing operations to obtain one frontend communication signal. This also applies for a communication in the direction of the base station (uplink).

Additional functionality may be implemented, for example, the BS can request the UE to shutdown or enable SUDAC. In case of SUDAC which supports status/control on the backend communication link, the BS can be allowed to do the configuration of the SUDAC. This especially allows the BS to shut down faulty SUDAC that only provide interference on the backend communication link.

This cooperation can go so far that actually one or multiple BSs (possibly even in different mobile networks) do all of the resource allocation. The scenario for this is that all UEs provide the information on discovered SUDACs to the BS. The BS then allocates frontend and backend frequencies for these SUDACs. Then the information is published to the UE and all reachable SUDACs. By that the overall network layout can be optimized and for example interference reduced. Also as the BS has knowledge of the SUDACs configuration it is able to provide this information to the UEs so these can optimize their discovery strategy. In case a status/control channel between BS and SUDACs is implemented the BS can directly configure the whole SUDAS circumventing the hidden node problem. As the BS knows the number of available SUDACs and UEs it can associate the SUDACs to the UEs and ensure a fair resource provision. Also the BS is able to regulate transmission power in the frontend and backend communication links or in case of compress/decode and forward capable SUDACs the used compression/decoding configuration. Finally the BS could even use the SUDACs active discovery mode to measure the reception conditions between the SUDACs and apply the knowledge to apply beamforming for the SUDAS frontend communication link.

A very important aspect of the SUDAS may be seen in the support of multiple UEs. In the following an example for 2 UE is given to demonstrate the used methods. The provided scheme can of course be extrapolated to more than 2 UE.

Assuming both UEs see the same SUDAS, for example, UE 1 accesses the SUDAS compression and forward methods above and UE 2 tries to access the SUDAS.

In case all SUDACs are used by UE 1 and no response is discovered on the rendezvous channels after wakeup has been issued. Then UE2 scans for active SUDACs in EHF band (band 2). If it discovers an active SUDAC, it reads the frontend communication link status-control channels and identifies the UE that is using the SUDAC and the channel configuration.

The options for UE2 are to a) Use the SUDAC in piggyback mode in case this is possible by the channel setup and SUDAC capabilities. To enhance the chances of success for this mode, UE2 advertises its intent to the BS, which may reallocate the backend communication link resources. Then UE2 instructs the SUDAC and UE1 to switch to piggyback mode (e.g. via loopback request). In an option b), the UE2 may then issue a SUDAC release request to UE 1. This may be done on the SUDAC uplink control channel frequency. UE2 needs to synchronize to the structure of the status control channel and then uses the loopback frequency or time slots to transfer data to the SUDAC. This data is then loopbacked to UE1. UE1 decodes the request and may follow or deny it. Following and denial are transferred in the frontend-uplink status/control channel. In an option c), the UE2 can try to open a direct link in the band 2 to UE1 (for example via 802.11ad) and directly negotiate with UE1. In an option d) the UE2 transfers a resource request to the BS which relays this request to UE1. In an option e) and in case there are some idle SUDACs, UE2 acquires these. After configuring them UE2 may try to find active SUDACs by issuing a resource status request to the BS. The BS then provides SUDAC usage information from UE1. Alternatively or in addition, the UE2 may perform scanning for used SUDACs in the whole band 2 to negotiate with UE1 afterwards for releasing one or more SUDAC Alternatively or in addition, the UE2 may perform Reading network topology information provided by the acquired SUDACs.

In an option f) a priority scheme (potentially configurable by user) may be implemented within the SUDAC so that it is possible to force a release from a UE which uses a SUDAC. For this the UE with the higher priority issues an acquisition code to the SUDAC. Alternatively the priority handling may be done by the BS. A request is sent to the BS for priority reallocation and the BS transmits a release request to the UEs with lower priority. In an option g) and in case there is no overlap in the used SUDAC both UEs configure the SUDAC that they "see". In an option h) a moving UE may encounter a SUDAC which acts as interference to the SUDAS that it is using.

Figure 20A:
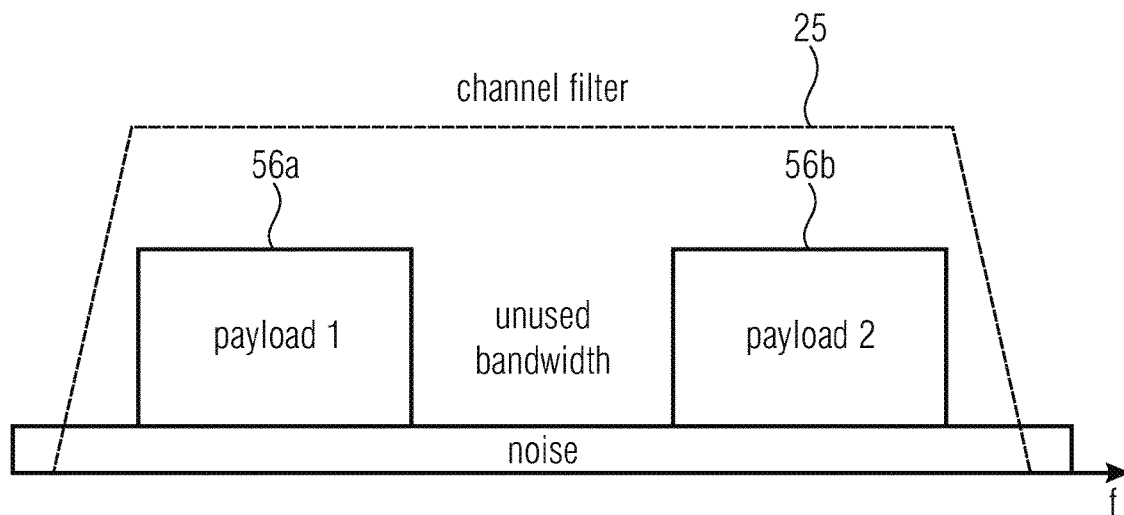
FIG. 20a is a schematic implementation of filters of the SU DAC according to an embodiment.

FIG. 20a shows a schematic implementation of the filter 25. The filter 25 may be configured for filtering, i.e., attenuating, frequencies outside the frequency range defined by the payload channel 1 and the payload channel 2, i.e. the payload channel 56a and 56b. The implementation shown in FIG. 20a may be an analog bandpass filter which leaves the bandgap between the payload channels 56a and 56b unattenuated.

Figure 20B:
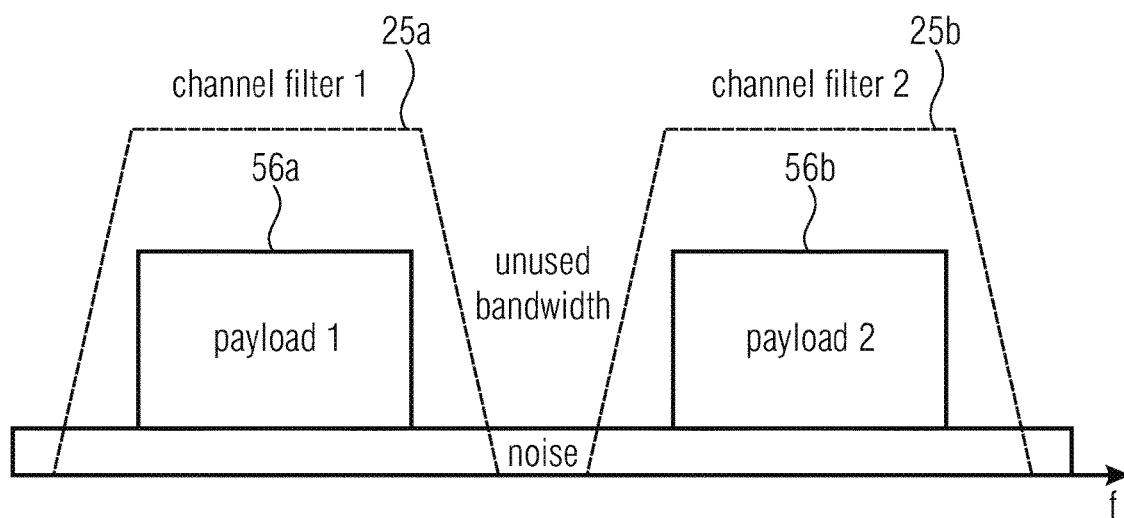
FIG. 20b is a realization of a filtering with two filters each attenuating frequencies outside the respective payload channel according to an embodiment.

FIG. 20b shows a realization of a filtering with two filters 25a and 25b each filtering, i.e., attenuating frequencies outside the respective payload channel 56a or 56b such that also an unused bandwidth between the payload channels 56a and 56b is attenuated. This may also be denoted as multiple channel filters that are arranged according to the channel layout and implemented as one channel filter for the complete transmission bandwidth. Such structure may be implemented with digital filters as the bandwidth acquired by the payload channels 56a and optionally the payload channel 56b may be varying over time. A dynamic channel configuration may be advantageously taken into account with digital filters as they are cheap, more flexible and may be implemented necessitating less space.

In other words, one consideration can be made especially for SUDACs, as they amplify and forward the analog signals in s6G and mm-band. Precautions have to be taken that the SUDAC may not cause excess interference to the BS-UE link. This may be the case if there are powerful inband interferers in the EHF band. To avoid this either the maximum EIRP (EIRP=equivalent isotropically radiated power) of a SUDAC can be further restricted or a method may be implemented that allows the BS to shut down a SUDAC. One example way to do this is that the BS requests a shutdown of SUDACs from the UE. Even if the UE is unable to reach the SUDAC it only has to stop transmitting the frontend uplink status/control channel which will force the SUDAC to sleep mode after timeout.

One challenge for a SUDAC is that it may be necessitated to provide some frequency adaptive preselector filters to suppress possible self-interference on the EHF link if transmission and reception is done with the same antennas or antennas with the same frequency characteristics. As it is at least very expensive to implement such filters in the analog domain, a partitioning of the EHF band is proposed. By that transmission and reception can be decoupled.

Also it may be possible to suppress for large but only partially used payload bandwidths the signals in the unused parts of this band. This can be done by a selectable filterbank in the analog or digital domain depending on the implementation of the SUDAC.

As can be seen the effect on the uplink or downlink can be compensated by the channel filters that have the necessitated bandwidth. In case the channels are dynamically changing this will lead to high costs in hardware if done in a purely analog way. Or a fixed channel bandwidth granularity is defined (e.g. 5 MHz). Then a filterbank consisting of only a handful of filters could be used. A digitizing SUDAC can implement this in a simple way by digital filtering of the payload signal.

Further it may be considered that a SUDAC may be faulty. Therefore the start-up a SUDAC needs interaction between BS and UE. The UE enables a single SUDAC and awaits confirmation from the BS that the new transmission setup is valid. In case of an error the BS informs the UE which in turn disables the SUDAC maybe marking the SUDAC by a non-volatile method as faulty to inhibit further transmission tests.

Figure 21:
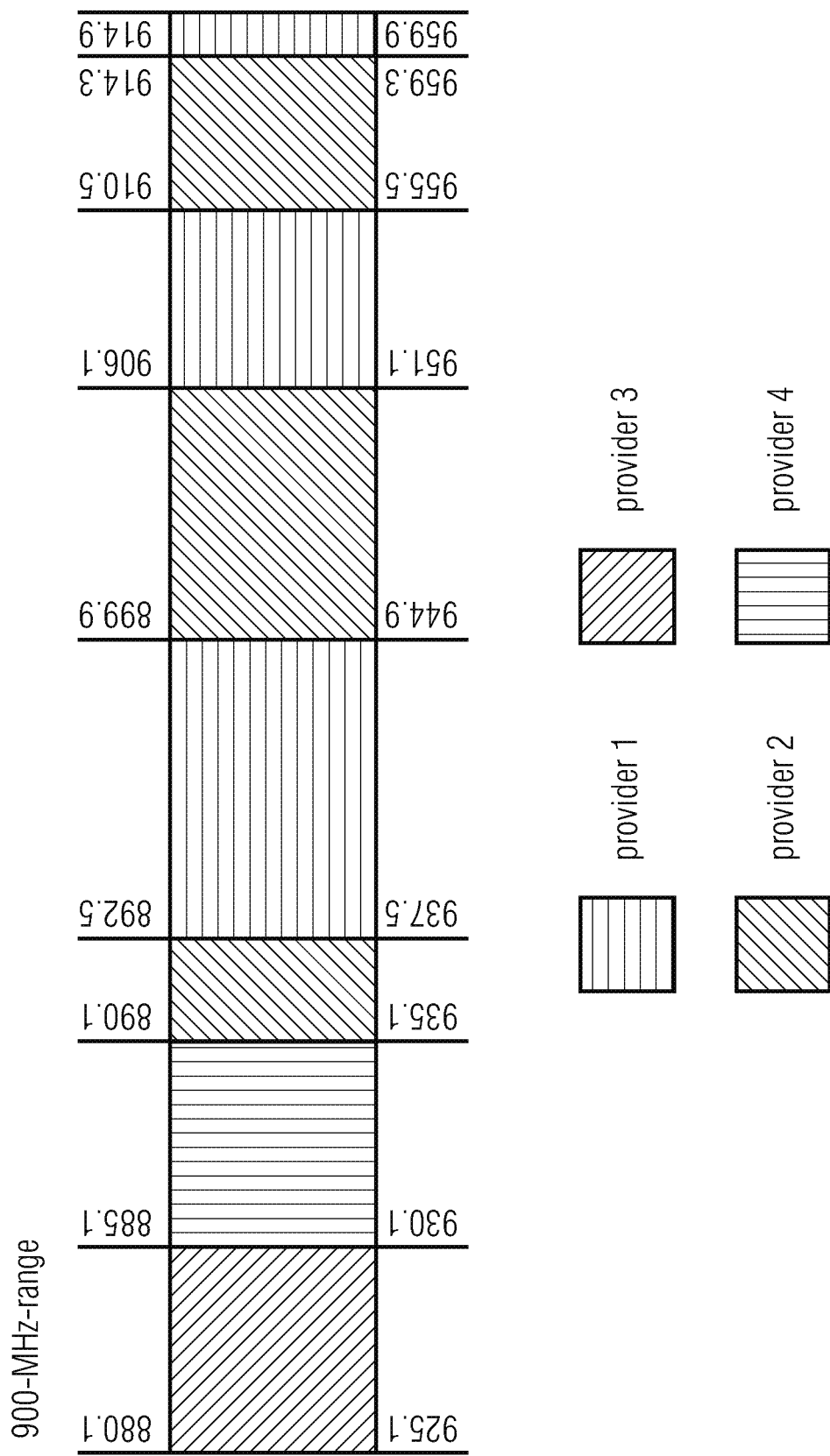
FIG. 21 is a schematic overview of a frequency allocation in the ultra-high frequency in case of LTE in Germany.

FIG. 21 shows a schematic overview of a frequency allocation in the ultra-high frequency in case of LTE in Germany (dated 2014). Base stations of different providers indicated as provider 1-4 utilize different frequencies of the spectrum. This may result in scenarios, wherein a SUDAC only may communicate to one base station with one wireless communication interface. Alternatively, when the wireless communication interface is configured for communicating at a border between frequencies of two providers, such messages may be received by both base stations, wherein the reception is limited to the base stations of the providers utilizing the respective frequency.

As stated above, a SUDAC incorporates at least one relaying link consisting of backend/frontend communication links. These links can be configured independent of each other. The backend communication link uses band 1 while the frontend communication link uses band 2. The used spectrum for band 1 is defined by the specifics of the BS. The used spectrum of the frontend communication link can be configured by UE, SUDAC and also the BS if the necessitated status/control channels are implemented. As an example the LTE backend communication link spectrum allocation is provided in [5].

In general it is expected that a much larger bandwidth is available for transmission in band 2 than in band 1. Assuming that the SUDAC is controlled and configured by a link in band 2 a method is necessitated that allows establishing such control links in an efficient way. It is not seen as efficient to scan for some beacon signal in the whole available frequency range as this is a time consuming task especially if the RF-stage provides a narrow bandwidth. Also the use of very large bandwidths is not considered as being advantageous as this would increases the SUDACs RF-stage complexity and by that the overall cost significantly. In IEEE802.11ad a scheme is proposed where a reduced bandwidth is used for discovery and negotiation. This is called a low rate channel and assumes LRP in contradiction to the high speed bulk data transaction that are done via a high rate physical layer (HRP).

The above description has made reference to a plurality of details relating to communication within a SUDAC system and to components of a SUDAC system. When compared to known concepts differences thereto include but are not limited to the details described below.

With respect to discovery in EHF (or s6G for dSUDAC) and in contrast to 802.11ad the SUDAS provides a low power saving approach by allowing the UE to connect to a SUDAS on demand. The SUDACs are allowed to power down for a long time minimizing the overall power consumption. The basic idea of passive detection is already covered for example by IEEE 802.15.3. Different to the approach is that detection covers a set of definable frequency bands (rendezvous frequency) and the last used frequency. The rendezvous channels may be configured freely (frequency positions, used bandwidth, number of status/control channels) and can adjust to the given interference conditions. The SUDAS discovery can be done by both termination points for the relayed signal (BS and UE). In case no status/control channel to the BS exists the UE can transfer the information on the SUDACs to the BS which can share it with other UEs or SUDACs. A UE that does a discovery on the rendezvous channels automatically claims all SUDACs that receive the signal at this frequency. Only SUDACs that are not claimed may listen to the wakeup commands at the rendezvous channels. SUDACs may do their own discovery of the network without claiming a device (SUDAC or UE). By that they can acquire information on the network layout that is locally stored and may be provided to the other SUDACs or the UE (storage and distribution of such status information is of course not novel). By listening to active channels sufficient information can be extracted for a UE to decide if it is worthwhile to try to request claiming control of the SUDAC or if it is possible just to attach to the SUDAC (piggyback). Discovery and synchronization are done per link and in case of FDD per transmission direction With respect to channelization, the payload bandwidth is highly configurable as high data throughput is provided both by MIMO techniques in the s6G and excessive bandwidth usage in EHF band. There is no mandatory fixed frequency grid for the payload transmission. The payload and status/control channels are associated but independent of each other. The transmitted payload can be just a frequency shifted, channel filtered and amplified (done purely in the analog domain) version of the original received payload signal. In this case the status/control channel is separated by frequency from the payload. If the SUDAC provides payload digitization, compress and forward/decode and forward schemes can be applied. The status/control channel may be separated by frequency but can also be injected in the payload channel. Status/control channels can be used without payload for the discovery procedure. Status/control channels can be turned off for piggyback mode. Backend communication link status/control channels can be implemented if the SUDAC provides digitalization and the BS supports this a mode. The status/control channel keeps a SUDAC active. This provides an automatic shutdown mechanism in case of the SUDAC becomes unreachable over EHF (or s6G in case the backend status/control channel is implemented) in case of too much interference. Switch may be performed between beamforming and MIMO mode to allow a direct connection between BS and SUDAC in beamforming mode while transmitting the payload in MIMO mode. A mixed mode usage of TDD and FDD is enabled (especially dSUDACs)

With respect to resource allocation, the BS is actively involved in the resource allocation process. Therefore it can take actions to optimize and control the overall transmission on the s6G links this can be done either via cooperation with the UE (requesting the UE to configure SUDACs to a certain setup) or maybe by overriding the UE and doing a direct configuration of the SUDAC over the backend. The UE controls (or negotiates with SUDACS and other UEs) the resource allocation at EHF and even may request modifications in the resource allocation of the BS. The fronted links can be selected according to the actual interference scenario thereby avoiding bands with high interference. With the piggyback mode an analog carrier aggregation method has been designed that is even able to aggregate carriers from within multiple mobile networks. The usage of a SUDACs relaying link is exclusively assigned to one UE until that UE drops the SUDAC actively or stops transmitting the status/control channel. Piggyback mode is not considered harmful to the exclusiveness. Nevertheless a handover mechanism between 2 UEs is provided. If payload loopback is implemented in a SUDAC, it may act as a frequency shifting BS to BS relay on the backend. By this BS from different operators could implement a communication interface for resource sharing. On the frontend it may act as a frequency shifting EHF to EHF relay which could for example be used to enhance the coverage of IEEE802.11ad access points. In case of a synchronized network and a surplus of SUDACs, 2 (or more) SUDACs may relay the same s6G signal to the same EHF frequency and apply methods to provide constructive interference. Possibly the same signal is simultaneously relayed at different frequencies with a different phase shift. Further, SUDACs can translate between TDD and FDD modes. A relaying of different unsynchronized BSs is possible if different frequencies are allocated for both.

With respect to the transmission protocol a relaying of data in the EHF band is supported by loopback to provide a communication link between UEs that have no direct access to each other. This may happen for example if the UEs are served by different BS. This results to a RACH which is injected within a RACH channel. The SUDAC provides a fixed transmission delay as no retransmissions are foreseen on this layer. Retransmission and acknowledgement of data is handled by UE and BS. Status/Control is acknowledged over the status/control channel. The relaying is free of additional routing overhead as configuration, status/control are separated from the payload channel and the routing of the payload is defined by the uplink and downlink frequencies.

Figure 22:
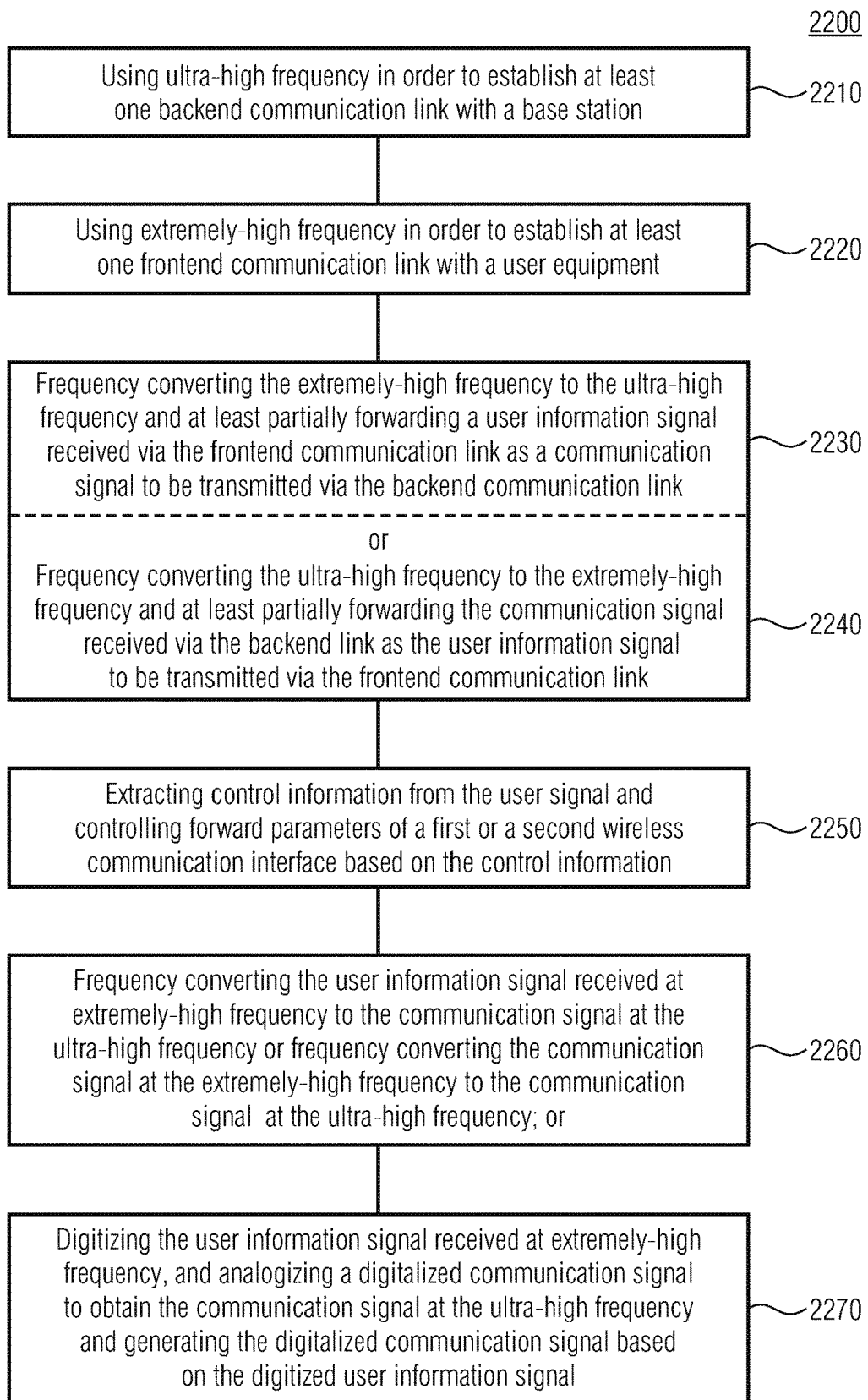
FIG. 22 is a schematic flowchart of a method for signal forwarding according to an embodiment.

FIG. 22 shows a schematic flowchart of a method 2200 for signal forwarding, e.g., with a SUDAC. In a step 2210 ultra-high frequency is used in order to establish at least one backend communication link with a base station. In a step 2220 extremely-high frequency is used in order to establish at least one frontend communication link with a user equipment.

In a step 2230 the extremely-high frequency is frequency converted to the ultra-high frequency and a user information signal received via the frontend communication link is forwarded at least partially as a communication signal to be transmitted via the backend communication link. In a step 2240 the ultra-high frequency is frequency converted to the extremely-high frequency and the communication signal received via the backend communication link is forwarded at least partially as the user information signal to be transmitted via the frontend communication link.

In a step 2250 control information is extracted from the user signal and forward parameters of a first or of a second wireless communication interface of the user equipment is controlled based on the control information.

In a step 2260 the user information signal received at extremely-high frequency is frequency converted to the communication signal at the ultra-high frequency or the communication signal at the extremely-high frequency is frequency converted to the communication signal at the ultra-high frequency. Alternatively or in addition to step 2260, in a step 2270 the user information signal received at extremely-high frequency is digitized and a digitalized communication signal is analogized to obtain the communication signal at the ultra-high frequency. The digitalized communication signal is generated based on the digitized user information signal.

Figure 23:
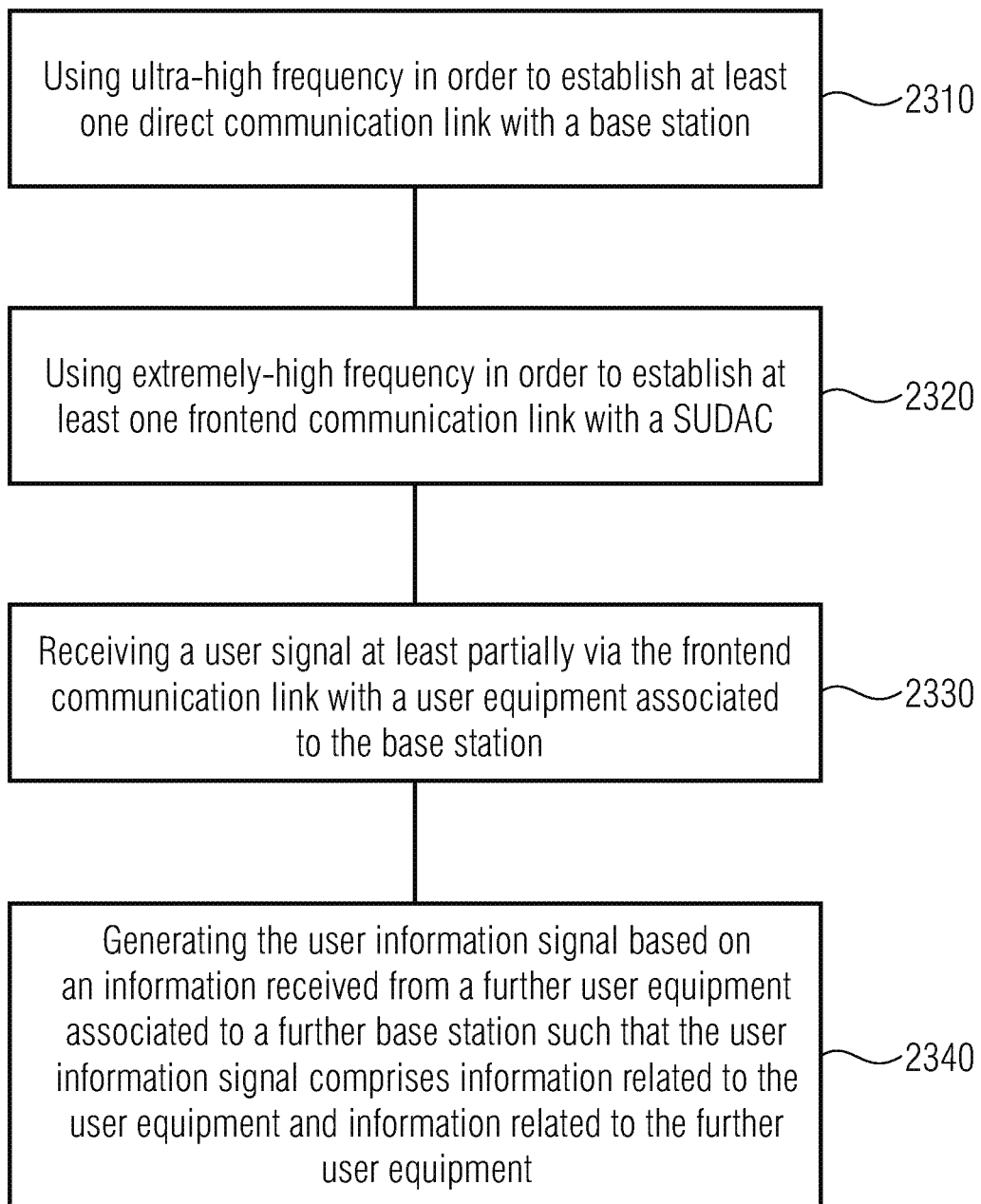
FIG. 23 is a schematic flowchart of a method for transmitting or receiving a signal with a user equipment according to an embodiment.

FIG. 23 shows a schematic flowchart of a method 2300 for transmitting or receiving a signal with a user equipment. In a step 2310 ultra-high frequency is used in order to establish at least one direct communication link with a base station.

In a step 2320 extremely-high frequency is used in order to establish at least one frontend communication link with a SUDAC.

In a step 2330 a user signal is at least partially received via the frontend communication link with a user equipment associated with the base station.

In a step 2340 the user information signal is generated based on an information received from a further user equipment associated with a further base station such that the user information signal comprises information related to the user equipment and information related to the further user equipment.

Figure 24:
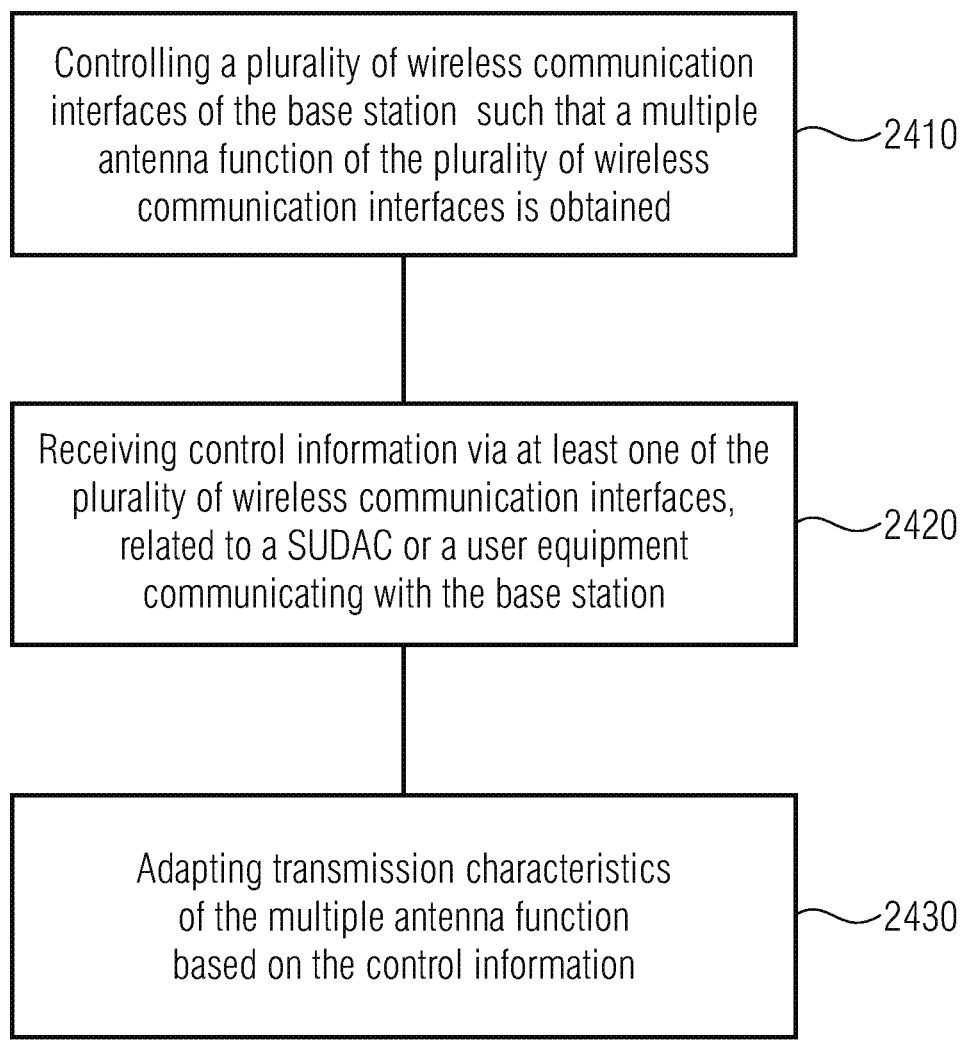
FIG. 24 is a schematic flowchart of a method for transmitting or receiving a signal with a base station according to an embodiment.

FIG. 24 shows a schematic flowchart of a method 2400 for transmitting or receiving a signal with a base station. In a step 2410 a plurality of wireless communication interfaces of the base station is controlled such that a multiple antenna function of the plurality of wireless communication interfaces is obtained.

In a step 2420 control information is received via at least one of the plurality of wireless communication interfaces, the control information related to a SUDAC or a user equipment communicating with the base station.

In a step 2430, transmission characteristics of the multiple antenna function are adapted based on the control information.

Although wireless communication interfaces of a user equipment, of a SUDAC and of a base station have been shown as being an external component, the wireless communication interfaces may also be an internal component inside a housing of the respective apparatus.

Although above descriptions relate to a user equipment that controls the SUDAC and/or the base station, a protocol may be implemented that includes a bidirectional transmission of information such that a resource allocation may be obtained by cooperation between network nodes. Each network node may scan its channels and determine in which of those transmit power is present and/or in which for example a signal to noise ratio is good enough for communication. The SUDAC may determine such information by listening. The user equipment may coordinate the resource allocation including a control of the base station related thereto. Alternatively or in addition, the user equipment may control the base station such that the base station derives an optimal allocation and implements it.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

LITERATURE

[1] IEEE802.11-10/0259r02
[2] Draft IEEE P802.15.3/D17
[3] IEEE802.15/3c
[4] Norman Abramson, AFIDS Conference Proceedings (Hrsg.): The ALHOA System—Another Alternative for Computer Communications. 37, AFIPS Press, 1970, pages. 281-285
[5] German document: "Frequenzverteilungsuntersuchung (BK1-11/001), Amtsblatt Nr. 23/2011 der Bundesnetzagentur"

The invention claimed is:

1. A Shared User Equipment-Side Distributed Antenna Component (SUDAC) comprising:
   a first wireless communication interface, configured for using ultra-high frequency in order to establish at least one backend communication link with a base station; and
   a second wireless communication interface, configured for using extremely-high frequency in order to establish at least one frontend communication link with a user equipment; and
   a processor,
      wherein the processor is configured for at least partially forwarding a first user information signal received via the frontend communication link as a first communication signal to be transmitted via the backend communication link while frequency converting the extremely-high frequency to the ultra-high frequency; or
      wherein the processor is configured for at least partially forwarding a second communication signal received via the backend communication link as a second user information signal to be transmitted via the frontend communication link while frequency converting the ultra-high frequency to the extremely-high frequency;
   wherein the processor is configured for extracting control information from the first user information signal and for controlling forward parameters of the first or the second wireless communication interface based on the control information,
   wherein the control information is a transmit power, a modulation scheme or is related to a frequency, a code, a space and/or a time slot to be utilized by the SUDAC;
   wherein the forward parameters relates at least to one of a time, a frequency, a space or a code resource of the backend communication link or the frontend communication link; and
   wherein the processor is configured for frequency converting the first user information signal received at extremely-high frequency to the first communication signal at the ultra-high frequency and for frequency converting the second communication signal at the ultra-high frequency to the second user information signal at the extremely-high frequency; or
   wherein the SUDAC comprises an analog to digital converter configured for digitizing the user information signal received at extremely-high frequency, and a digital to analog converter configured for analogizing a digitalized communication signal to acquire the communication signal at the ultra-high frequency wherein the processor is configured for generating the digitalized communication signal based on the digitalized user information signal.

2. The SUDAC according to claim 1, wherein the frontend communication link comprises a plurality of control channels and at least one payload channel, wherein the processor is configured to reduce a bandwidth of the payload channel), wherein the processor is configured to, during a second time duration during which the bandwidth of the payload channel is reduced, increase a number of control channels when compared to a first time duration having a same length as the second time duration wherein the processor is configured to, during the first time duration, not reduce the bandwidth of the payload channel and wherein the processor is configured to forward the payload channel.

3. The SUDAC according to claim 1, wherein the backend communication link comprises a plurality of backend control channels and at least one backend payload channel and wherein the SUDAC is configured for transmitting or receiving control data to or from the base station, wherein the processor is configured to adapt a transmission characteristic of an antenna function of the base station based on the control data of a transmitted backend control channel or to adapt a function of the SUDAC based on the control data of a received backend control channel), wherein the function of the SUDAC relates to parameters of the frontend communication link or to switch the SUDAC to a sleep-mode.

4. The SUDAC according to claim 1, wherein the SUDAC is configured for utilizing the frontend communication link to transmit or receive data to or from a second user equipment or a second SUDAC.

5. The SUDAC according to claim 1, wherein the frontend communication link comprises a plurality of control channels and at least one payload channel, wherein the SUDAC is configured for transmitting at least parts of the first user information signal received via the frontend communication link in a decoded version of the parts of the first user information signal via the backend communication link and to transmit at least parts of the communication signal received via the backend communication link in a compressed version of the parts of the communication signal via the frontend communication link, wherein the processor is further configured for adapting a rate of compression or encoding/decoding based on the control information or based on a control signal received via the backend communication link.

6. The SUDAC according to claim 5, wherein the processor is configured for adapting the rate of compression and encoding/decoding based on a ratio of a bandwidth of the plurality of control channels and of the bandwidth of the at least one payload channel.

7. The SUDAC according to claim 1, wherein the frontend communication link comprises a first plurality of rendezvous channels, each rendezvous channel comprising a plurality of control channels, wherein the processor is configured for adapting an operation mode of the SUDAC based on the control information comprised in the plurality of control channels.

8. The SUDAC according to claim 1, wherein
the backend communication link comprises a backend payload channel and wherein the frontend communication link comprises a frontend payload channel;
wherein the backend communication link comprises a backend random access channel or wherein the frontend communication link comprises a frontend random access channel;
wherein the SUDAC is configured for receiving a random frontend information from a further user equipment using the frontend random access channel or to receive a random backend information from a further base station using the backend random access channel; and
wherein the SUDAC is configured for transmitting the random frontend information using the frontend communication link or the backend communication link or for sending the random backend information using the frontend communication link or the backend communication link.

9. The SUDAC according to claim 1, wherein the SUDAC comprises a first operation mode (active) in which the SUDAC transmits or receives information via the backend communication link, wherein the processor is configured to extract control information from the communication signal received from the base station, the control information indicating a sleep-mode request and wherein the processor is configured for changing the first operation mode to a second operation mode (sleep) in which the SUDAC is configured for not transmitting information via the backend communication link or the frontend communication link.

10. The SUDAC according to claim 1, wherein the SUDAC is configured for establishing a first and a second backend communication link, to receive a first and a second payload information using resources separated from each other and to transmit the frontend communication signal comprising the first and the second payload information to perform backend carrier aggregation; and/or
wherein the SUDAC is configured for establishing a first and a second frontend communication link, to receive a first and a second payload information using resources separated from each other and to transmit the backend communication signal comprising the first and the second payload information to perform frontend carrier aggregation.

11. A Shared User Equipment-Side Distributed Antenna Component (SUDAC) comprising:
a first wireless communication interface, configured for using ultra-high frequency in order to establish at least one backend communication link with a base station; and
a second wireless communication interface, configured for using extremely-high frequency in order to establish at least one frontend communication link with a user equipment; and
a processor,
wherein the processor is configured for at least partially forwarding a first user information signal received via the frontend communication link as a first communication signal to be transmitted via the backend communication link while frequency converting the extremely-high frequency to the ultra-high frequency; or
wherein the processor is configured for at least partially forwarding a second communication signal received via the backend communication link as a second user information signal to be transmitted via the frontend communication link while frequency converting the ultra-high frequency to the extremely-high frequency;
wherein the processor is configured for extracting control information from the first user information signal and for controlling forward parameters of the first or the second wireless communication interface based on the control information;
wherein the forward parameters relates at least to one of a time, a frequency, a space or a code resource of the backend communication link or the frontend communication link; and
wherein the processor is configured for frequency converting the first user information signal received at extremely-high frequency to the first communication signal at the ultra-high frequency and for frequency converting the second communication signal at the ultra-high frequency to the second user information signal at the extremely-high frequency; or
wherein the SUDAC comprises an analog to digital converter configured for digitizing the user information signal received at extremely-high frequency, and a digital to analog converter configured for analogizing a digitalized communication signal to acquire the communication signal at the ultra-high frequency wherein the processor is configured for generating the digitalized communication signal based on the digitalized user information signal;
wherein the frontend communication link comprises a plurality of control channels and at least one payload channel, wherein the payload channel is associated to a control channel and wherein the processor is configured for adapting parameters of the control channel to which the payload channel is associated based on the control information and wherein the processor is configured to forward information of the payload channel, wherein a bandwidth of the control channel, of a rendezvous-channel comprising a plurality of control channels and/or of the payload channel is adapted based on the adapting of the parameters.

12. The SUDAC according to claim 11, wherein the frontend communication link comprises a plurality of control channels and at least one payload channel, wherein the processor is configured to reduce a bandwidth of the payload channel), wherein the processor is configured to, during a second time duration during which the bandwidth of the payload channel is reduced, increase a number of control channels when compared to a first time duration having a same length as the second time duration wherein the processor is configured to, during the first time duration, not reduce the bandwidth of the payload channel and wherein the processor is configured to forward the payload channel.

13. The SUDAC according to claim 11, wherein the backend communication link comprises a plurality of backend control channels and at least one backend payload channel and wherein the SUDAC is configured for transmitting or receiving control data to or from the base station, wherein the processor is configured to adapt a transmission characteristic of an antenna function of the base station based on the control data of a transmitted backend control channel or to adapt a function of the SUDAC based on the control data of a received backend control channel), wherein the function of the SUDAC relates to parameters of the frontend communication link or to switch the SUDAC to a sleep-mode.

14. The SUDAC according to claim 11, wherein the SUDAC is configured for utilizing the frontend communication link to transmit or receive data to or from a second user equipment or a second SUDAC.

15. The SUDAC according to claim 11, wherein the frontend communication link comprises a plurality of control channels and at least one payload channel, wherein the SUDAC is configured for transmitting at least parts of the first user information signal received via the frontend communication link in a decoded version of the parts of the first user information signal via the backend communication link and to transmit at least parts of the communication signal received via the backend communication link in a compressed version of the parts of the communication signal via the frontend communication link, wherein the processor is further configured for adapting a rate of compression or encoding/decoding based on the control information or based on a control signal received via the backend communication link.

16. The SUDAC according to claim 15, wherein the processor is configured for adapting the rate of compression and encoding/decoding based on a ratio of a bandwidth of the plurality of control channels and of the bandwidth of the at least one payload channel.

17. The SUDAC according to claim 11, wherein the frontend communication link comprises a first plurality of rendezvous channels, each rendezvous channel comprising a plurality of control channels, wherein the processor is configured for adapting an operation mode of the SUDAC based on the control information comprised in the plurality of control channels.

18. The SUDAC according to claim 11, wherein
the backend communication link comprises a backend payload channel and wherein the frontend communication link comprises a frontend payload channel;
wherein the backend communication link comprises a backend random access channel or wherein the frontend communication link comprises a frontend random access channel;
wherein the SUDAC is configured for receiving a random frontend information from a further user equipment using the frontend random access channel or to receive a random backend information from a further base station using the backend random access channel; and
wherein the SUDAC is configured for transmitting the random frontend information using the frontend communication link or the backend communication link or for sending the random backend information using the frontend communication link or the backend communication link.

19. The SUDAC according to claim 11, wherein the SUDAC comprises a first operation mode (active) in which the SUDAC transmits or receives information via the backend communication link, wherein the processor is configured to extract control information from the communication signal received from the base station, the control information indicating a sleep-mode request and wherein the processor is configured for changing the first operation mode to a second operation mode (sleep) in which the SUDAC is configured for not transmitting information via the backend communication link or the frontend communication link.

20. The SUDAC according to claim 11, wherein the SUDAC is configured for establishing a first and a second backend communication link, to receive a first and a second payload information using resources separated from each other and to transmit the frontend communication signal comprising the first and the second payload information to perform backend carrier aggregation; and/or
wherein the SUDAC is configured for establishing a first and a second frontend communication link, to receive a first and a second payload information using resources separated from each other and to transmit the backend communication signal comprising the first and the second payload information to perform frontend carrier aggregation.

21. A Shared User Equipment-Side Distributed Antenna Component (SUDAC) comprising:
a first wireless communication interface, configured for using ultra-high frequency in order to establish at least one backend communication link with a base station; and
a second wireless communication interface, configured for using extremely-high frequency in order to establish at least one frontend communication link with a user equipment; and
a processor,
wherein the processor is configured for at least partially forwarding a first user information signal received via the frontend communication link as a first communication signal to be transmitted via the backend communication link while frequency converting the extremely-high frequency to the ultra-high frequency; or
wherein the processor is configured for at least partially forwarding a second communication signal received via the backend communication link as a second user information signal to be transmitted via the frontend communication link while frequency converting the ultra-high frequency to the extremely-high frequency;
wherein the processor is configured for extracting control information from the first user information signal and for controlling forward parameters of the first or the second wireless communication interface based on the control information;

wherein the forward parameters relates at least to one of a time, a frequency, a space or a code resource of the backend communication link or the frontend communication link; and wherein the processor is configured for frequency converting the first user information signal received at extremely-high frequency to the first communication signal at the ultra-high frequency and for frequency converting the second communication signal at the extremely-high frequency to the second user information signal at the ultra-high frequency; or wherein the SUDAC comprises an analog to digital converter configured for digitizing the user information signal received at extremely-high frequency, and a digital to analog converter configured for analogizing a digitalized communication signal to acquire the communication signal at the ultra-high frequency wherein the processor is configured for generating the digitalized communication signal based on the digitalized user information signal;

wherein the first wireless communication interface is configured for establishing a further backend communication link to a further base station, using the ultra-high frequency, wherein the SUDAC is configured for receiving the first user information signal from the user equipment via the frontend communication link, wherein the first user information signal comprises a first information related to the user equipment and to the base station and a second information related to a further user equipment and to the further base station, wherein the SUDAC is configured for converting the extremely-high frequency and the first information to the ultra-high frequency and for converting the extremely-high frequency and the second information to the further ultra-high frequency.

22. The SUDAC according to claim 21, wherein the backend communication link comprises a backend payload channel and wherein the frontend communication link comprises a frontend payload channel;

wherein the backend communication link comprises a backend random access channel or wherein the frontend communication link comprises a frontend random access channel;

wherein the SUDAC is configured for receiving a random frontend information from a further user equipment using the frontend random access channel or to receive a random backend information from a further base station using the backend random access channel; and wherein the SUDAC is configured for transmitting the random frontend information using the frontend communication link or the backend communication link or for sending the random backend information using the frontend communication link or the backend communication link.

23. The SUDAC according to claim 21, wherein the SUDAC comprises a first operation mode (active) in which the SUDAC transmits or receives information via the backend communication link, wherein the processor is configured to extract control information from the communication signal received from the base station, the control information indicating a sleep-mode request and wherein the processor is configured for changing the first operation mode to a second operation mode (sleep) in which the SUDAC is configured for not transmitting information via the backend communication link or the frontend communication link.

24. The SUDAC according to claim 21, wherein the SUDAC is configured for establishing a first and a second backend communication link, to receive a first and a second payload information using resources separated from each other and to transmit the frontend communication signal comprising the first and the second payload information to perform backend carrier aggregation; and/or wherein the SUDAC is configured for establishing a first and a second frontend communication link, to receive a first and a second payload information using resources separated from each other and to transmit the backend communication signal comprising the first and the second payload information to perform frontend carrier aggregation.

* * * * *